US010729604B2

(12) United States Patent
Tsusaka et al.

(10) Patent No.: US 10,729,604 B2
(45) Date of Patent: Aug. 4, 2020

(54) SITTING MOTION ASSIST SYSTEM, CONTROL METHOD FOR CONTROLLER OF SITTING MOTION ASSIST SYSTEM, RECORDING MEDIUM, CARE BELT, AND ROBOT

(71) Applicant: Panasonic Intellectual Property Management Co., Ltd., Osaka (JP)

(72) Inventors: Yuko Tsusaka, Osaka (JP); Yudai Fudaba, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 827 days.

(21) Appl. No.: 15/412,717

(22) Filed: Jan. 23, 2017

(65) Prior Publication Data

US 2017/0128292 A1 May 11, 2017

Related U.S. Application Data

(63) Continuation of application No. PCT/JP2015/004114, filed on Aug. 19, 2015.

(30) Foreign Application Priority Data

Sep. 19, 2014 (JP) ................................ 2014-190777
Mar. 30, 2015 (JP) ................................ 2015-069439

(51) Int. Cl.
*A61G 5/14* (2006.01)
*A61G 7/10* (2006.01)
(Continued)

(52) U.S. Cl.
CPC ............. *A61G 5/14* (2013.01); *A61G 7/1017* (2013.01); *A61G 7/1025* (2013.01);
(Continued)

(58) Field of Classification Search
CPC ...... A61G 7/10; A61G 7/1017; A61G 7/1023; A61G 5/14
See application file for complete search history.

(56) References Cited

U.S. PATENT DOCUMENTS 4,204,529 A * 5/1980 Cochrane .............. A61F 5/3707
602/19
5,022,106 A * 6/1991 Richards .............. A61G 7/1017
4/254
(Continued)

FOREIGN PATENT DOCUMENTS

| JP | 9-000570 | 1/1997 |
| JP | 2001-279505 | 10/2001 |

(Continued)

OTHER PUBLICATIONS

International Search Report of PCT application No. PCT/JP2015/004114 dated Oct. 6, 2015.

*Primary Examiner* — Eric J Kurilla
(74) *Attorney, Agent, or Firm* — Wenderoth, Lind & Ponack, L.L.P.

(57) ABSTRACT

A sitting motion assist system for assisting a sitting motion of a patient changing their posture from a standing posture to a sitting posture includes a care belt, a knee-bending adviser, and a pulling mechanism. The care belt can be put on the patient and includes a hold mechanism including a first holder capable of holding the neck or shoulder of the patient and a second holder capable of holding their lower back, and a coupler capable of being positioned on their chest and coupled to the hold mechanism. The knee-bending adviser advises the patient to perform a knee-bending motion. The pulling mechanism is coupled to the hold mechanism via the coupler and pulls the care belt downward and slightly forward relative to the patient after the advice by (Continued)

the knee-bending adviser, and thereafter pushes the care belt downward and slightly backward to assist the sitting motion.

10 Claims, 53 Drawing Sheets

(51) Int. Cl.
    *A61H 3/04*     (2006.01)
    *B25J 9/06*     (2006.01)
    *B25J 9/16*     (2006.01)
    *B25J 11/00*     (2006.01)

(52) U.S. Cl.
    CPC ......... *A61G 7/1046* (2013.01); *A61G 7/1051* (2013.01); *A61G 7/1053* (2013.01); *A61G 7/1073* (2013.01); *A61H 3/04* (2013.01); *B25J 9/06* (2013.01); *B25J 9/162* (2013.01); *B25J 11/009* (2013.01); *A61H 2003/043* (2013.01); *A61H 2003/046* (2013.01); *A61H 2201/0188* (2013.01); *A61H 2201/0192* (2013.01); *A61H 2201/165* (2013.01); *A61H 2201/1619* (2013.01); *A61H 2201/1635* (2013.01); *Y10S 901/01* (2013.01); *Y10S 901/02* (2013.01)

(56) References Cited

U.S. PATENT DOCUMENTS

| | | | | |
|---|---|---|---|---|
| 5,530,976 A * | 7/1996 | Horcher | ............... | A61G 7/1015 182/3 |
| 5,644,805 A * | 7/1997 | Horcher | ............... | A61G 7/1015 5/86.1 |
| 5,878,450 A * | 3/1999 | Bouhuijs | ............... | A61G 7/1017 5/83.1 |
| 6,053,519 A * | 4/2000 | Poindexter | ............. | A61G 5/042 180/907 |
| 6,122,778 A * | 9/2000 | Cohen | ................ | A62B 35/0006 182/3 |
| 6,125,957 A * | 10/2000 | Kauffmann | ............... | A61G 5/14 180/65.1 |
| 7,392,554 B1 * | 7/2008 | Su | ........................ | A61G 7/1017 5/86.1 |
| 7,627,912 B1 * | 12/2009 | McKinney | ............ | A61G 7/1011 5/81.1 R |
| 9,038,212 B2 * | 5/2015 | Yamaguchi | .......... | A61G 7/1017 5/87.1 |
| 9,420,832 B2 * | 8/2016 | Arnold | ...................... | A41D 1/00 |
| 2006/0048785 A1 * | 3/2006 | Dalen | ...................... | A61G 5/14 128/845 |
| 2010/0154117 A1 * | 6/2010 | Odashima | ............ | A61G 7/1017 5/87.1 |
| 2011/0037285 A1 * | 2/2011 | Gil Vizuete | ......... | A61G 7/1023 294/140 |
| 2011/0083267 A1 * | 4/2011 | Gibson | .................... | A61G 5/14 5/87.1 |
| 2011/0277235 A1 * | 11/2011 | Okumatsu | ............ | A61G 7/1017 5/83.1 |
| 2013/0219615 A1 * | 8/2013 | Eklof | ................... | A61G 7/1017 5/83.1 |
| 2015/0005938 A1 * | 1/2015 | Suzuki | ................. | A61G 7/1017 700/253 |
| 2015/0190293 A1 * | 7/2015 | Hacikadiroglu | ......... | A61G 5/14 5/87.1 |
| 2017/0014290 A1 * | 1/2017 | Tsusaka | .................. | A61G 7/10 |
| 2017/0035631 A1 * | 2/2017 | Tsusaka | .................. | B25J 19/06 |
| 2017/0128292 A1 * | 5/2017 | Tsusaka | .................. | A61G 7/1073 |
| 2017/0128293 A1 * | 5/2017 | Tsusaka | .................. | A61G 5/00 |
| 2017/0128299 A1 * | 5/2017 | Tsusaka | .................. | A61H 3/04 |
| 2017/0157773 A1 * | 6/2017 | Tsusaka | ............... | A61G 7/1017 |
| 2017/0216119 A1 * | 8/2017 | Tsusaka | ............... | A61G 7/1017 |
| 2017/0216120 A1 * | 8/2017 | Tsusaka | ............... | A61G 7/1017 |
| 2019/0054335 A1 * | 2/2019 | Yeh | ...................... | A63B 21/4003 |
| 2019/0350784 A1 * | 11/2019 | Shimizu | .................. | A61G 5/14 |
| 2019/0365587 A1 * | 12/2019 | Van Raemdonck | ......................... A61G 7/1046 |

FOREIGN PATENT DOCUMENTS

| | | |
|---|---|---|
| JP | 2002-539338 | 11/2002 |
| JP | 2004-089227 | 3/2004 |
| JP | 2008-067849 | 3/2008 |
| JP | 2010-119564 | 6/2010 |
| JP | 2010-246635 | 11/2010 |
| JP | 2011-019571 | 2/2011 |
| JP | 2012-090735 | 5/2012 |
| JP | 2013-078601 | 5/2013 |

\* cited by examiner

FIG. 5A

| TIME (msec) | POSITION (m) |
|---|---|
| t0 | p0 |
| t1 | p1 |
| .. | .. |
| t10 | p10 |
| t11 | p11 |
| ⋮ | ⋮ |

FIG. 5B

| TIME | POSITION |
|---|---|
| t0 | p0(X0,Z0) |
| t1 | p1(X1,Z1) |
| .. | .. |
| t28 | p28(X28,Z28) |
| t29 | p29(X29,Z29) |
| t30 | p30(X30,Z30) |
| t31 | p31(X31,Z31) |
| t32 | p32(X32,Z32) |
| .. | .. |
| t50 | p50(X50,Z50) |
| t51 | p51(X51,Z51) |
| .. | .. |

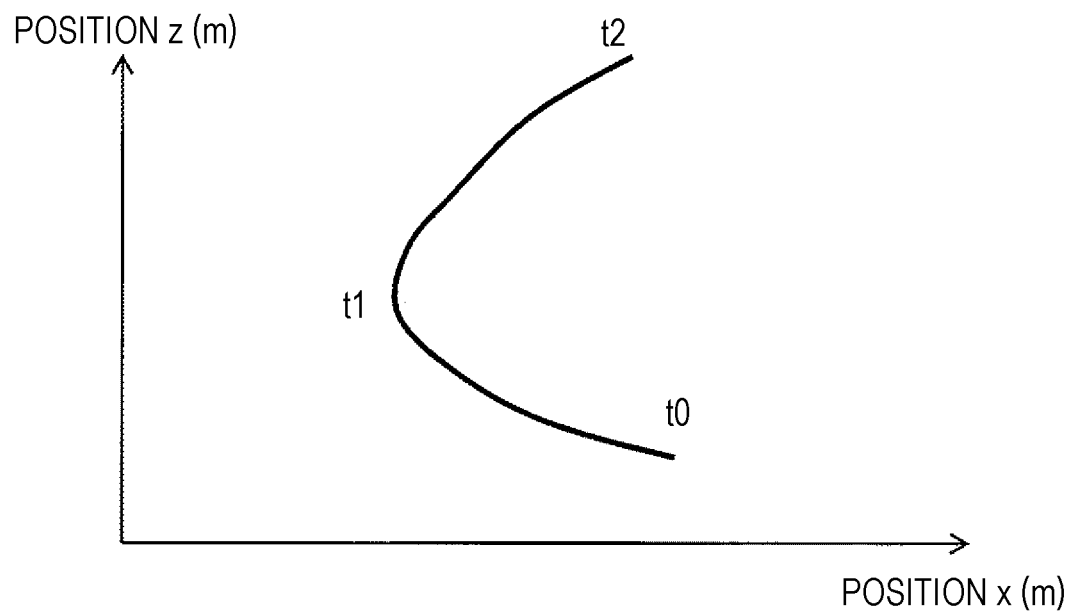

| TIME (msec) | POSITION (m) | FORCE (N) |
|---|---|---|
| t0 | p0 | f0 |
| t1 | p1 | f1 |
| .. | .. | .. |
| t10 | p10 | f10 |
| t11 | p11 | f11 |
| . . . . | . . . . | . . . . |

SITTING MOTION ASSIST SYSTEM, CONTROL METHOD FOR CONTROLLER OF SITTING MOTION ASSIST SYSTEM, RECORDING MEDIUM, CARE BELT, AND ROBOT

BACKGROUND

1. Technical Field

The present disclosure relates to a sitting motion assist system, a control method for a controller of a sitting motion assist system, a recording medium, a care belt, and a robot for assisting a motion of a patient changing their state from a standing-posture state to a sitting-posture state.

2. Description of the Related Art

A transfer assist apparatus is proposed in which, on the basis of a torque measured by a measuring unit, a driver controls a transfer motion in which a patient holding a body holder sits on a seat (see Japanese Unexamined Patent Application Publication No. 2010-119564, for example).

Regarding the related art technique described above, it is desirable to improve assist operations for patients.

SUMMARY

One non-limiting and exemplary embodiment provides a capability to decrease the degree by which a patient leans forward when the patient assumes the leaning-forward posture immediately before sitting down so as to make their motion close to the motion of a healthy person.

In one general aspect, the techniques disclosed here feature a sitting motion assist system for assisting a sitting motion of a patient, the sitting motion assist system including a care belt, a pulling mechanism, and a controller. The care belt includes a first holder that holds a neck or a shoulder of the patient, a second holder that holds a lower back of the patient, and a first coupler that includes a second coupler positioned on a chest of the patient and couples the first holder and the second holder in front of the patient. The pulling mechanism is coupled to the second coupler and pulls or pushes the second coupler. The controller controls a pulling motion performed by the pulling mechanism. The controller controls the pulling mechanism after the pulling motion has been started so as to make the pulling mechanism pull the second coupler downward relative to the patient, subsequently pull the second coupler downward and slightly forward relative to the patient, and thereafter push the second coupler downward and slightly backward relative to the patient.

According to the present disclosure, it is possible to improve assist operations for patients. That is, in a case of a sitting motion of a patient changing their posture from a standing posture to a sitting posture, it is possible to decrease, by the pulling motion of the pulling mechanism, the degree by which the patient leans forward when the patient assumes the leaning-forward posture immediately before sitting down so as to make their motion close to the motion of a healthy person, and to make the sitting motion of the patient be stably performed.

It should be noted that general or specific embodiments may be implemented as an apparatus, a system, a method, an integrated circuit, a computer program, a computer-readable recording medium, or any selective combination thereof. A computer-readable recording medium may be a non-volatile recording medium, such as a compact disc read-only memory (CD-ROM), for example.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5A is a diagram illustrating details of a motion information database according to the first embodiment of the present disclosure;

FIG. 5B is a diagram illustrating details of a motion information database according a modification of the present disclosure;

FIG. 8 is a graph of motion information according to the first embodiment of the present disclosure;

DETAILED DESCRIPTION

Figure 1A:
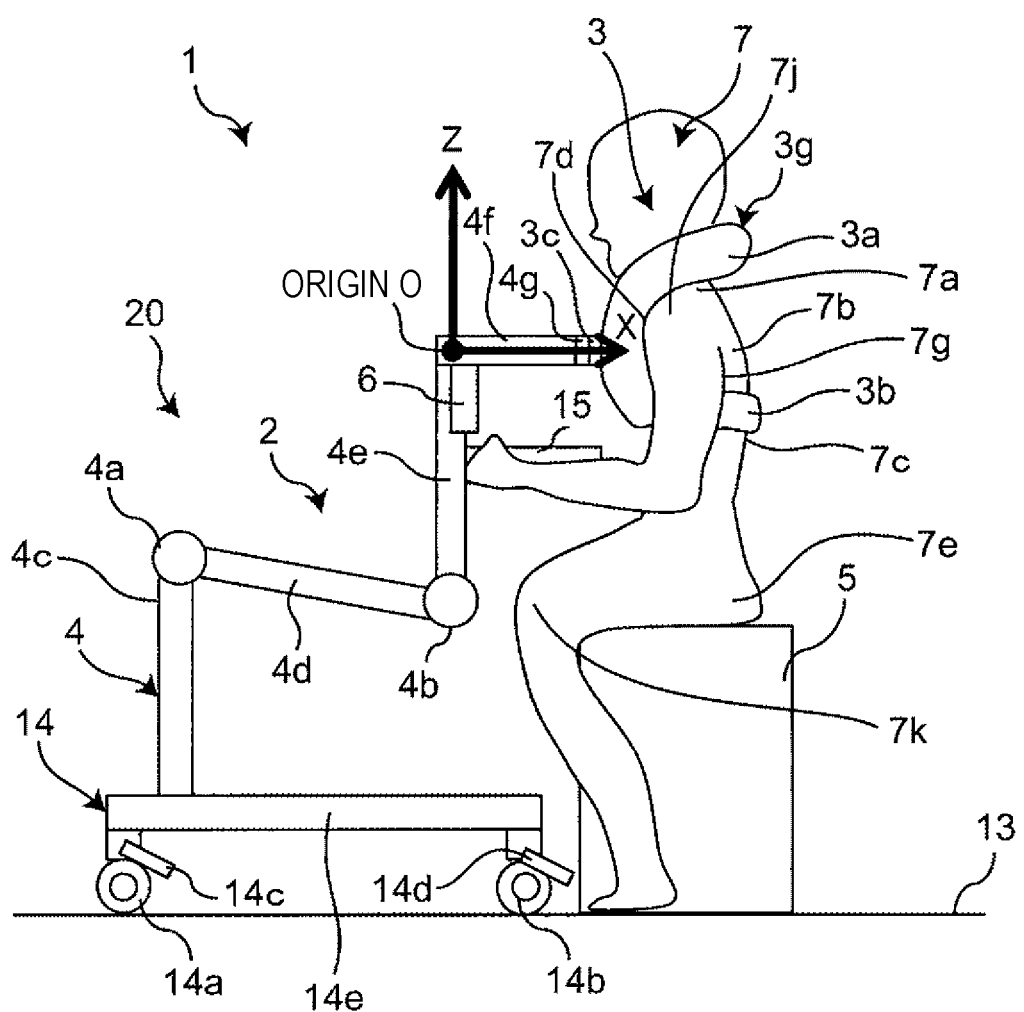
FIG. 1A is a side view schematically illustrating a configuration of a robot of a robot system, which is an example of a sitting motion assist system (that is, a sitting motion assist apparatus) according to a first embodiment of the present disclosure, together with a patient.

Hereinafter, embodiments of the present disclosure will be described with reference to the drawings.

Before a detailed description of embodiments of the present disclosure is given with reference to the drawings, various aspects of the present disclosure are described.

According to a first aspect of the present disclosure, there is provided a sitting motion assist system for assisting a sitting motion of a patient, the sitting motion assist system including: a care belt that includes a first holder that holds a neck or a shoulder of the patient, a second holder that holds a lower back of the patient, and a first coupler that includes a second coupler positioned on a chest of the patient and couples the first holder and the second holder in front of the patient; a pulling mechanism that is coupled to the second coupler and pulls or pushes the second coupler; and a controller that controls a pulling motion performed by the pulling mechanism. The controller controls the pulling mechanism after the pulling motion has been started so as to make the pulling mechanism pull the second coupler downward relative to the patient, subsequently pull the second coupler downward and slightly forward relative to the patient, and thereafter push the second coupler downward and slightly backward relative to the patient.

With the above-described configuration, in a case of a sitting motion of a patient changing their posture from a standing posture to a sitting posture, it is possible to decrease, by the pulling motion of the pulling mechanism, the degree by which the patient leans forward when the patient assumes the leaning-forward posture immediately before sitting down so as to make their motion close to the motion of a healthy person, and to make the sitting motion of the patient be stably performed. Therefore, it is possible to assist the patient in sitting down in a manner similar to the sitting motion of a healthy person while allowing the patient to use the remaining muscle strength of their lower body.

According to a second aspect of the present disclosure, there is provided a sitting motion assist system for assisting a sitting motion of a patient, the sitting motion assist system including: a care belt that includes a first holder that holds a neck or a shoulder of the patient, a second holder that holds a lower back of the patient, and a first coupler that includes a second coupler positioned on a chest of the patient and couples the first holder and the second holder in front of the patient; a pulling mechanism that is coupled to the second coupler and pulls or pushes the second coupler; a controller that controls a pulling motion performed by the pulling mechanism; and a presenter that, after the pulling motion by the pulling mechanism has been started, presents, to the patient, knee-bending advice by using flashing light, lighting, or a sound. The controller performs control after the pulling motion has been started so as to make the presenter present the knee-bending advice by using flashing light, lighting, or a sound, subsequently make the pulling mechanism pull the second coupler downward and slightly forward relative to the patient, and thereafter make the pulling mechanism push the second coupler downward and slightly backward relative to the patient.

With the above-described configuration, in the case of a sitting motion of a patient changing their posture from a standing posture to a sitting posture, it is possible to advise the patient to perform a motion in which the patient bends their knees, by using a knee-bending adviser. Accordingly, it is possible to decrease the degree by which the patient leans forward when the patient assumes the leaning-forward posture immediately before sitting down so as to make their motion close to the motion of a healthy person, and to make the sitting motion of the patient be stably performed. Therefore, it is possible to assist the patient in sitting down in a manner similar to the sitting motion of a healthy person while allowing the patient to use the remaining muscle strength of their lower body.

According to a third aspect of the present disclosure, in the sitting motion assist system described above, the first holder extends from a back to a front of a body of the patient to hold a portion from the neck, the chest, and to sides of the patient; and the second holder holds a portion from the sides to the lower back of the patient.

With the above-described configuration, in a case of controlling the pulling mechanism coupled to the coupler, a force applied upon control is easily transmitted directly to the patient even if the patient has shoulder disabilities.

According to a fourth aspect of the present disclosure, in the sitting motion assist system described above, the first holder extends from a back to a front of a body of the patient to hold a portion from the shoulder, the chest, and to sides of the patient; and the second holder holds a portion from the sides to the lower back of the patient.

With the above-described configuration, in the case of controlling the pulling mechanism coupled to the coupler, a force applied upon control is easily transmitted directly to the patient even if the patient has neck disabilities.

According to a fifth aspect of the present disclosure, in the sitting motion assist system described above, the pulling mechanism includes an arm mechanism provided with a plurality of joints; and the sitting motion assist system further includes a walking mechanism that is provided with the arm mechanism and a pair of front wheels and a pair of rear wheels.

With the above-described configuration, the arm mechanism enables a walk towards a seat by using the walking mechanism or enables alignment with the seat.

According to a sixth aspect of the present disclosure, in the sitting motion assist system described above, one of the pulling mechanism and the second coupler includes a buckle and the other includes a buckle receptacle; and the buckle and the buckle receptacle are detachably coupled to each other.

With the above-described configuration, when a patient wearing the care belt arrives at their destination, such as a toilet, by using the sitting motion assist system, the patient can easily detach/reattach the care belt from/to the pulling mechanism.

According to a seventh aspect of the present disclosure, in the sitting motion assist system described above, the pulling mechanism includes an arm mechanism provided with a plurality of joints. The sitting motion assist system further includes a force obtainer that obtains information regarding a force externally applied to the arm mechanism; a position obtainer that obtains information regarding a position of the arm mechanism; and a motion information generator that generates motion information for the arm mechanism from the information regarding the force obtained by the force obtainer and the information regarding the position obtained by the position obtainer. The controller controls a motion of the arm mechanism on the basis of the motion information generated by the motion information generator.

With the present disclosure, it is possible to provide a sitting motion assist system in which motion information is generated so as to make a motion of a patient close to that of a healthy person in accordance with the height of the patient or the muscle strength of the lower body or the upper body of the patient, the height and the muscle strength differing depending on the patient.

According to an eighth aspect of the present disclosure, in the sitting motion assist system described above, the motion information generator generates motion information for increasing a pulling speed at which the arm mechanism pulls the second coupler downward relative to the patient after the pulling motion has been started if the force indicated by the information obtained by the force obtainer is equal to or larger than a predetermined threshold.

With the above-described configuration, it is possible to change the motion speed of the arm mechanism in accordance with the muscle strength of the lower body or the upper body of the patient, the muscle strength differing depending on the patient, and therefore, it is possible to provide assistance in accordance with the muscle strength of the lower body or the upper body of the patient, the muscle strength differing depending on the patient.

According to a ninth aspect of the present disclosure, there is provided a control method for a controller of a sitting motion assist system. The sitting motion assist system includes a care belt that includes a first holder that holds a neck or a shoulder of the patient, a second holder that holds a lower back of the patient, and a first coupler that includes a second coupler positioned on a chest of the patient and couples the first holder and the second holder in front of the patient; a pulling mechanism that is coupled to the second coupler and pulls or pushes the second coupler; and the controller that controls a pulling motion performed by the pulling mechanism. The controller of the sitting motion assist system is caused to perform control in the control method including: making, after the pulling motion by the pulling mechanism has been started, the pulling mechanism pull the second coupler downward relative to the patient;

subsequently making the pulling mechanism pull the second coupler downward and slightly forward relative to the patient; and thereafter making the pulling mechanism push the second coupler downward and slightly backward relative to the patient.

With the above-described configuration, in the case of a sitting motion of a patient changing their posture from a standing posture to a sitting posture, it is possible to decrease, by the pulling motion of the pulling mechanism, the degree by which the patient leans forward when the patient assumes the leaning-forward posture immediately before sitting down so as to make their motion close to the motion of a healthy person, and to make the sitting motion of the patient be stably performed. Therefore, it is possible to assist the patient in sitting down in a manner similar to the sitting motion of a healthy person while allowing the patient to use the remaining muscle strength of their lower body.

According to a tenth aspect of the present disclosure, there is provided a non-transitory computer-readable recording medium storing a control program for causing a device provided with a processor to perform a process. The device includes a care belt that includes a first holder that holds a neck or a shoulder of the patient, a second holder that holds a lower back of the patient, and a first coupler that includes a second coupler positioned on a chest of the patient and couples the first holder and the second holder in front of the patient; a pulling mechanism that is coupled to the second coupler and pulls or pushes the second coupler; and a controller that controls a pulling motion performed by the pulling mechanism. The controller is caused to perform control in the process including: making, after the pulling motion by the pulling mechanism has been started, the pulling mechanism pull the second coupler downward relative to the patient; subsequently making the pulling mechanism pull the second coupler downward and slightly forward relative to the patient; and thereafter making the pulling mechanism push the second coupler downward and slightly backward relative to the patient.

With the above-described configuration, in the case of a sitting motion of a patient changing their posture from a standing posture to a sitting posture, it is possible to decrease, by the pulling motion of the pulling mechanism, the degree by which the patient leans forward when the patient assumes the leaning-forward posture immediately before sitting down so as to make their motion close to the motion of a healthy person, and to make the sitting motion of the patient be stably performed. Therefore, it is possible to assist the patient in sitting down in a manner similar to the sitting motion of a healthy person while allowing the patient to use the remaining muscle strength of their lower body.

According to an eleventh aspect of the present disclosure, there is provided a control method for a controller of a sitting motion assist system. The sitting motion assist system includes a care belt that includes a first holder that holds a neck or a shoulder of the patient, a second holder that holds a lower back of the patient, and a first coupler that includes a second coupler positioned on a chest of the patient and couples the first holder and the second holder in front of the patient; a pulling mechanism that is coupled to the second coupler and pulls or pushes the second coupler; the controller that controls a pulling motion performed by the pulling mechanism; and a presenter that, after the pulling motion by the pulling mechanism has been started, presents, to the patient, knee-bending advice by using flashing light, lighting, or a sound. The controller of the sitting motion assist system is caused to perform control in the control method including: making, after the pulling motion has been started, the presenter present the knee-bending advice by using flashing light, lighting, or a sound; subsequently making the pulling mechanism pull the second coupler downward and slightly forward relative to the patient; and thereafter making the pulling mechanism push the second coupler downward and slightly backward relative to the patient.

With the above-described configuration, in the case of a sitting motion of a patient changing their posture from a standing posture to a sitting posture, it is possible to advise the patient to perform a motion in which the patient bends their knees, by using a knee-bending adviser. Accordingly, it is possible to decrease the degree by which the patient leans forward when the patient assumes the leaning-forward posture immediately before sitting down so as to make their motion close to the motion of a healthy person. Therefore, it is possible to assist the patient in sitting down in a manner similar to the sitting motion of a healthy person while allowing the patient to use the remaining muscle strength of their lower body.

According to a twelfth aspect of the present disclosure, there is provided a non-transitory computer-readable recording medium storing a control program for causing a device provided with a processor to perform a process. The device includes a care belt that includes a first holder that holds a neck or a shoulder of the patient, a second holder that holds a lower back of the patient, and a first coupler that includes a second coupler positioned on a chest of the patient and couples the first holder and the second holder in front of the patient; a pulling mechanism that is coupled to the second coupler and pulls or pushes the second coupler; a controller that controls a pulling motion performed by the pulling mechanism; and a presenter that, after the pulling motion by the pulling mechanism has been started, presents, to the patient, knee-bending advice by using flashing light, lighting, or a sound. The controller is caused to perform control in the process including: making, after the pulling motion has been started, the presenter present the knee-bending advice by using flashing light, lighting, or a sound; subsequently making the pulling mechanism pull the second coupler downward and slightly forward relative to the patient; and thereafter making the pulling mechanism push the second coupler downward and slightly backward relative to the patient.

With the above-described configuration, in the case of a sitting motion of a patient changing their posture from a standing posture to a sitting posture, it is possible to advise the patient to perform a motion in which the patient bends their knees, by using a knee-bending adviser. Accordingly, it is possible to decrease the degree by which the patient leans forward when the patient assumes the leaning-forward posture immediately before sitting down so as to make their motion close to the motion of a healthy person. Therefore, it is possible to assist the patient in sitting down in a manner similar to the sitting motion of a healthy person while allowing the patient to use the remaining muscle strength of their lower body.

According to a thirteenth aspect of the present disclosure, there is provided a care belt to be put on a patient for holding an upper body of the patient when a helper assists a motion of the patient changing a posture thereof from a standing posture to a sitting posture, the care belt including: a first holder that holds a neck or a shoulder of the patient; a second holder that holds a lower back of the patient; and a plurality of couplers that are positioned on a chest of the patient and couple the first holder and the second holder in front of the patient. The plurality of couplers include a coupler that is curved in a "U" shape.

With the above-described configuration, a helper can assist a patient in sitting down in a manner similar to the sitting motion of a healthy person while allowing the patient to use the remaining muscle strength of their lower body.

According to a fourteenth aspect of the present disclosure, there is provided a care belt wearable by a patient, the care belt including: a first holder that holds a neck or a shoulder of the patient; a second holder that holds a lower back of the patient; a first coupler that couples the first holder and the second holder in front of the patient; and a second coupler that is positioned on a chest of the patient and is capable of being coupled to a pulling mechanism. The second coupler includes a buckle receptacle having a through hole; the pulling mechanism includes a buckle including a fastener; and the care belt and the pulling mechanism are coupled to each other by using the fastener and the through hole.

With the above-described configuration, in the case of a sitting motion of a patient changing their posture from a standing posture to a sitting posture, it is possible to advise the patient to perform a motion in which the patient bends their knees, by using a knee-bending adviser. Accordingly, it is possible to decrease the degree by which the patient leans forward when the patient assumes the leaning-forward posture immediately before sitting down so as to make their motion close to the motion of a healthy person, and to make the sitting motion of the patient be stably performed. Therefore, it is possible to assist the patient in sitting down in a manner similar to the sitting motion of a healthy person while allowing the patient to use the remaining muscle strength of their lower body.

According to a fifteenth aspect of the present disclosure, in the care belt described above, the first coupler is formed of a material having elasticity lower than elasticity of the first holder and the second holder.

With the above-described configuration, in a case of pulling by the pulling mechanism, it is possible to prevent the coupler from being stretched. Therefore, it is possible to provide a care belt with which an external force applied from the pulling mechanism can be transmitted via the hold mechanism with more certainty.

According to a sixteenth aspect of the present disclosure, in the care belt described above, the second coupler is formed of a material that is harder than a material of the first coupler.

With the above-described configuration, a care belt can be provided with which, in the case of pulling by the pulling mechanism, it is possible to prevent the second coupler from being stretched and from being destroyed by an external force applied from the pulling mechanism. The second coupler is a portion to which a large external force is repeatedly applied from the pulling mechanism, and therefore, may have the above-described configuration.

According to a seventeenth aspect of the present disclosure, there is provided a robot including: an arm mechanism that is connected to a coupler included in a supporter put on a user and that moves the coupler in a direction of an x axis and/or in a direction of a z axis; and a controller that controls the arm mechanism on the basis of data held in a motion information database and including times and desired coordinate values at the times. The times respectively correspond to the desired coordinate values; each of the desired coordinate values indicates a desired position related to the arm mechanism at a corresponding one of the times; the x axis and the z axis are parallel to a virtual plane on which an arm included in the arm mechanism moves, the x axis and the z axis are orthogonal to each other, and the z axis is perpendicular to a plane on which the robot is put; a direction extending from the plane on which the robot is put towards the robot is a positive direction of the z axis; a direction extending from a proximal end of the arm mechanism towards the coupler is a positive direction of the x axis; for times from t1 to t3 among the times, z-axis coordinate values of corresponding ones of the desired coordinate values are set so as to decrease; for times from t1 to t2 among the times, x-axis coordinate values of corresponding ones of the desired coordinate values are set so as to decrease; for times from t2 to t3 among the times, x-axis coordinate values of corresponding ones of the desired coordinate values are set so as to increase; and t1<t2<t3 is satisfied.

According to an eighteenth aspect of the present disclosure, in the robot described above, the supporter includes a left shoulder unit that have a portion extending along a left shoulder of the user on which the supporter is put; a right shoulder unit that have a portion extending along a right shoulder of the user on which the supporter is put; a left lower-back unit that have a portion extending along a left lower-back of the user on which the supporter is put; a right lower-back unit that have a portion extending along a right lower-back of the user on which the supporter is put; a connecting area that is connected to the left shoulder unit, the right shoulder unit, the left lower-back unit, and the right lower-back unit and that have a portion extending along a back of the user on which the supporter is put; and the coupler. The left shoulder unit, the right shoulder unit, the left lower-back unit, and the right lower-back unit are connected to the coupler; and the user is positioned between the coupler and the connecting area in a case where the supporter is put on the user.

Underlying Knowledge Forming Basis of the Present Disclosure

Figure 25A:
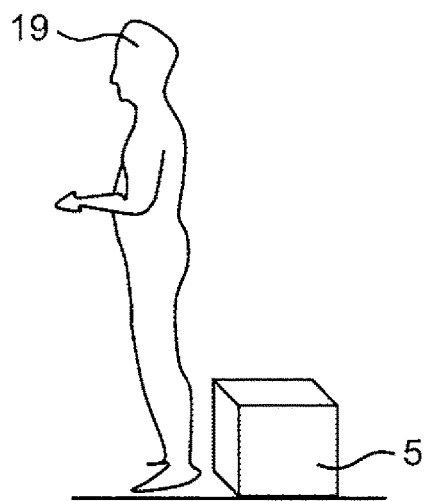
FIG. 25A is a diagram illustrating a motion of a healthy person changing their posture from a standing posture to a sitting posture.
Figure 25B:
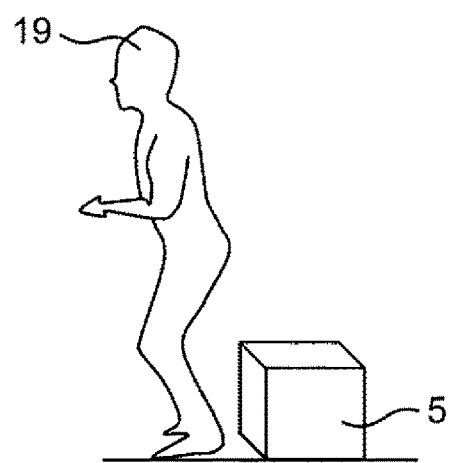
FIG. 25B is a diagram illustrating a motion of a healthy person changing their posture from a standing posture to a sitting posture.
Figure 25C:
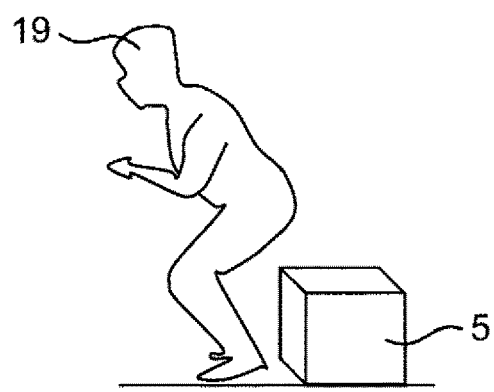
FIG. 25C is a diagram illustrating a motion of a healthy person changing their posture from a standing posture to a sitting posture.
Figure 25D:
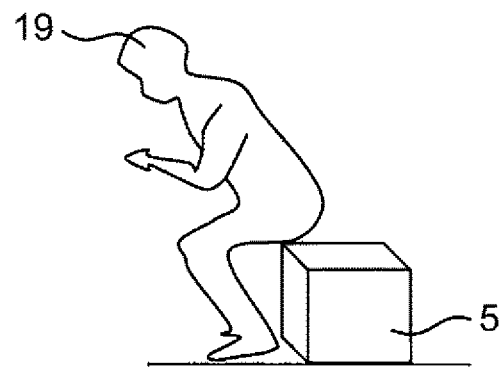
FIG. 25D is a diagram illustrating a motion of a healthy person changing their posture from a standing posture to a sitting posture.
Figure 25E:
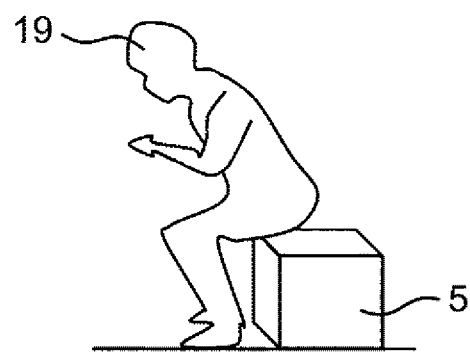
FIG. 25E is a diagram illustrating a motion of a healthy person changing their posture from a standing posture to a sitting posture.
Figure 25F:
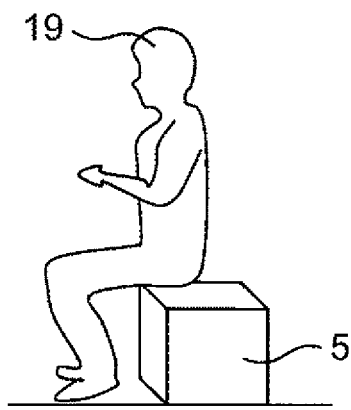
FIG. 25F is a diagram illustrating a motion of a healthy person changing their position from a standing position to a sitting position.

FIGS. 25A to 25F illustrate the motions of a healthy person 19 changing their state from a standing-posture state where the healthy person 19 is standing to a sitting-posture state where the healthy person 19 is sitting on a seat 5. The healthy person 19 in a standing-posture state first lowers their torso by bending their knees, as illustrated in FIGS. 25A and 25B, and thereafter moves their center of gravity forward by making their upper body lean forward, as illustrated in FIGS. 25C and 25D, and moves their buttocks to the seat 5 while moving their upper body backward, as illustrated in FIGS. 25E and 25F.

Figure 24A:
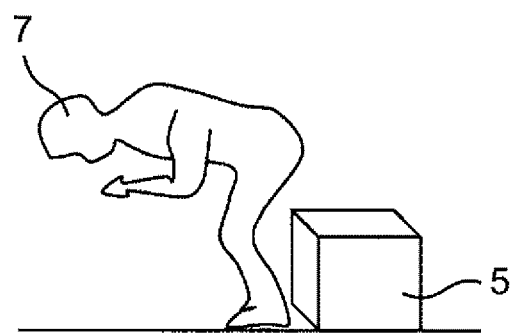
FIG. 24A is a diagram illustrating a motion of an elderly person changing their posture from a standing posture to a sitting posture.
Figure 24B:
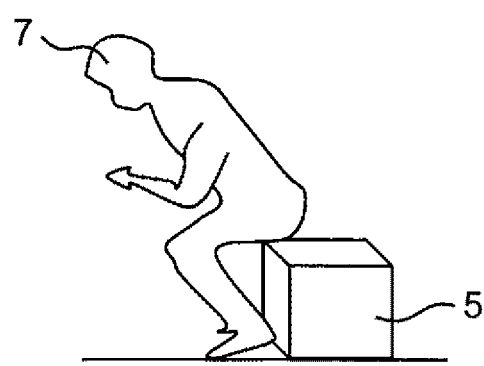
FIG. 24B is a diagram illustrating a motion of an elderly person changing their posture from a standing posture to a sitting posture.

Most patients move at a low speed because of muscle weakness. Therefore, as illustrated in FIG. 24A or 24B, a patient 7 assumes a low leaning-forward posture and moves their center of gravity forward, before making their buttocks settle on the seat 5. Therefore, the distance to the seat 5 is longer than that of a healthy person. As a result, there may be a case where the patient 7 is unable to bear their weight with their lower body, accidentally slams their buttocks on the seat 5, and breaks a bone of their buttocks. Further, the patient 7 assumes a low leaning-forward posture, and therefore, may stumble and fall forward.

However, the transfer assist apparatus disclosed by Japanese Unexamined Patent Application Publication No. 2010-119564 unconditionally lifts a patient and thereafter makes the patient sit down without providing assistance based on the sitting motions of a healthy person, as illustrated in FIGS. 25A to 25F.

Here, it is desirable to provide assistance so as to prevent the remaining muscle strength of the lower body of a patient from weakening by allowing the patient to use the remaining muscle strength of their lower body and adding a force to compensate for the shortage. Accordingly, motion assistance is necessary that can make a patient sit down in a manner such that the patient puts their feet on the ground as firmly as possible, assumes a standing posture, lowers their torso, and thereafter assumes a leaning-forward posture, and sits on a seat behind the patient as in the sitting motions of a healthy person.

Figure 24C:
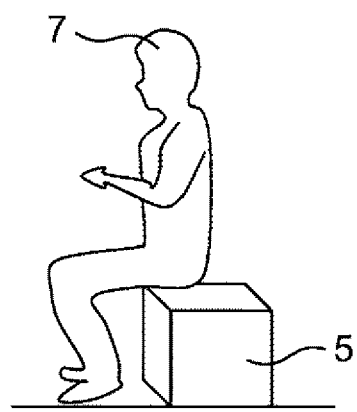
FIG. 24C is a diagram illustrating a motion of an elderly person changing their posture from a standing posture to a sitting posture.

Further, in the case where the patient 7 developing muscle weakness assumes a low leaning-forward posture and sits down, as illustrated in FIGS. 24A to 24C, a half-sitting state lasts long, and therefore, the patient 7 bears a heavy load on their lower body. Further, in the case of a low leaning-forward posture, their line of sight is often turned to the ground, and therefore, the line of sight moves before the patient 7 sits down and the patient 7 tends to feel giddy or shaky, which is an issue.

Here, the inventors first find that it is difficult for a patient to know the timing at which the patient is to bend their knees when performing a sitting motion in which the patient changes their posture from a standing posture to a sitting posture.

Accordingly, the inventors find that, if a knee-bending adviser advises the patient of the knee-bending timing so as to encourage the patient to bend their knees at the beginning of the sitting motion, it is possible to decrease the degree by which the patient leans forward when the patient assumes the leaning-forward posture immediately before sitting down so as to make their motion close to the motion of a healthy person, and to make the sitting motion of the patient be stably performed.

Now, a sitting motion assist system and so on according to embodiments of the present disclosure is described in detail below.

First Embodiment

Figure 1B:
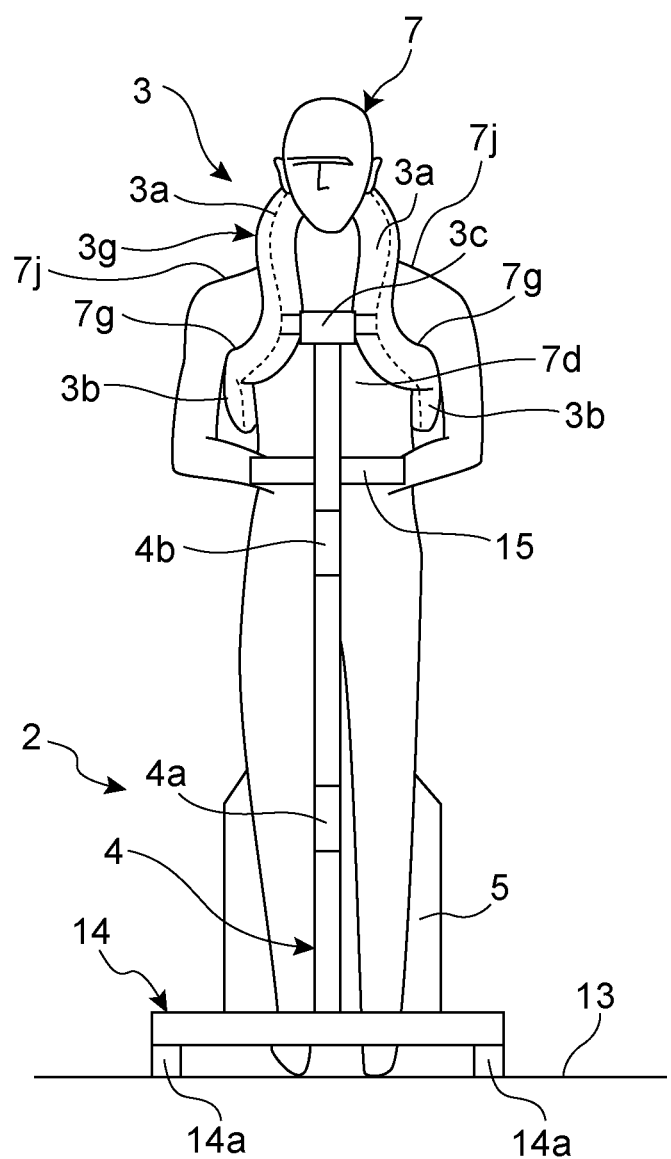
FIG. 1B is a front view schematically illustrating the configuration of the robot in a state where a patient is assuming a standing posture in the robot system according to the first embodiment of the present disclosure, together with the patient.
Figure 1C:
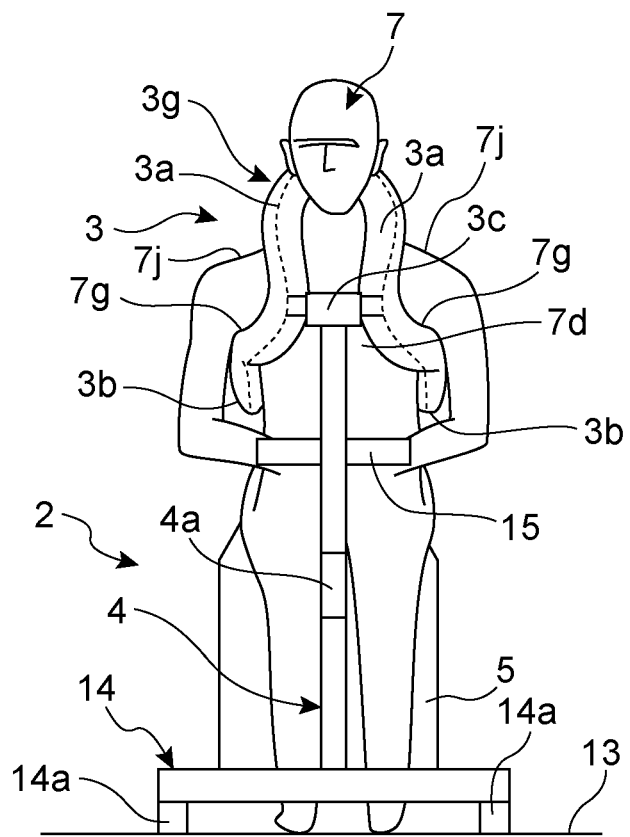
FIG. 1C is a front view schematically illustrating the configuration of the robot in a state where a patient is assuming a sitting posture in the robot system according to the first embodiment of the present disclosure, together with the patient.
Figure 1D:
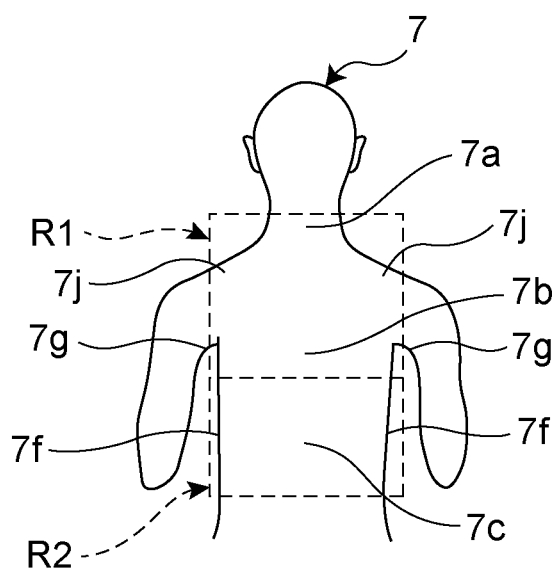
FIG. 1D is an explanatory diagram for illustrating a positional relationship between a care belt of the robot system according to the first embodiment of the present disclosure and the body of a patient.
Figure 2:
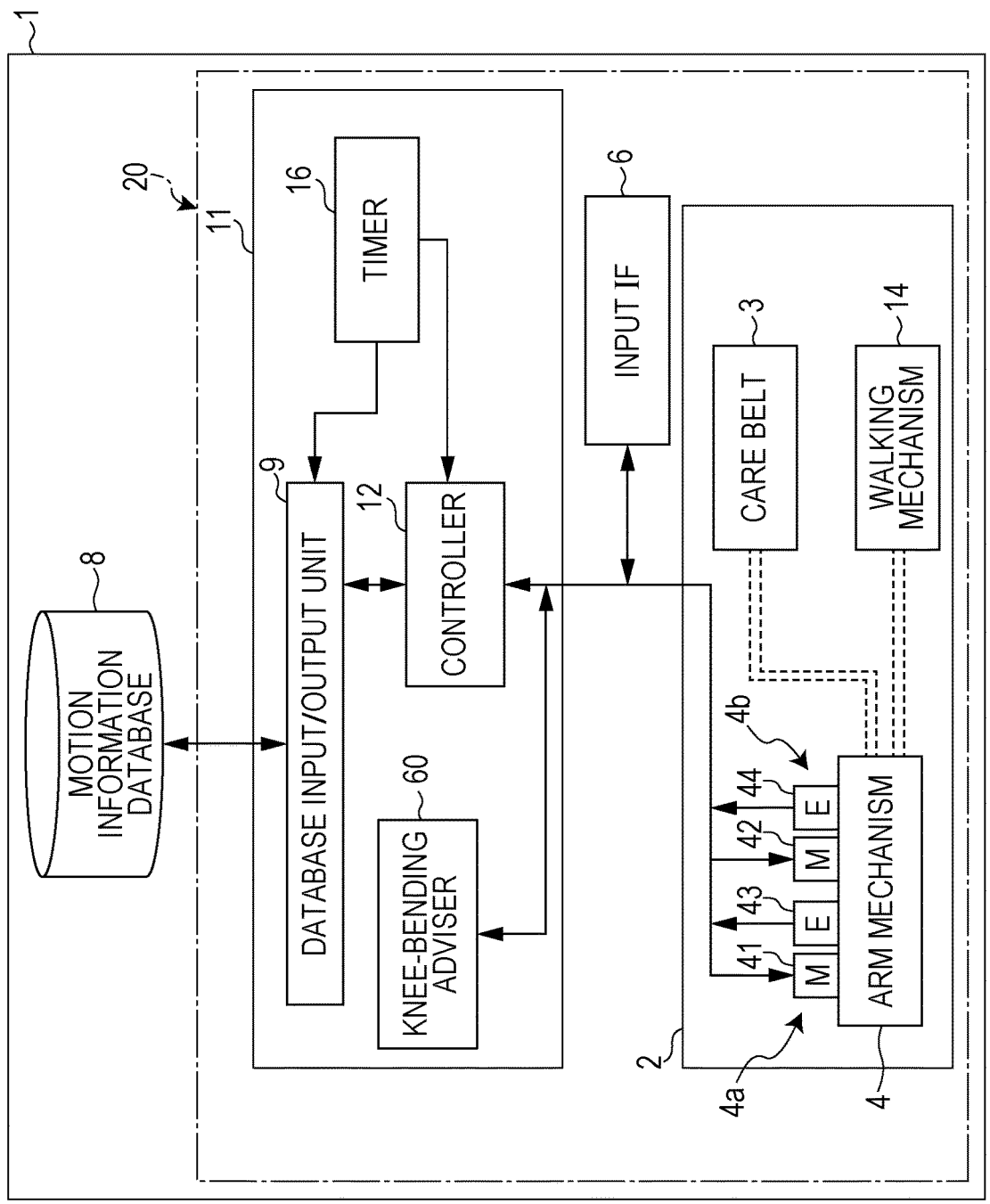
FIG. 2 is a block diagram illustrating a detailed configuration of the robot system according to the first embodiment of the present disclosure.
Figure 3A:
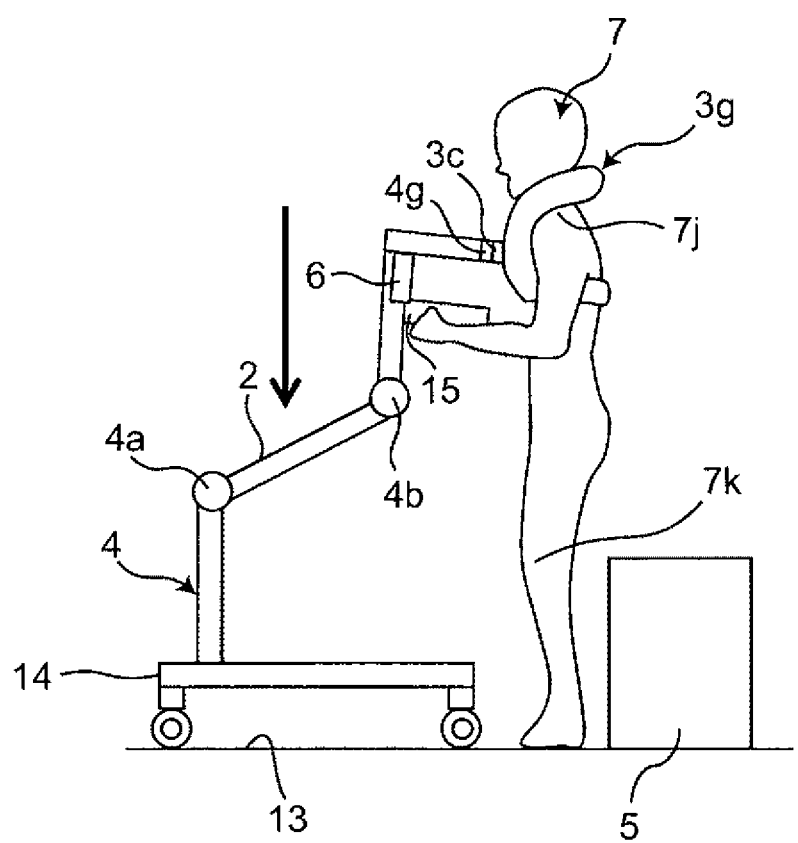
FIG. 3A is a diagram schematically illustrating a motion of the robot system according to the first embodiment of the present disclosure.
Figure 3B:
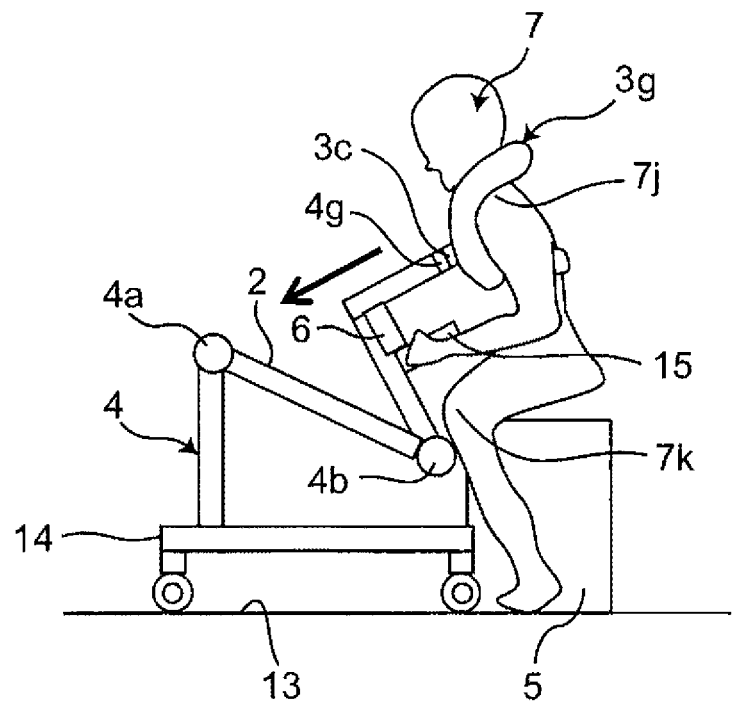
FIG. 3B is a diagram schematically illustrating a motion of the robot system according to the first embodiment of the present disclosure.
Figure 3C:
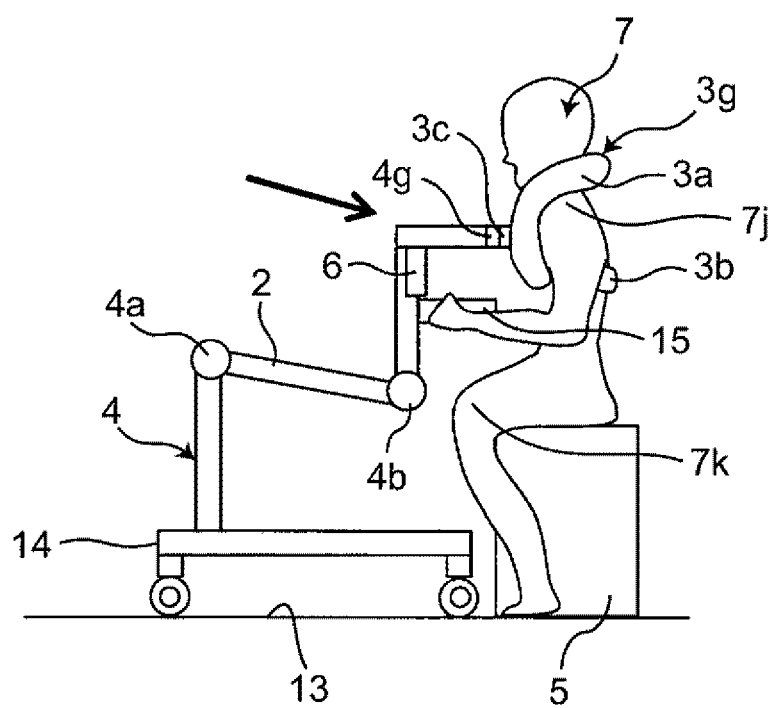
FIG. 3C is a diagram schematically illustrating a motion of the robot system according to the first embodiment of the present disclosure.

FIG. 1A and FIG. 1B are a side view and a front view respectively and illustrate a robot 20 that assists a sitting motion of the patient 7 changing their state from a standing-posture state to a sitting-posture state, which is an example operation using a robot system 1, the robot system 1 being an example of a sitting motion assist system (that is, a sitting motion assist apparatus) according to a first embodiment of the present disclosure. The patient 7 sits on the seat 5 that is put on a floor 13 to assume a sitting posture. FIG. 1D is an explanatory diagram for illustrating a positional relationship between a care belt 3 of the robot system 1 and the body of the patient 7. FIGS. 1B and 1C are front views of the robot system illustrated in FIG. 1A. FIGS. 1A and 1C illustrate a sitting state, and FIG. 1B is a front view of the robot system 1 in a state where the patient 7 is in a standing state. FIG. 2 is a block diagram illustrating a detailed configuration of the robot system 1 according to the first embodiment. FIGS. 3A to 3C are diagrams schematically illustrating the motions of the robot system 1 according to the first embodiment of the present disclosure.

As illustrated in FIGS. 1A to 1C and FIG. 2, the robot system 1 is an example of a sitting motion assist system for assisting a sitting motion of the patient 7 and includes the robot 20. In the robot system 1, a motion information database 8 is provided outside the robot 20, as illustrated in FIG. 2. Although not specifically illustrated, the motion information database 8 may be provided inside the robot 20.

The robot 20 is put on the floor 13 and includes a main mechanism 2, a control apparatus 11, and an input interface (IF) 6.

The main mechanism 2 includes an arm mechanism 4, the care belt 3, and a walking mechanism 14. The arm mechanism 4 at least includes a robot arm, which is an example of a pulling mechanism.

Care Belt 3

The care belt 3 includes a hold mechanism 3g and a coupler 3c and can be put on the patient 7, as illustrated in FIGS. 1A to 1C. The hold mechanism 3g at least includes a first holder 3a that holds the neck 7a and shoulders 7j of the patient 7, and a second holder 3b that holds the lower back 7c of the patient 7. More specifically, the hold mechanism 3g includes the first holder 3a capable of holding a first region R1 that corresponds to the neck 7a, the shoulders 7j, or the neck 7a and shoulders 7j of the patient 7, and the second holder 3b capable of holding a second region R2 that corresponds to the lower back 7c of the patient 7. For example, the hold mechanism 3g includes the first holder 3a capable of holding a portion extending from the first region R1 that corresponds to the neck 7a, the shoulders 7j around the shoulder blades, or the neck 7a and shoulders 7j around the shoulder blades of the patient 7 to the chest 7d of the patient 7, and the second holder 3b capable of holding a portion extending from the chest 7d of the patient 7 to the second region R2 that corresponds to the lower back 7c via the sides 7g of the patient 7, as illustrated in FIG. 1D.

The coupler 3c includes a second coupler 3cb (not specifically illustrated in FIGS. 1A to 1C) that is positioned on the chest 7d of the patient 7, and a first coupler 3ca (not specifically illustrated in FIGS. 1A to 1C) that couples the first holder 3a and the second holder 3b in front of the patient 7. For example, the coupler 3c can be positioned on the chest 7d (that is, in the vicinity of the chest 7d, in other words, on the chest 7d and the peripheral portion thereof) of the patient 7 when the hold mechanism 3g is put on the patient 7, is coupled to the hold mechanism 3g, and can be detachably coupled to one end (for example, the rear end) of the arm mechanism 4 described below. Here, the chest 7d means the chest 7d and the peripheral portion thereof (for example, the chest 7d, the peripheral portion thereof, and an area within a predetermined distance (for example, 30 cm) from the chest 7d towards the front).

Figure 4A:
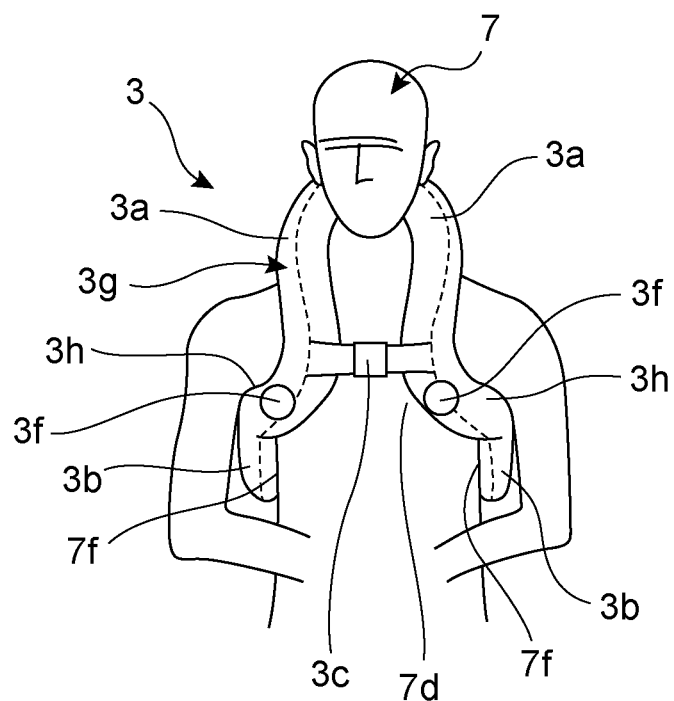
FIG. 4A is a front view illustrating a detailed configuration of a hold mechanism according to the first embodiment of the present disclosure in a state where the hold mechanism is put on a patient.
Figure 4B:
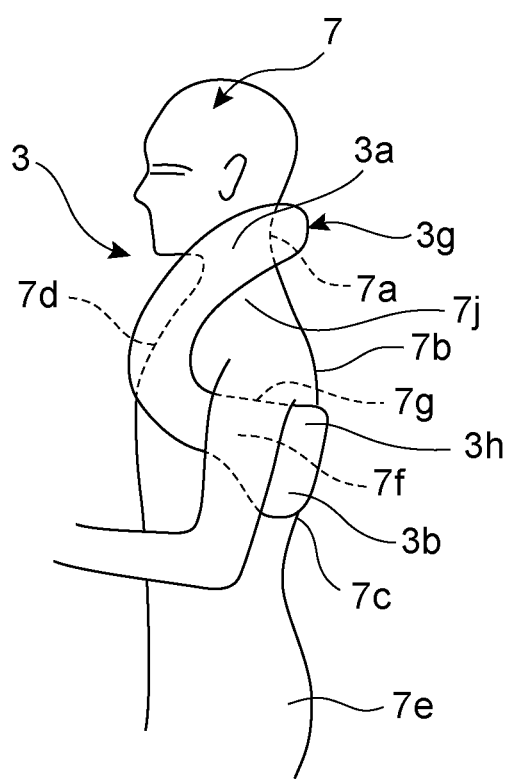
FIG. 4B is a left side view illustrating the detailed configuration of the hold mechanism according to the first embodiment of the present disclosure in the state where the hold mechanism is put on a patient.

A more specific example of the hold mechanism 3g is illustrated in FIGS. 4A and 4B. FIGS. 1A to 1D illustrate a state of the robot system 1 where the hold mechanism 3g illustrated in FIGS. 4A to 4C is put on the patient 7.

Figure 4C:
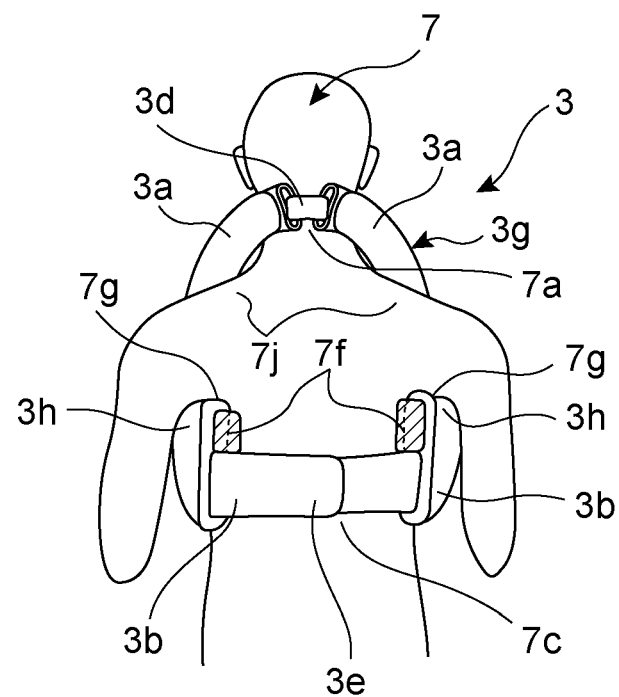
FIG. 4C is a back view illustrating the detailed configuration of the hold mechanism according to the first embodiment of the present disclosure in the state where the hold mechanism is put on a patient.

The first holder 3a of the hold mechanism 3g illustrated in FIGS. 4A to 4C is formed of a sealed tubular member in an upside-down "U" shape when viewed from the front of the patient 7. That is, the first holder 3a is disposed such that the first holder 3a extends from the back of the body of the patient 7 towards the front, that is, extends from the first region R1 that corresponds to the neck 7a and the shoulders 7j, goes over the front of the shoulders 7j and the chest 7d, extends downward, and reaches the sides 7g (or the front of the sides 7g) so that at least the first region R1 of their back 7b can be held. In other words, in order to allow the patient 7 to easily bend their knees 7k in a case of pulling the patient 7 downward and in order to easily encourage the patient 7 to make their upper body bend backward in a case of pulling forward and obliquely downward and thereafter pushing backward, it is necessary to wrap the first holder 3a around the first region R1 that corresponds to the neck 7a or the shoulders 7j to hold the upper body of the patient 7 with the first holder 3a. Accordingly, the sealed tubular member in an upside-down "U" shape, which is the first holder 3a, is disposed such that the sealed tubular member is wrapped around the first region R1 that includes the back side of the neck 7a, and the ends of the tubular member respectively go over the front of the shoulders 7j and the chest 7d and extend to the sides 7g (or the front of the sides 7g).

Meanwhile, the second holder 3b is formed of a sealed tubular member in a "U" shape that projects backward from the respective sides of the front of the patient 7 when viewed from above the patient 7. That is, the second holder 3b is disposed such that the ends of the sealed tubular member in a "U" shape of the second holder 3b are respectively coupled to the ends of the first holder 3a on the sides 7g of the patient 7, and that the tubular member is wrapped around a portion from the sides 7g to the second region R2 in the vicinity of the lower back 7c. In other words, in order to easily make the pelvis of the patient 7 tilt forward in a case of pulling the patient 7 forward immediately before the patient 7 sits down, it is necessary to wrap the second holder 3b around the second region R2 in the vicinity of the lower back 7c to hold the lower back and the vicinity thereof of the patient 7 with the second holder 3b. Accordingly, the sealed tubular member in a "U" shape, which is the second holder 3b, is disposed such that the sealed tubular member is wrapped around the portion from the sides 7g to the second region R2 in the vicinity of the lower back 7c to cover the second region R2 in the vicinity of the lower back 7c. The first holder 3a and the second holder 3b are connected to each other and form a tubular member having sealed space.

The first holder 3a and the second holder 3b are formed by using polyvinyl chloride or nylon outer sheaths and filling the sealed tubular members with air, for example. Further, the first holder 3a and the second holder 3b each include a valve 3f for supplying air to fill the sealed tubular member.

Note that, the first holder 3a and the second holder 3b are filled with air in the example described above; however, the first holder 3a and the second holder 3b may be structured such that the first holder 3a and the second holder 3b are filled with a flexible material, such as a urethane material, instead of being filled with air. In this case, the valve 3f for supplying air is not necessary. As described above, in the case where the first holder 3a and the second holder 3b are structured such that the first holder 3a and the second holder 3b are each filled with a flexible substance, in a case of operating and controlling the arm mechanism 4 coupled to the coupler 3c, the flexible substance contained in the first holder 3a and the second holder 3b fits the body, and a force applied upon control is easily transmitted directly to the patient 7.

The coupler 3c is coupled to one end of the arm mechanism 4, as illustrated in FIGS. 1A to 1C, for example, and is disposed in the vicinity of the center of the chest 7d of the patient 7 and in the vicinity of the midpoint between the first holder 3a and the second holder 3b.

The coupler 3c and one end of the arm mechanism 4 are fixed and coupled to each other by using a screw, for example; however, any method may be used as long as one end of the arm mechanism 4 and the coupler 3c can be coupled to each other with the method.

Figure 23A:
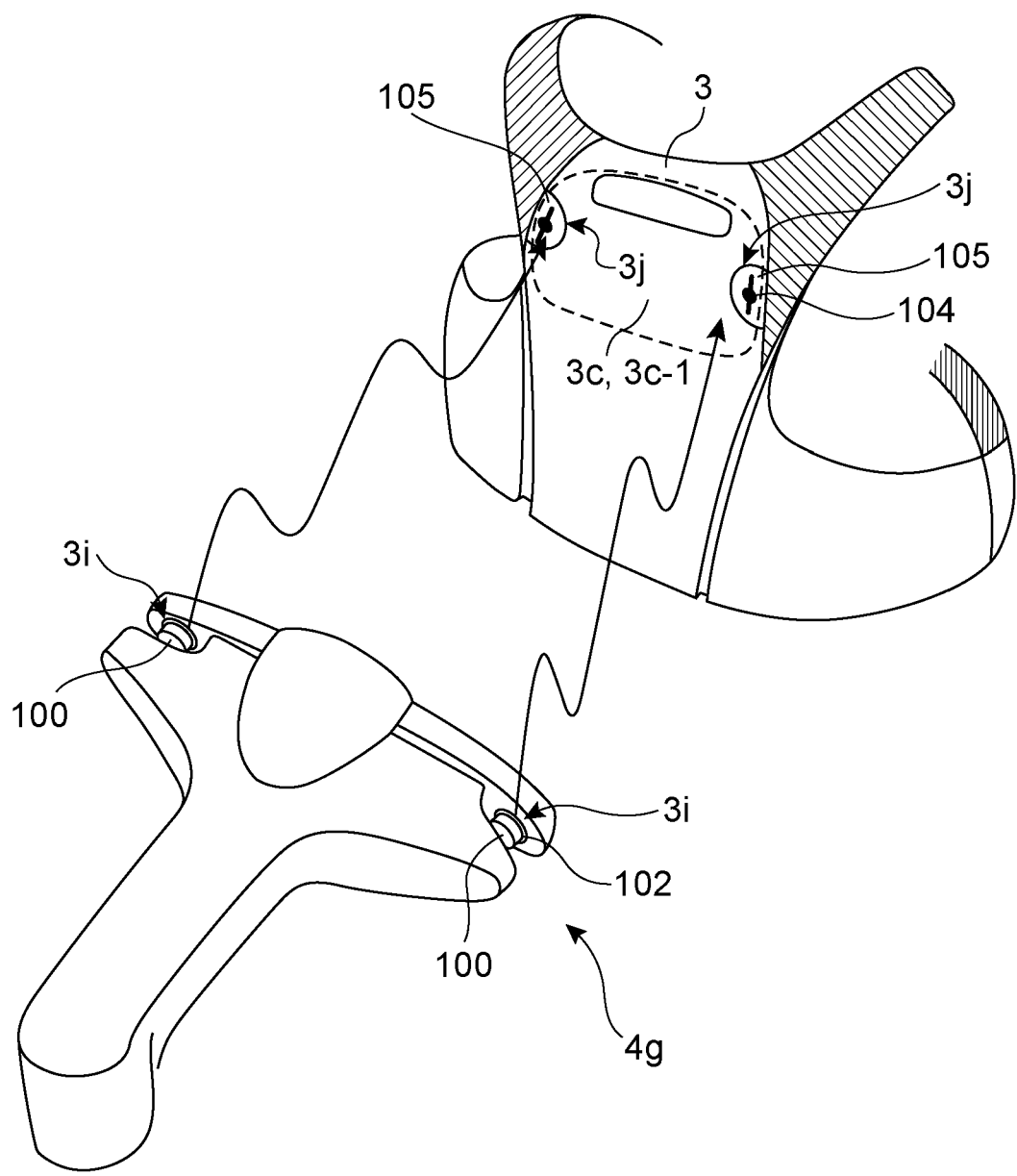
FIG. 23A is a front view illustrating a detailed configuration of a coupling mechanism of the hold mechanism according to the first embodiment of the present disclosure.
Figure 23B:
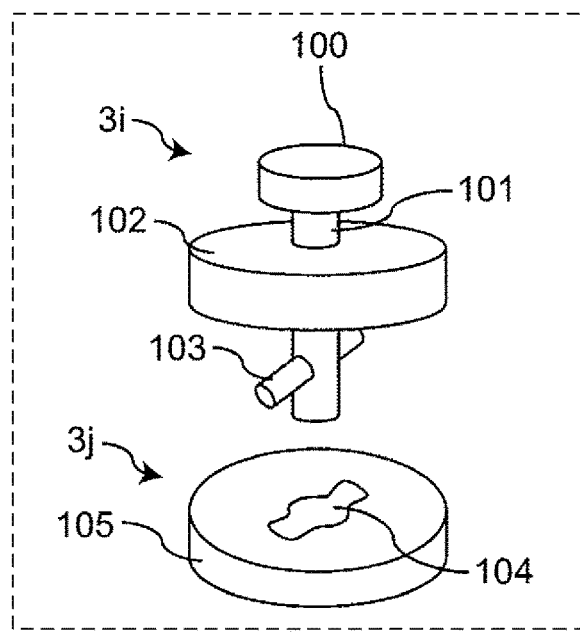
FIG. 23B is a perspective view illustrating a detailed configuration of a buckle and a buckle receptacle of the coupling mechanism illustrated in FIG. 23A.
Figure 23C:
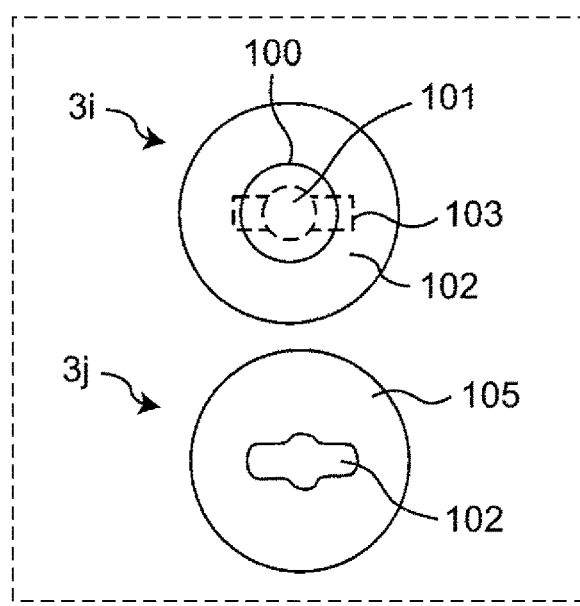
FIG. 23C is a plan view illustrating the detailed configuration of the buckle and the buckle receptacle of the coupling mechanism illustrated in FIG. 23A.
Figure 23D:
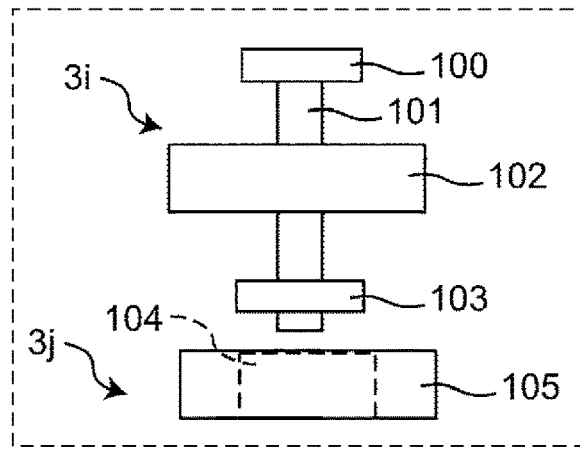
FIG. 23D is a side view illustrating the detailed configuration of the buckle and the buckle receptacle of the coupling mechanism illustrated in FIG. 23A.
Figure 23E:
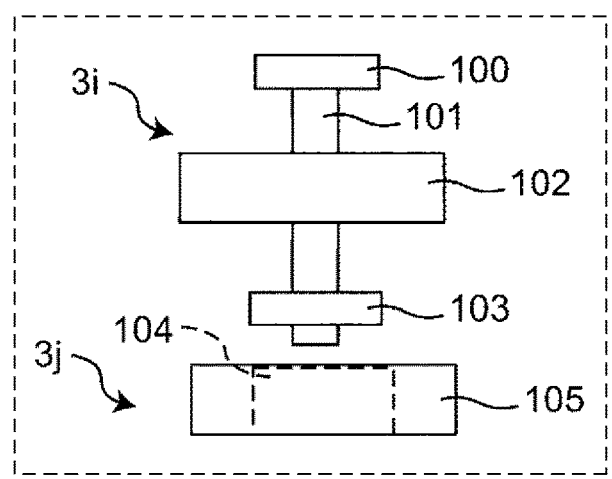
FIG. 23E is an explanatory diagram illustrating a state where the buckle of the coupling mechanism illustrated in FIG. 23A is inserted into the buckle receptacle.
Figure 23F:
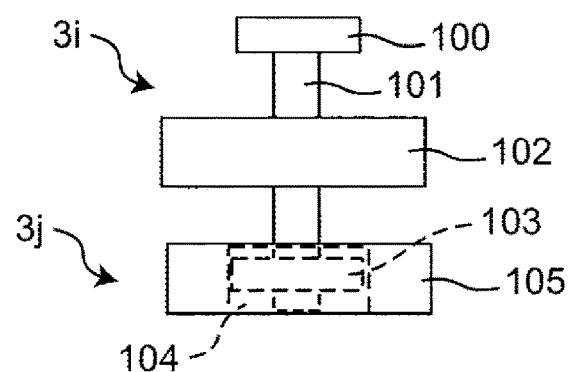
FIG. 23F is an explanatory diagram illustrating a state where the buckle of the coupling mechanism illustrated in FIG. 23A is inserted into the buckle receptacle.
Figure 23G:
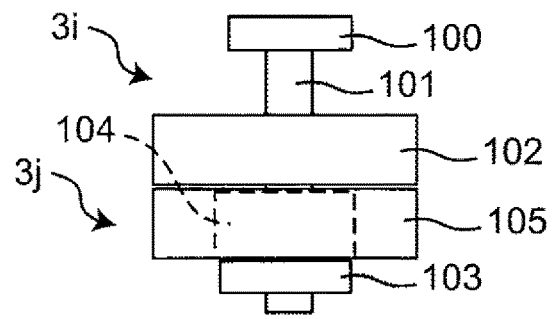
FIG. 23G is an explanatory diagram illustrating a state where the buckle of the coupling mechanism illustrated in FIG. 23A is inserted into the buckle receptacle.
Figure 23H:
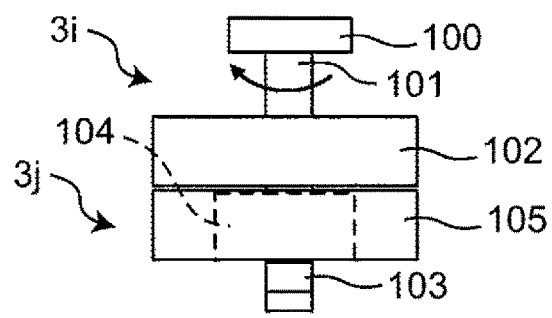
FIG. 23H is an explanatory diagram illustrating a state where the buckle of the coupling mechanism illustrated in FIG. 23A is inserted into the buckle receptacle.
Figure 23I:
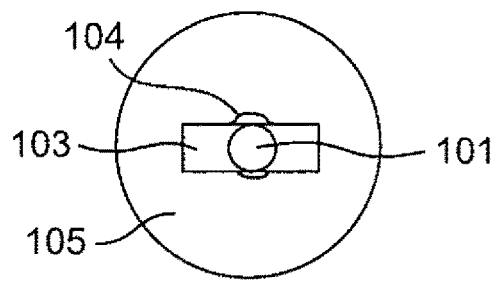
FIG. 23I is a bottom view illustrating the state illustrated in FIG. 23G where the buckle of the coupling mechanism is inserted into the buckle receptacle.
Figure 23J:
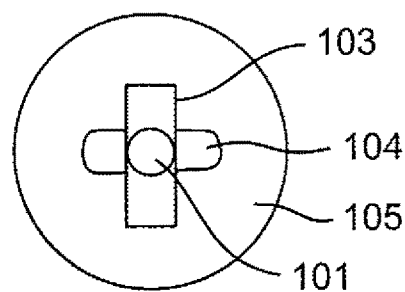
FIG. 23J is a bottom view illustrating the state illustrated in FIG. 23H where the buckle of the coupling mechanism is inserted into the buckle receptacle.

For example, buckles 3i and buckle receptacles 3j, as illustrated in FIG. 23A, may be used, and the buckles 3i provided at one end of the arm mechanism 4 and the buckle receptacles 3j provided at the coupler 3c are coupled to each other so as to be easily detachable.

Specifically, the buckles 3i are provided at one of the one end of the arm mechanism 4 and the coupler 3c, and the buckle receptacles 3j are provided at the other at positions facing the buckles 3i.

As illustrated in FIGS. 23A to 23D, each of the buckles 3i is configured such that an operation portion 100 is fixed to one end of a cylindrical shaft portion 101, the shaft portion 101 freely penetrates a disk-like shaft fixing portion 102, and a fastener 103 is fixed to a portion near the other end of the shaft portion 101 so as to project from the sides of the shaft portion 101 in the diameter direction. The shaft fixing portion 102 is fixed to one end of the arm mechanism 4.

Each of the buckle receptacles 3j is formed of a disk-like holding and fixing portion 105 having a through hole 104 through which the shaft portion 101 and the fastener 103 penetrate. The holding and fixing portion 105 is fixed to the coupler 3c.

Therefore, when the operation portion 100 of the buckle 3i is rotated, the shaft portion 101 rotates relative to the shaft fixing portion 102, and the fastener 103 rotates together with the shaft portion 101, as illustrated in FIGS. 23E to 23J. Accordingly, the shaft portion 101 and the fastener 103 of the buckle 3i are rotated so as to fit in the through hole 104 of the buckle receptacle 3j, the shaft portion 101 and the fastener 103 of the buckle 3i are thereafter made to penetrate the through hole 104 of the buckle receptacle 3j (see FIGS. 23G and 23I), and the operation portion 100 is rotated 90 degrees, for example. Then, the fastener 103 engages the holding and fixing portion 105 and does not come out of the through hole 104. As a result, the buckle 3i is attached to the buckle receptacle 3j (see FIGS. 23H and 23J). Meanwhile, the operation portion 100 is further rotated 90 degrees, for example, the shaft portion 101 and the fastener 103 of the buckle 3i are rotated so as to fit in the through hole 104 of the buckle receptacle 3j (see FIGS. 23G and 23I), and the shaft portion 101 and the fastener 103 of the buckle 3i are pulled out of the through hole 104 of the buckle receptacle 3j. As a result, the buckle 3i is detached from the buckle receptacle 3j.

In doing so, the buckles 3i provided at one end of the arm mechanism 4 and the buckle receptacles 3j provided at the coupler 3c are coupled to each other so as to be easily detachable.

Figure 23K:
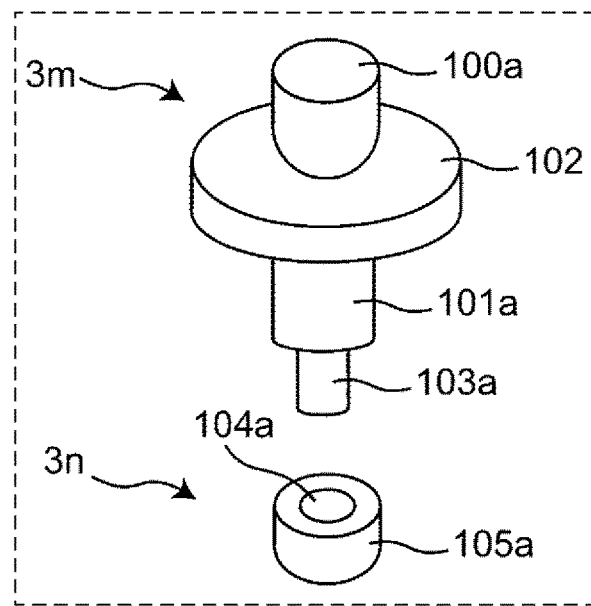
FIG. 23K is a perspective view illustrating a detailed configuration of a buckle and a buckle receptacle of a coupling mechanism in a hold mechanism according to a modification of the first embodiment of the present disclosure.
Figure 23L:
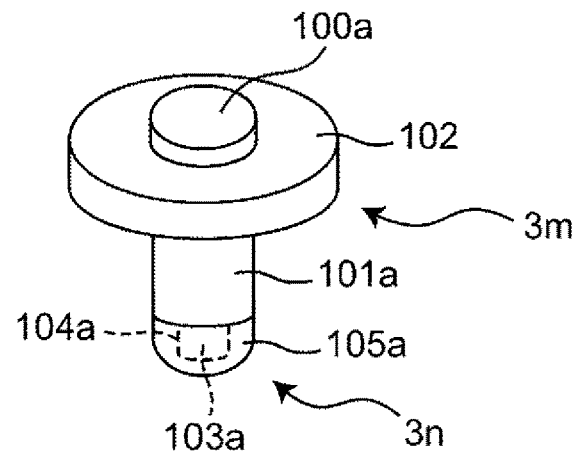
FIG. 23L is a perspective view illustrating a state where the buckle and the buckle receptacle engage each other in the coupling mechanism of the hold mechanism illustrated in FIG. 23K.

The above-described example is not restrictive, and a modification using a buckle 3m and a buckle receptacle 3n as illustrated in FIGS. 23K and 23L can be employed, for example. In this example, when an operation portion (for example, a button) 100a of the buckle 3m is simply pushed down in the axial direction of a shaft portion 101a, the tip of the shaft portion 101a is attached and fixed to a recess 104a of a cap-like holding and fixing portion 105a of the buckle receptacle 3n. The fixing method using the operation portion 100a is such that a ball is provided inside a fastener 103a, and the ball pushed out by the operation portion 100a engages and is fixed to the inside of the recess 104a of the holding and fixing portion 105a, for example. In a case of detaching the buckle 3m from the buckle receptacle 3n, the operation portion 100a is pushed down again. Then, the ball comes into the operation portion 100a, the engagement with the inside of the recess 104a is released, and the operation portion 100a is pushed up in the axial direction of the shaft portion 101a with a force applied by a spring.

With the structures described above, in a case where the patient 7 wants to move to a toilet urgently, for example, the care belt 3 is put on the patient 7 in advance, and can be easily detached from the robot system 1 in a short time by using the buckles 3i and the buckle receptacles 3j when the patient 7 moves to and sits on the toilet.

Note that the coupler 3c is formed of a material having elasticity lower than that of the first holder 3a and the second holder 3b, for example. As a result, when the care belt 3 is pulled by the arm mechanism 4, it is possible to prevent the coupler 3c from being stretched. Therefore, an external force from the arm mechanism 4 can be transmitted to the hold mechanism 3g with more certainty.

In order for a force from the arm mechanism 4 to act on the hold mechanism 3g via the coupler 3c evenly between the left side and the right side, the first holder 3a of the hold mechanism 3g has a bilaterally symmetric shape when viewed from the front, and the second holder 3b has a bilaterally symmetric shape when viewed from above.

Each of the first holder 3a and the second holder 3b may separate at a desired position so that the patient 7 can easily put on the hold mechanism 3g. For example, detachment portions, such as hook and loop fasteners, which are illustrated as a first detachment portion 3d and a second detachment portion 3e in FIG. 4C, may be respectively provided to the first holder 3a and to the second holder 3b, and the first holder 3a and the second holder 3b may separate at the first detachment portion 3d and at the second detachment portion 3e respectively to thereby allow the hold mechanism 3g to be easily taken off from the body of the patient 7. In FIG. 4C, the hold mechanism 3g is unfastened on the back of the patient 7; however, the first detachment portion 3d or the second detachment portion 3e may be made longer, and the hold mechanism 3g may be unfastened on one of the sides 7g. As a result, even in a case where the patient 7 has difficulty in moving their hand towards their back, the hold mechanism 3g can be unfastened on one of the sides 7g.

Note that the hold mechanism 3g is not limited to the hold mechanism 3g illustrated in FIGS. 4A to 4C and may be a hold mechanism according to any of the modifications described below.

Figure 4D:
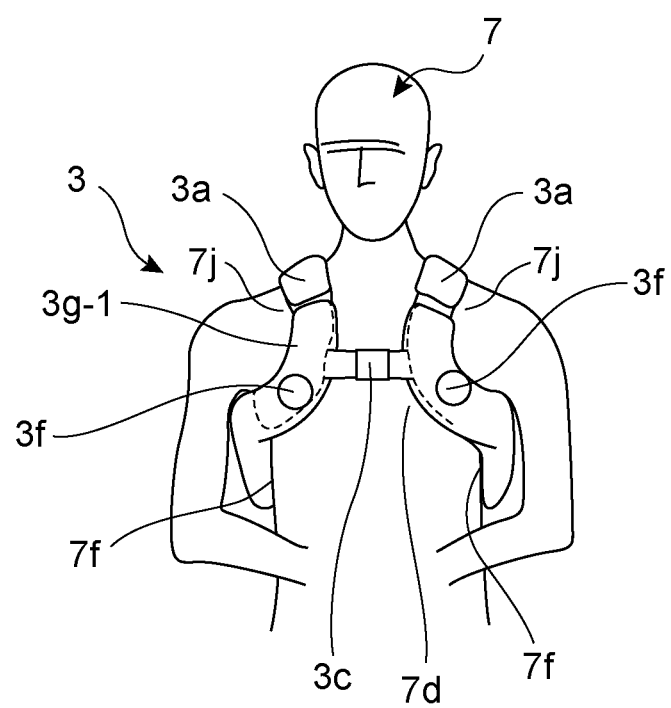
FIG. 4D is a front view illustrating a detailed configuration of a hold mechanism according to a first modification of the first embodiment of the present disclosure in a state where the hold mechanism is put on a patient.
Figure 4E:
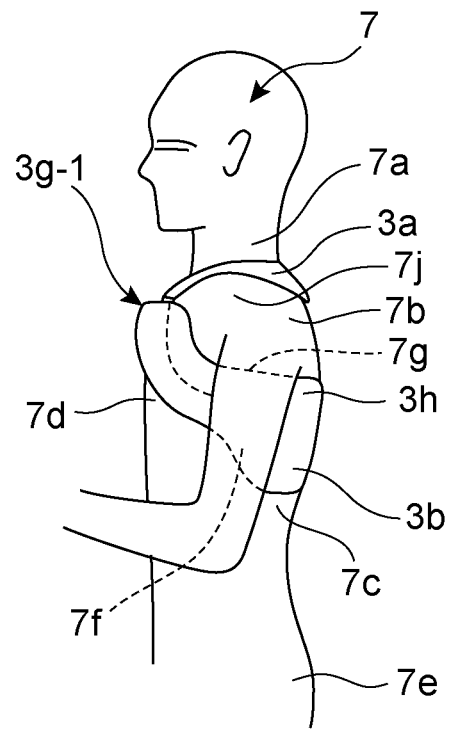
FIG. 4E is a left side view illustrating the detailed configuration of the hold mechanism according to the first modification of the first embodiment of the present disclosure in the state where the hold mechanism is put on a patient.
Figure 4F:
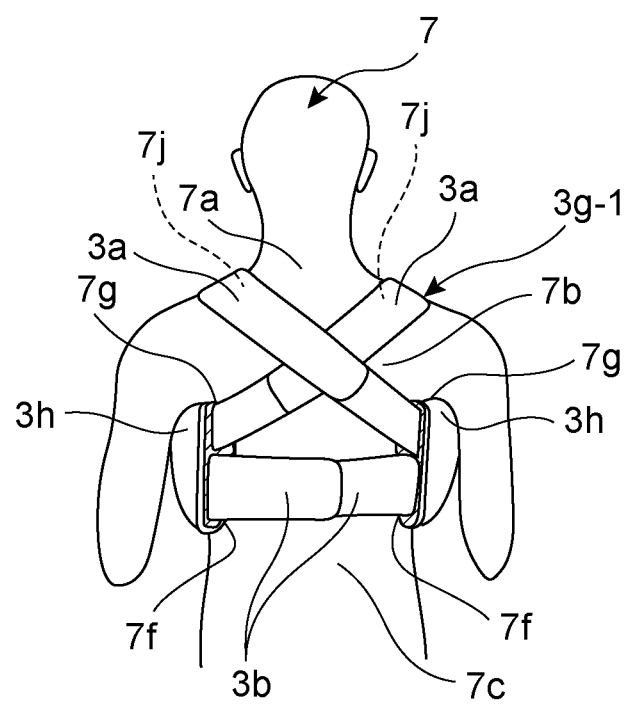
FIG. 4F is a back view illustrating the detailed configuration of the hold mechanism according to the first modification of the first embodiment of the present disclosure in the state where the hold mechanism is put on a patient.

First, as a first modification of the first embodiment, the hold mechanism 3g may be modified to a hold mechanism 3g-1 illustrated in FIGS. 4D to 4F. In the hold mechanism 3g-1 illustrated in FIGS. 4D to 4F, the first holder 3a is put on the back side of the patient 7 in a cross shape (that is, in an "X" shape) so as to hold the first region R1 including the back 7b of the patient 7.

Figure 4G:
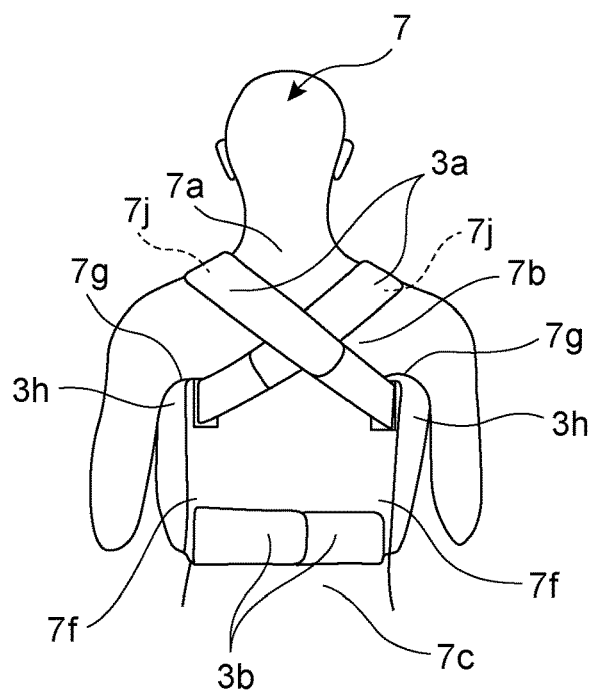
FIG. 4G is a back view illustrating the detailed configuration of the hold mechanism according to the first modification of the first embodiment of the present disclosure in a state where the position at which the hold mechanism is put on a patient is changed.

Further, the second holder 3b of the hold mechanism 3g-1 illustrated in FIGS. 4D to 4F may be lowered to the lower portion of the lower back 7c and put on, as illustrated in FIG. 4G, so as to hold the second region R2 including the lower back 7c with the second holder 3b.

Figure 4H:
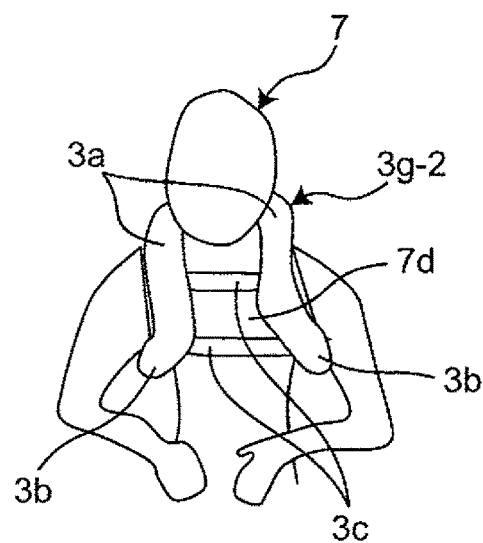
FIG. 4H is a front view illustrating a detailed configuration of a hold mechanism according to a second modification of the first embodiment of the present disclosure in a state where the hold mechanism is put on a patient.

Alternatively, as a second modification of the first embodiment, the coupler 3c may be provided at two positions, one in the upper portion and the other in the lower portion, of a hold mechanism 3g-2, as illustrated in FIG. 4H, and the couplers 3c may each extend across the first holder 3a of the hold mechanism 3g-2 to couple paired portions of the first holder 3a to each other.

Figure 4I:
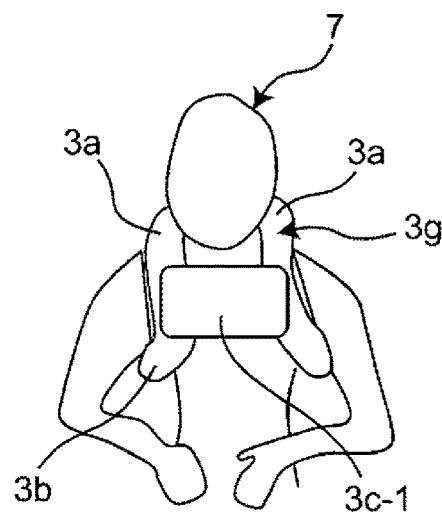
FIG. 4I is a front view illustrating a detailed configuration of a hold mechanism according to a third modification of the first embodiment of the present disclosure.
Figure 4J:
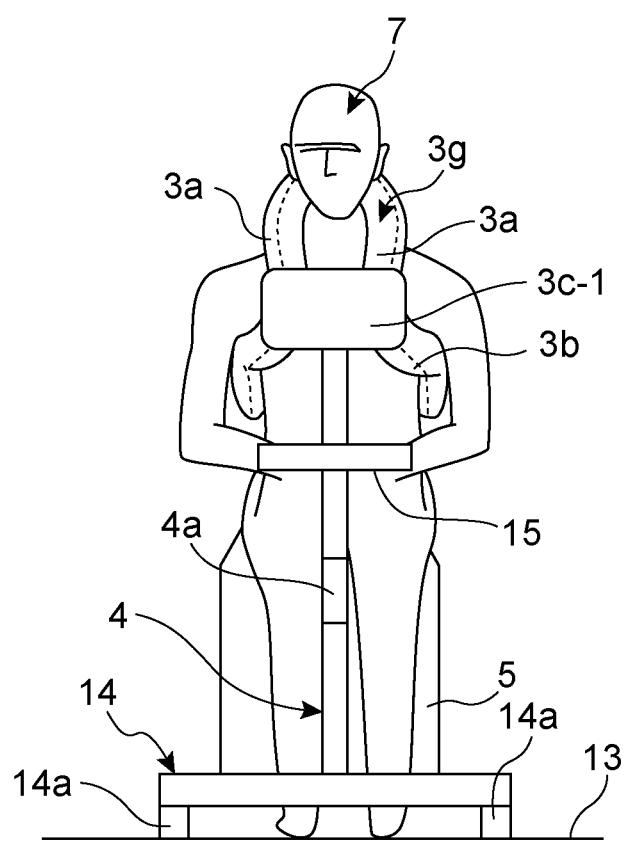
FIG. 4J is a front view illustrating the robot including the hold mechanism according to the third modification of the first embodiment of the present disclosure and is a diagram corresponding to FIG. 1C.

Alternatively, as a third modification of the first embodiment, the coupler 3c may be modified to a coupler 3c-1 formed of a rectangular sheet member having a certain thickness or elasticity, as illustrated in FIGS. 4I and 4J, instead of a long and narrow belt member. Further, as indicated by the dashed line in FIG. 23A, the coupling structure between the coupler 3c and the arm mechanism 4 may be configured in a form in which the proximal end of the arm mechanism 4 is coupled to the coupler 3c-1 detachably by using the buckles 3i and the buckle receptacles 3j, for example, and the coupler 3c-1 is inserted into the care belt 3. If the coupling structure is configured as described above, even if the arm mechanism 4 accidentally hits the hold mechanism 3g via the coupler 3c-1, the force can be reduced, and it is possible to protect the patient 7 from an excessive force acting on the patient 7.

In a case of putting the hold mechanism 3g on the patient 7, the hold mechanism 3g may be put on the patient 7 so as to create a clearance (of about 5 cm to 10 cm, for example) between the hold mechanism 3g and the body of the patient 7. With this clearance, a feeling of being pressed caused by the hold mechanism 3g put on the patient 7 is relieved, and the patient 7 can move their body as desired in the hold mechanism 3g due to the clearance. As a result, the patient 7 can change their posture in accordance with the physical condition of the patient 7 or the height or form of the seat 5, for example, when the patient 7 is standing or sitting, for example.

Walking Mechanism 14

The walking mechanism 14 at least includes paired wheels 14a and paired wheels 14b. For example, the walking mechanism 14 includes a rectangular base 14e, the paired front wheels 14a, the paired rear wheels 14b, a front-wheel brake 14c, and a rear-wheel brake 14d, and is put on the floor 13. The paired front wheels 14a are respectively disposed in the paired corners in the front end of the rectangular base 14e so as to be rotatable. The paired rear wheels 14b are respectively disposed in the paired corners in the rear end of the rectangular base 14e so as to be rotatable. The front-wheel brake 14c is used to apply brakes to the paired front wheels 14a. The rear-wheel brake 14d is used to apply brakes to the paired rear wheels 14b. The arm mechanism 4 is provided on the walking mechanism 14. That is, the arm mechanism 4 stands and is supported at the center of the front of the rectangular base 14e. For example, the paired front wheels 14a and the paired rear wheels 14b rotate when the patient 7 applies a force forward (in the left direction of FIG. 3C, for example) or backward (in the right direction of FIG. 3C, for example) in the state illustrated in FIG. 3C, and the walking mechanism 14 can work as a walking frame and assist the patient 7 in walking. Note that, in this example, the paired front wheels 14a and the paired rear wheels 14b rotate in response to pushing by the patient 7; however, a motor may be provided to one or both of the paired front wheels 14a and the paired rear wheels 14b, for example, for applying a force in addition to the pushing force of the patient 7 to enable an easy movement. Further, the front-wheel brake 14c and the rear-wheel brake 14d are formed by using electromagnetic brakes, for example, so as to enable turning on and off of brakes applied to the paired front wheels 14a or to the paired rear wheels 14b by using the input IF 6. When the front-wheel brake 14c is turned on, brakes can be applied to the paired front wheels 14a. When the rear-wheel brake 14d is turned on, brakes can be applied to the paired rear wheels 14b. When the front-wheel brake 14c is turned off, brakes applied to the paired front wheels 14a can be released. When the rear-wheel brake 14d is turned off, brakes applied to the paired rear wheels 14b can be released. The electromagnetic brakes are used, for example; however, hand brakes may be used.

Arm Mechanism 4

The arm mechanism 4 includes a robot arm, which is an example of a pulling mechanism that is coupled to the second coupler 3cb and that pulls or pushes the second coupler 3cb. For example, the arm mechanism 4 is provided on the walking mechanism 14 and has the proximal end that is coupled to the hold mechanism 3g via the coupler 3c. The arm mechanism 4 is a robot arm with two degrees of freedom and includes a first motor 41, a first encoder 43 that detects the number of revolutions (for example, the rotation angle) of the revolving shaft of the first motor 41, a second motor 42, and a second encoder 44 that detects the number of revolutions (for example, the rotation angle) of the revolving shaft of the second motor 42. Rotation angle information from the first encoder 43 and from the second encoder 44 is converted into position information regarding the arm mechanism 4, and the control apparatus 11 controls the first motor 41 and the second motor 42 on the basis of the position information. With this control, it is possible to drive the robot system 1 to at least simultaneously pull the first holder 3a and the second holder 3b of the hold mechanism 3g downward relative to the patient 7 and subsequently downward and slightly forward and to thereafter push the first holder 3a and the second holder 3b downward and slightly backward in order to assist a sitting motion in which the patient 7 assuming a standing posture sits on the seat 5, as illustrated in FIGS. 3A to 3C, for example. In a description given below, pushing and pulling motions can be performed in which the first holder 3a and the second holder 3b of the hold mechanism 3g are simultaneously pulled downward, subsequently pulled downward and slightly forward (that is, forward in the front direction), and thereafter pushed downward and slightly backward, for example.

More specifically, the arm mechanism 4 includes a plurality of joints, that is, the arm mechanism 4 is formed of a robot arm that includes a first arm 4c, a second arm 4d, a third arm 4e, a fourth arm 4f, a first driver 4a, and a second driver 4b. The first arm 4c has a lower end that is fixed to the center of the front of the rectangular base 14e so that the first arm 4c stands on the rectangular base 14e and extends upward. To the upper end of the first arm 4c, the front end of the second arm 4d is coupled via a first joint in which the first driver 4a is built so as to be rotatable. To the rear end of the second arm 4d, the lower end of the third arm 4e is coupled via a second joint in which the second driver 4b is built so as to be rotatable. The upper end of the third arm 4e is fixed to the front end of the fourth arm 4f such that the axial direction of the third arm 4e and that of the fourth arm 4f are orthogonal to each other to form an "L" shape. At the rear end of the fourth arm 4f, a coupler 4g that is coupled to the coupler 3c of the care belt 3 is detachably provided.

The first driver 4a is disposed in the first joint between the first arm 4c and the second arm 4d and, for example, is formed of the first motor 41 for rotating the second arm 4d relative to the first arm 4c and the first encoder 43 that detects rotation angle information regarding the rotation. Therefore, the second arm 4d can be driven in accordance with control by a controller 12 described below so that the second arm 4d is rotated a predetermined angle relative to the first arm 4c. The second driver 4b is disposed in the second joint between the second arm 4d and the third arm 4e and is formed of the second motor 42 for rotating the third arm 4e relative to the second arm 4d and the second encoder 44 that detects rotation angle information regarding the rotation. The rotation angle information from the first encoder 43 and from the second encoder 44 is converted into position information regarding the arm mechanism 4 and is used by the controller 12 as the position information. Therefore, the third arm 4e can be driven in accordance with control by the controller 12 described below so that the third arm 4e is rotated a predetermined angle relative to the second arm 4d to move to a desired position.

At the front of the fourth arm 4f, the input IF 6, which is an operation panel having buttons, for example, is provided so as to extend downward. The input IF 6 disposed in this manner can be operated by the patient 7 assuming a sitting posture from the side of the arm mechanism 4. Therefore, when the patient 7 inputs various instructions by using the input IF 6 (for example, by pressing buttons), the patient 7 can provide instructions for turning on or off brakes applied to the wheels (for example, the front wheels and the rear wheels) of the robot system 1, instructions for turning on or off the power of the robot system 1, and instructions for turning on or off a stand-up start button, for example. Further, a handle 15 is provided in the middle portion of the third arm 4e so as to extend backward (towards the patient 7), and the patient 7 can grip and hold the handle 15 with their hands when the patient 7 is sitting or standing. Note that the handle 15 provided may have a certain length so that the patient 7 can put their elbows thereon. As a result, the handle 15 can function as a handle in a case of standing up and can enable a stable walk when the patient 7 puts their elbows thereon when walking. Further, the fourth arm 4f may have a cushion made of urethane, for example, on the upper portion. As a result, it is possible to soften the impact in a case where the patient 7 falls forward and their face or upper body is in contact with the fourth arm 4f. The input IF 6 may be detachably provided to the arm mechanism 4.

The control apparatus 11 includes a database input/output unit 9, a timer 16, the controller 12, and a knee-bending adviser 60, which is an example of a presenter. After a pulling motion has been started, the controller 12 controls the arm mechanism 4 so that the arm mechanism 4 pulls the second coupler 3cb downward relative to the patient 7, subsequently pulls the second coupler 3cb downward and slightly forward relative to the patient 7, and thereafter pushes the second coupler 3cb downward and slightly backward relative to the patient 7. For example, the control apparatus 11 drives and controls the first driver 4a and the second driver 4b of the arm mechanism 4 independently of each other so that pulling and pushing motions are performed to assist a sitting motion of the patient 7. In the pulling and pushing motions, the first holder 3a and the second holder 3b of the hold mechanism 3g are simultaneously pulled downward relative to the patient 7 (that is, a knee-bending-advice operation by the knee-bending adviser 60) so that the patient 7 assuming a standing posture at least bends the knees 7k, assumes a slightly-leaning-forward posture, and sits on the seat 5, and thereafter, the care belt 3 is pulled obliquely downward and forward in the front direction of the patient 7 and is subsequently pushed obliquely downward and backward so that the patient 7 consequently assumes a sitting posture.

More specifically, in a control operation by the control apparatus 11, the control apparatus 11 performs control to make the arm mechanism 4 pull the first holder 3a and the second holder 3b (not specifically illustrated in FIG. 3A) of the hold mechanism 3g simultaneously as indicated by the arrow in FIG. 3A to pull the patient 7 assuming a standing posture downward (that is, a knee-bending-advice operation by the knee-bending adviser 60). When the arm mechanism 4 pulls the first holder 3a and the second holder 3b simultaneously as described above, the first region R1 that corresponds to the neck 7a or the back 7b of the patient 7 is pulled downward first, which works as an advice operation by the knee-bending adviser 60, and therefore, the patient 7 is allowed to bend the knees 7k so as to be ready for assuming a sitting posture.

Thereafter, the arm mechanism 4 simultaneously pulls the first holder 3a and the second holder 3b of the hold mechanism 3g obliquely downward and forward in the front direction of the patient 7, as illustrated in FIG. 3B, to pull the second region R2 that corresponds to the lower back 7c of the patient 7 forward to make their pelvis tilt in the forward direction.

Thereafter, the arm mechanism 4 simultaneously pushes the first holder 3a and the second holder 3b of the hold mechanism 3g obliquely downward and backward relative to the front direction of the patient 7 to make the upper body of the patient 7 bend backward so that the patient 7 can easily sit on the seat 5. In doing so, a series of motions are assisted until a sitting posture illustrated in FIG. 3C is assumed.

Here, a state where a control operation is started and the patient 7 is encouraged to bend the knees 7k is a first state. After the first state, a state where the patient 7 is pulled obliquely downward and forward, is subsequently pushed backward, and sits on the seat 5 to consequently assume a sitting posture is a second state.

Knee-Bending Adviser 60

After a pulling motion by the arm mechanism 4 has been started, the knee-bending adviser 60 advises the patient 7 of the timing at which the patient 7 is to bend the knees 7k so as to encourage the patient 7 to perform a motion in which the patient 7 bends the knees 7k (that is, provides knee-bending advice). Specifically, when the controller 12 makes the arm mechanism 4 perform a pulling motion for pulling downward relative to the patient 7 to encourage the patient 7 to bend the knees 7k, the knee-bending adviser 60 can advise the patient 7 of the knee-bending timing (that is, can provide knee-bending advice). Alternatively, the knee-bending adviser 60 may advise the patient 7 of the knee-bending timing with flashing light or by lighting a knee-bending timing indication lamp as another example of knee-bending advice or may advise the patient 7 of the timing at which the patient 7 is to bend the knees 7k with a voice saying "gradually bend your knees", for example, as another example of knee-bending advice, instead of or simultaneously with downward pulling, for example.

Timer 16

The timer 16 outputs to the database input/output unit 9 and to the controller 12 an instruction for making the database input/output unit 9 and the controller 12 operate each time a certain time (1 msec, for example) has elapsed.

Input IF 6

The input IF 6 is disposed on the arm mechanism 4, for example, is an operation interface used to provide instructions for turning on and off the power of the robot system 1, turning on and off the front-wheel brake 14c and the rear-wheel brake 14d, and starting and stopping sitting motion assistance, and is formed of buttons, for example.

Motion Information Database 8

The controller 12 operates in accordance with an instruction from the timer 16, the database input/output unit 9 and the controller 12 operate by using an operation instruction from the timer 16, and position information regarding the arm mechanism 4 (position information obtained by converting rotation angle information from the first encoder 43 and from the second encoder 44 into position information regarding the arm mechanism 4, for example) is generated at certain time intervals (at intervals of 1 msec, for example). The generated position information is output to the motion information database 8 via the database input/output unit 9 as motion information together with the time in the first embodiment and is stored in the motion information database 8 as motion information. Note that, in the first embodiment, motion information is generated in advance by using the input IF 6, for example, and stored.

FIG. 5A illustrates example information contained in the motion information database 8.

(1) The field "time" indicates information regarding the time when the arm mechanism 4 operates. In the first embodiment, the time is indicated in units of milliseconds (msec).

(2) The field "position" indicates position information regarding the arm mechanism 4 obtained by converting angle information detected by the first encoder 43 and by the second encoder 44 of the arm mechanism 4, for example. Specifically, as illustrated in FIG. 1A, one end of the arm mechanism 4 is assumed to be the origin O, and coordinates relative to the origin O are assumed to indicate a position based on two axes, that is, an x axis that corresponds to the direction of movement (for example, the front-back direction) and a z axis that corresponds to the up-down direction. Note that, in the first embodiment, the position is indicated in units of meters (m).

Database Input/Output Unit 9

The database input/output unit 9 inputs/outputs data (that is, information) to/from the motion information database 8 and the controller 12.

Controller 12

The controller 12 performs control to drive the first motor 41 and the second motor 42 of the arm mechanism 4 independently of each other so as to follow motion information input from the database input/output unit 9. In addition, the controller 12 controls brakes applied by the front-wheel brake 14c and by the rear-wheel brake 14d on the basis of instructions input from the input IF 6 for turning on or off the front-wheel brake 14c and the rear-wheel brake 14d.

Now, motions of the robot system 1 controlled by the controller 12 are described below.

The motions and procedures of the arm mechanism 4 of the robot system 1 and the motions of the patient 7 associated therewith illustrated in FIGS. 6A to 6E are described with reference to the flowchart in FIG. 7.

Figure 6A:
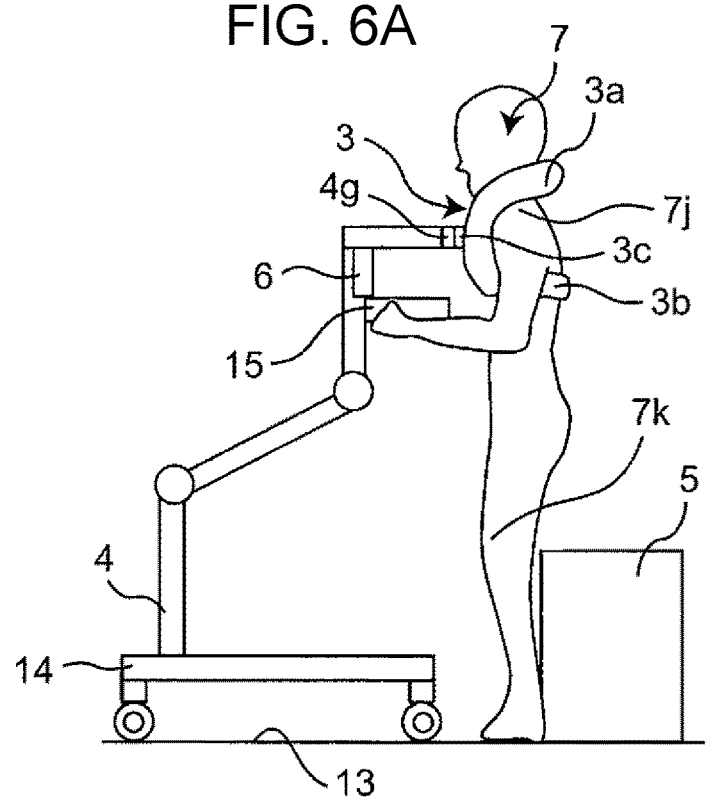
FIG. 6A is a diagram illustrating a motion of the robot system according to the first embodiment of the present disclosure.
Figure 7:
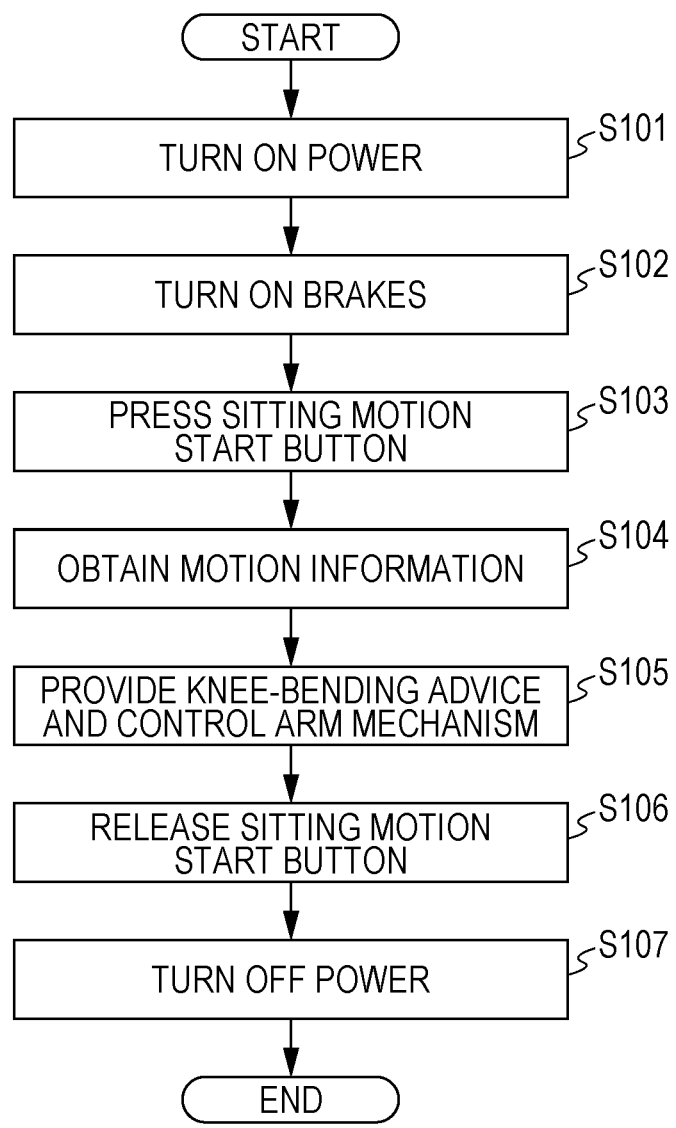
FIG. 7 is a flowchart of a controller according to the first embodiment of the present disclosure.

First, the patient 7 assuming a standing posture puts the hold mechanism 3g, which is formed of the first holder 3a and the second holder 3b, of the care belt 3 coupled to the arm mechanism 4 on their body and grips the handle 15 with their hands, as illustrated in FIG. 6A. Next, when the patient 7 applies a force to the arm mechanism 4 forward or backward via the coupler 3c of the care belt 3, the front wheels 14a and the rear wheels 14b of the walking mechanism 14 rotate as desired, and the walking mechanism 14 works as a walking frame and assists the patient 7 in walking. The patient 7 moves to the seat 5, such as a bed, a chair, or the seat of a toilet, put on the floor 13.

Thereafter, in step S101, the patient 7 turns on the power of the robot system 1 by using the input IF 6 of the robot 20.

Next, in step S102, when the patient 7 turns on the front-wheel brake 14c and the rear-wheel brake 14d by using the input IF 6, brakes can be applied so that the front wheels 14a and the rear wheels 14b of the walking mechanism 14 do not rotate in accordance with control performed by the controller 12. Consequently, when the arm mechanism 4 pulls the hold mechanism 3g via the coupler 3c, the walking mechanism 14 does not move, and a force applied by the arm mechanism 4 is transmitted to the hold mechanism 3g via the coupler 3c with certainty.

Next, in step S103, the patient 7 presses a sitting motion start button of the input IF 6. In this example, the robot system 1 performs a motion in a state where the sitting motion start button is kept pressed, and stops the motion when the sitting motion start button is released. In subsequent steps S104 to S106, the knee-bending adviser 60 performs an advice operation of providing advice on the knee-bending timing, and the control apparatus 11 of the robot system 1 drives and controls the first driver 4a and the second driver 4b of the arm mechanism 4 independently of each other to assist a sitting motion in which the patient 7 assuming a standing posture as illustrated in FIG. 3A performs a motion as illustrated in FIG. 3B and settles the buttocks 7e of the patient 7 on the seat 5 as illustrated in FIG. 3C.

Next, in step S104, the controller 12 obtains motion information from the database input/output unit 9.

Next, in step S105, the knee-bending adviser 60 performs an advice operation of providing advice on the knee-bending timing, and the controller 12 drives and controls the first motor 41 and the second motor 42 independently of each other in order to drive the arm mechanism 4 so as to follow the motion information obtained from the database input/output unit 9.

Figure 9A:
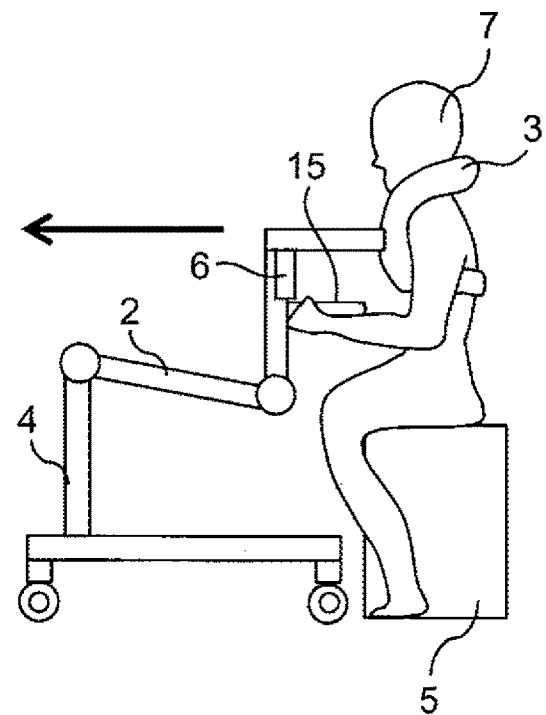
FIG. 9A is a diagram illustrating a motion of the robot system according to the first embodiment of the present disclosure.
Figure 9B:
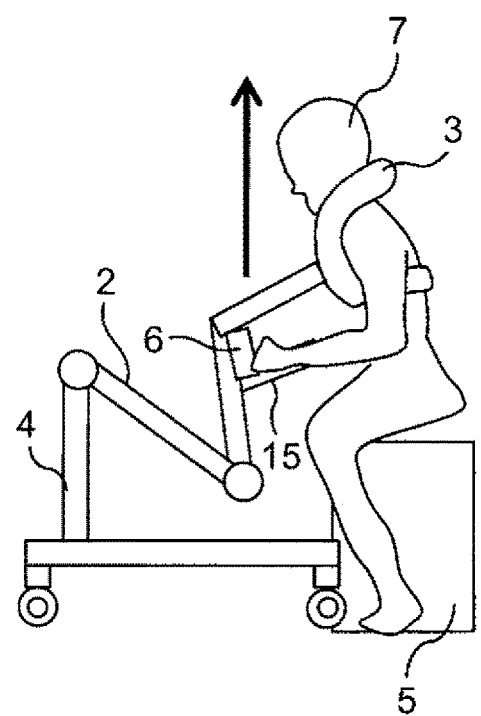
FIG. 9B is a diagram illustrating a motion of the robot system according to the first embodiment of the present disclosure.
Figure 9C:
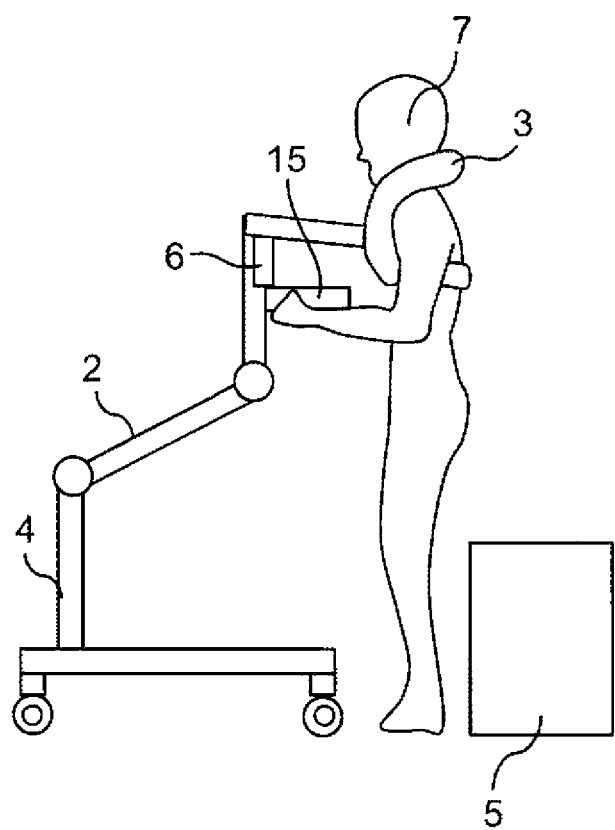
FIG. 9C is a diagram illustrating a motion of the robot system according to the first embodiment of the present disclosure.

Here, FIG. 8 is a graph of position information (the horizontal axis corresponds to the x axis, and the vertical axis corresponds to the z axis, for example) regarding a stand-up motion in which the patient 7 changes their posture from a sitting posture to a standing posture, for example. By reversely reproducing the path produced by the motion in which the posture changes from a sitting posture to a standing posture, a sitting motion in which the posture changes from a standing posture to a sitting posture can be controlled. Time t0 in FIG. 8 corresponds to motion information at the time when the patient assumes a sitting posture as illustrated in FIG. 9A. Time t1 corresponds to motion information at the time when the patient 7 assumes a half-standing posture and moves the buttocks 7e off the seat 5, as illustrated in FIG. 9B. Time t2 corresponds to motion information at the time when the stand-up motion is completed as illustrated in FIG. 9C. The method described above is a method in which a motion in which the posture changes from a standing posture to a sitting posture is controlled by reversely reproducing the stand-up motion in the order of time t2, time t1, and time t0.

Specifically, the arm mechanism 4 is first controlled obliquely downward and forward relative to the patient 7 in accordance with the movement from the position at time t2 to the position at time t1 as indicated by the graph in FIG. 8.

Figure 10:
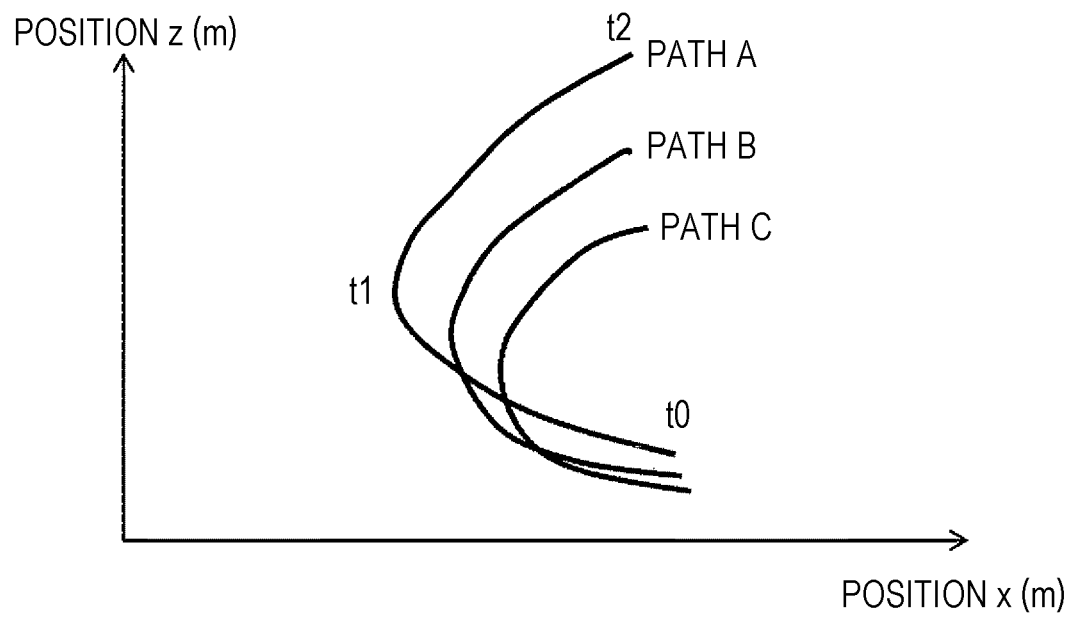
FIG. 10 is a graph of motion information according to the first embodiment of the present disclosure.

Next, after the leaning-forward posture has been assumed at the time point indicated by time t1, the arm mechanism 4 is controlled obliquely downward and backward to make the patient 7 sit on the seat 5. As illustrated in FIG. 10, paths for respective height ranges, namely, a path A for heights between 175 cm and 180 cm, a path B for heights between 165 cm and 174 cm, and a path C for heights between 155 cm and 164 cm, may be stored in advance in the motion information database 8. Then, the patient 7 can select any of the paths by using the input IF 6 on the basis of the height of the patient 7.

Figure 11A:
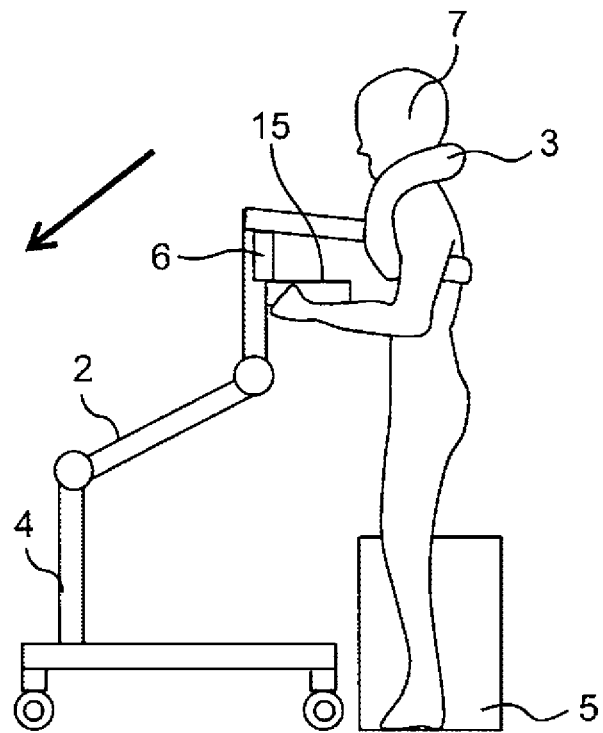
FIG. 11A is a diagram illustrating a motion of the robot system according to the first embodiment of the present disclosure.
Figure 11B:
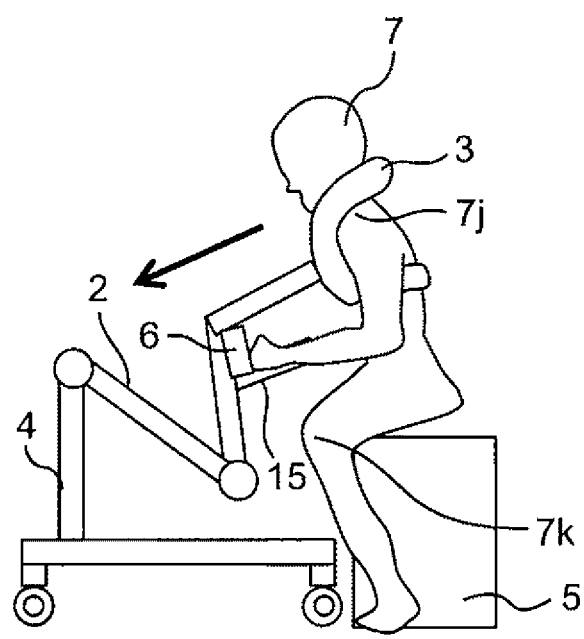
FIG. 11B is a diagram illustrating a motion of the robot system according to the first embodiment of the present disclosure.
Figure 11C:
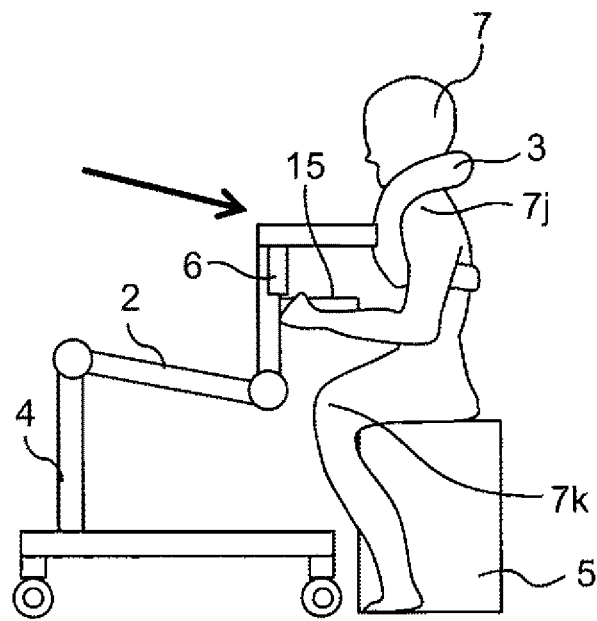
FIG. 11C is a diagram illustrating a motion of the robot system according to the first embodiment of the present disclosure.
Figure 11D:
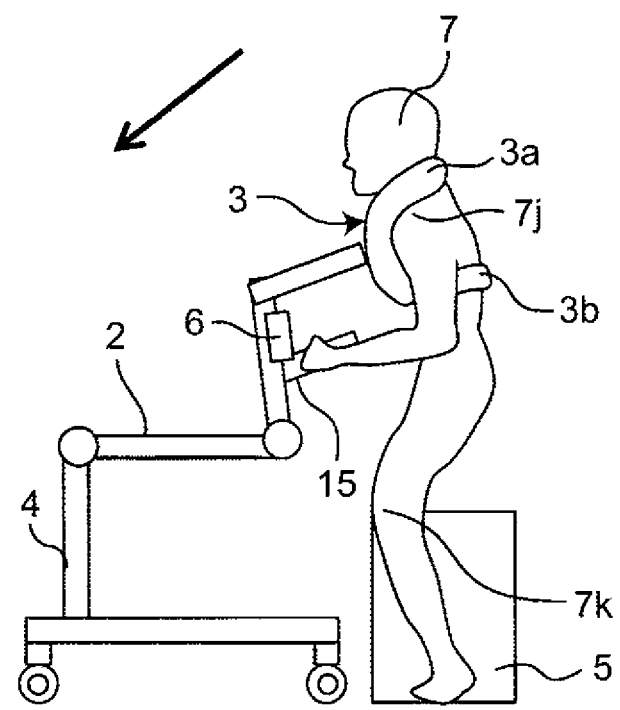
FIG. 11D is a diagram illustrating a motion of the robot system according to the first embodiment of the present disclosure.
Figure 11E:
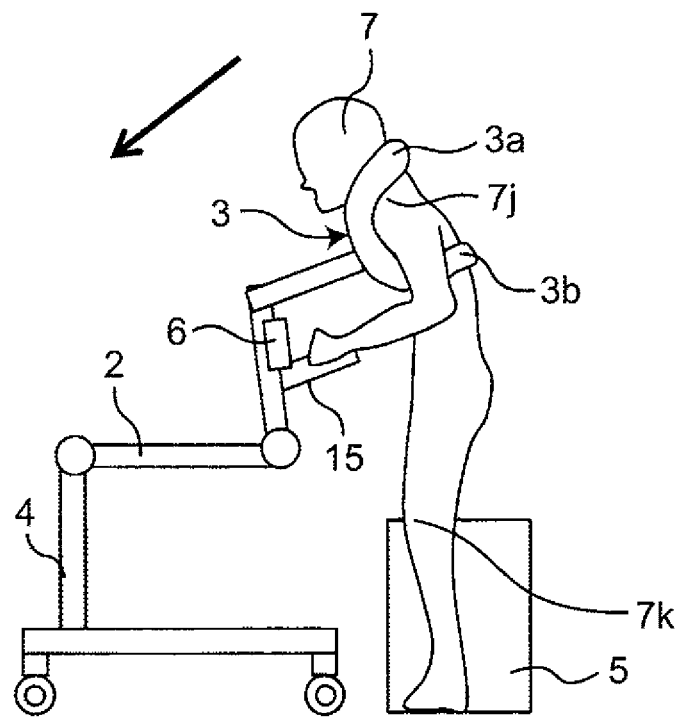
FIG. 11E is a diagram illustrating a motion of the robot system according to the first embodiment of the present disclosure.

In a case of an obliquely downward and forward movement illustrated in FIG. 11A performed by reversely reproducing and using the position information regarding a stand-up motion, the knees 7k of the patient 7 might not bend as illustrated in FIG. 11D, their upper body may lean forward as illustrated in FIG. 11E, and the knees 7k may remain straight. If the state where the knees 7k remain straight continues, their upper body may lean forward, the knees 7k may bear a heavy load, the patient 7 may lose their balance when the knees 7k are bent, or their lower body may bear a heavy load upon sitting. Therefore, the knee-bending adviser 60 provides advice on the knee-bending timing. In this example case, when a motion is started as illustrated in FIG. 11A, the knee-bending adviser 60 may advise the patient 7 of the knee-bending timing with flashing light or by lighting a knee-bending timing indication lamp or may advise the patient 7 of the knee-bending timing with a voice saying "gradually bend your knees", for example.

Note that, the patient 7 is requested to bend the knees 7k only 10 cm or so, which is a constant value regardless of the height.

Figure 12:
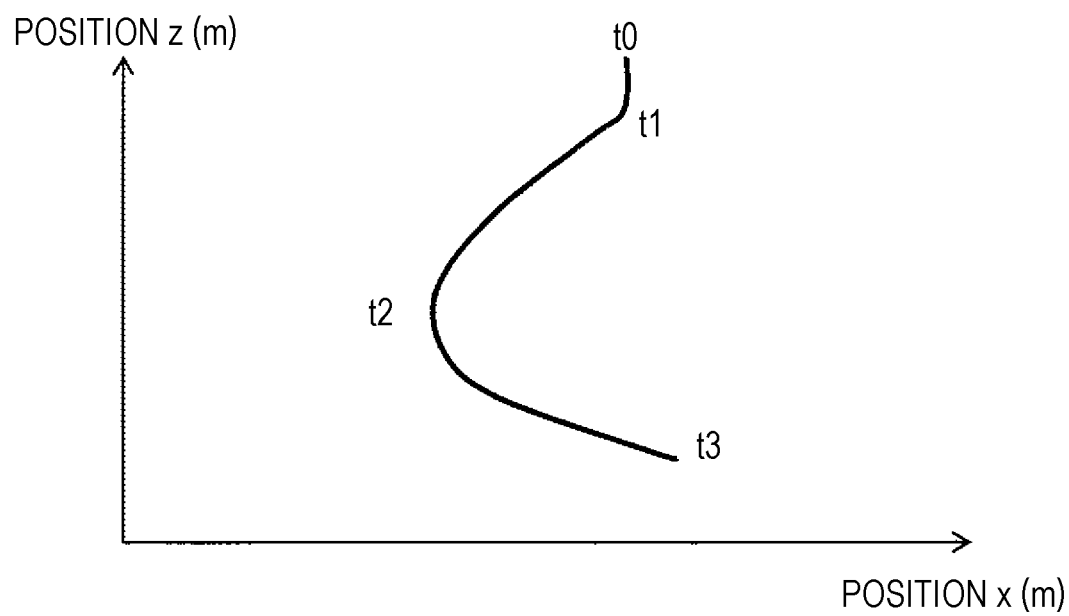
FIG. 12 is a graph of motion information according to the first embodiment of the present disclosure.

As another example different from the above-described example, a path illustrated in FIG. 12 may be employed.

The time point indicated by time t0 in FIG. 12 corresponds to the state of the arm mechanism 4 where the patient 7 assumes a standing posture, as illustrated in FIG. 6A.

Figure 6B:
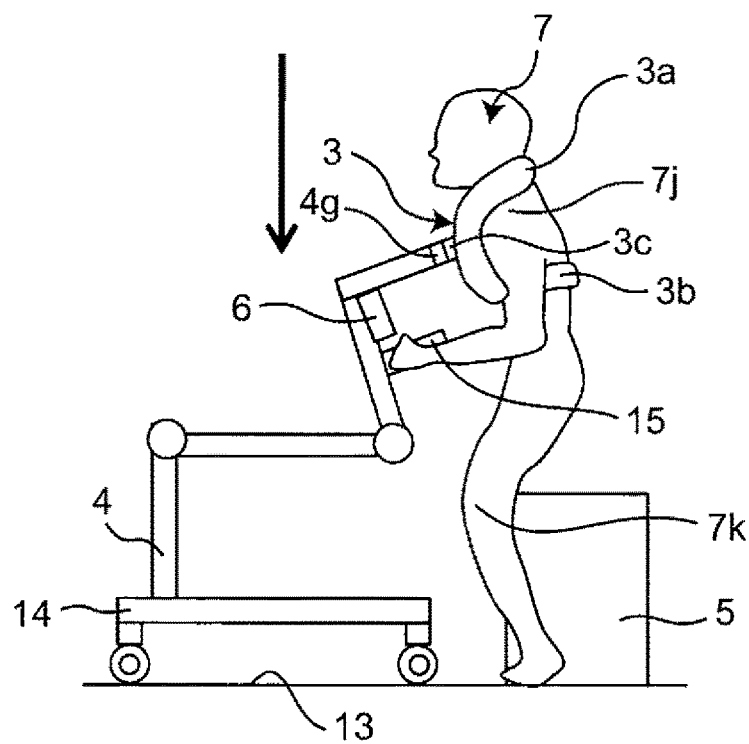
FIG. 6B is a diagram illustrating a motion of the robot system according to the first embodiment of the present disclosure.

Next, the arm mechanism 4 is controlled to perform a downward movement in the vertical direction as illustrated in FIG. 6B, that is, as indicated by time t1 in FIG. 12 (this corresponds to an advice operation performed by the knee-bending adviser 60). The hold mechanism 3g is pulled downward by the arm mechanism 4, and a portion around the shoulders 7j of the patient 7 is pulled downward by the arm mechanism 4 mainly via the first holder 3a to thereby lower the torso of the patient 7. This motion encourages the patient 7 to bend the knees 7k of the patient 7.

Figure 6C:
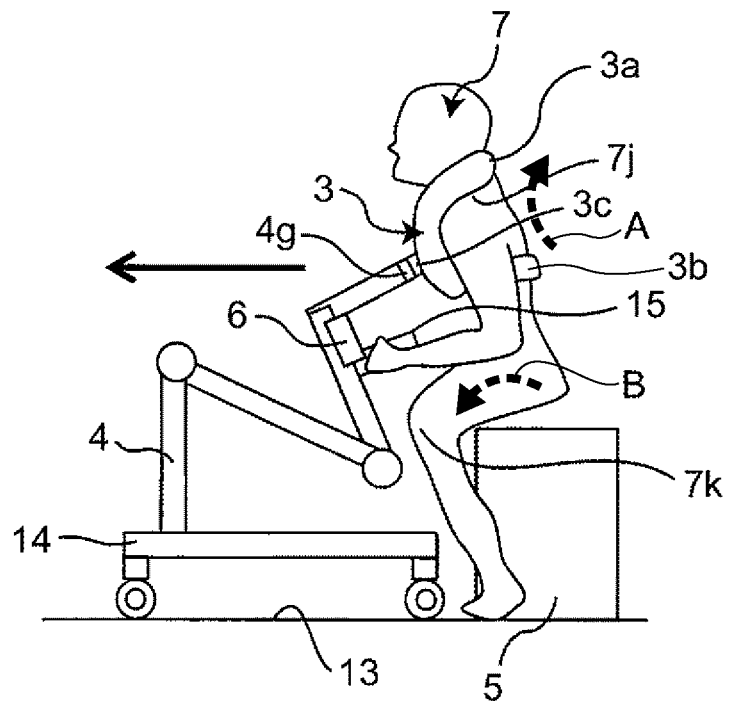
FIG. 6C is a diagram illustrating a motion of the robot system according to the first embodiment of the present disclosure.

Next, after the arm mechanism 4 has been made to perform the downward movement in the vertical direction to a position at which the knees 7k of the patient 7 bend, the controller 12 controls the arm mechanism 4 so as to make the arm mechanism 4 perform a forward movement, as illustrated in FIG. 6C (see time t1 to time t2 in FIG. 12, for example). When the first holder 3a is pulled forward by the arm mechanism 4, the upper body of the patient 7 can be made to bend backward as indicated by the dotted clockwise arrow A in FIG. 6C. When the second holder 3b is pulled forward by the arm mechanism 4, the pelvis of the patient 7 can be made to tilt forward as indicated by the dotted counterclockwise arrow B. As a result, the patient 7 can assume a slightly-leaning-forward posture without assuming a low leaning-forward posture.

Figure 6D:
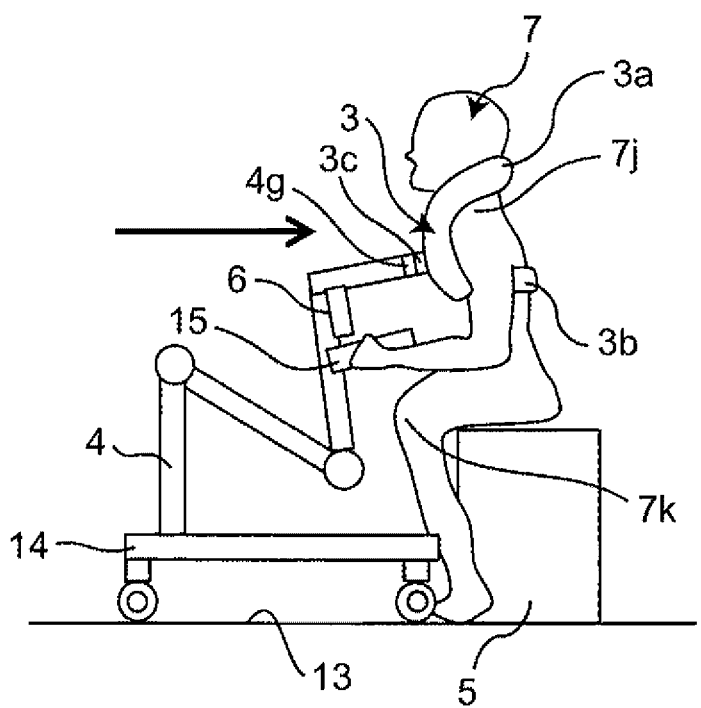
FIG. 6D is a diagram illustrating a motion of the robot system according to the first embodiment of the present disclosure.
Figure 6E:
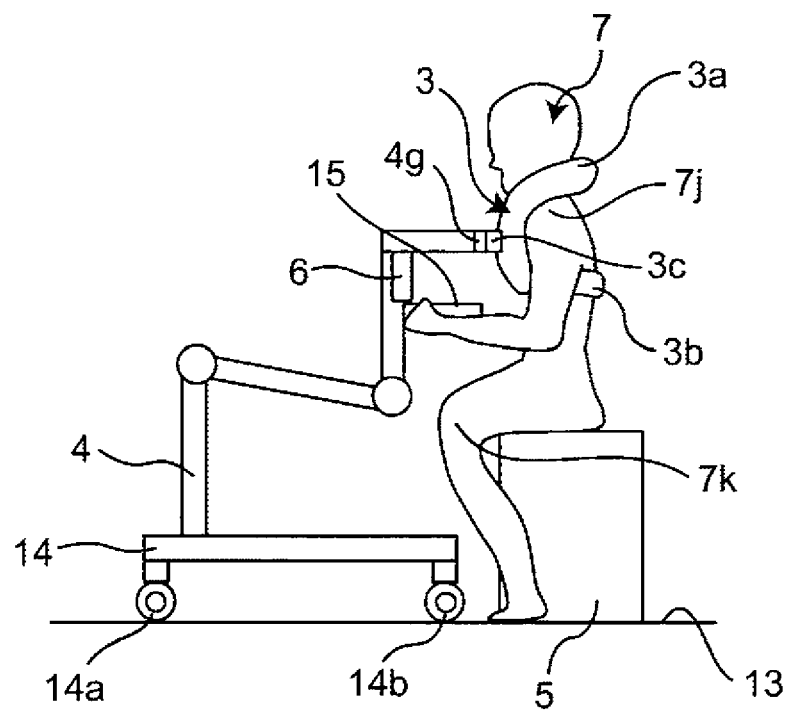
FIG. 6E is a diagram illustrating a motion of the robot system according to the first embodiment of the present disclosure.

Next, when the arm mechanism 4 is made to perform a backward movement, as illustrated in FIG. 6D, the patient 7 sits on the seat 5 without a large force being applied to the seat 5 due to muscle weakness of the lower body of the patient 7, and the patient 7 is in a sitting-posture state, as illustrated in FIG. 6E (see time t2 to time t3 in FIG. 12, for example).

Next, in step S106, when the patient 7 restores the input IF 6 (releases the button that the patient 7 keeps pressing, for example), the operation performed by the controller 12 for controlling the sitting motion and driving the arm mechanism 4 stops. Note that, in a step before step S106, the patient 7 can release the button of the input IF 6 that the patient 7 keeps pressing to suspend the operation performed by the controller 12 for controlling the sitting motion and driving the arm mechanism 4.

Next, in step S107, the patient 7 turns off the power by using the input IF 6.

Figure 13:
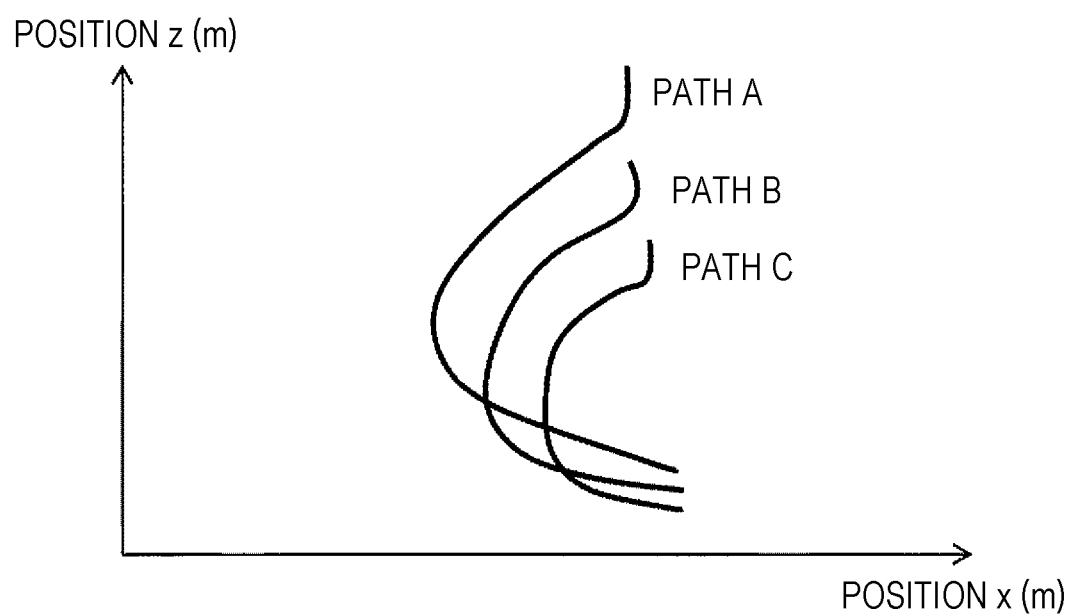
FIG. 13 is a graph of motion information according to the first embodiment of the present disclosure.

Note that, as in the previous example, paths for respective height ranges, namely, a path A for heights between 175 cm and 180 cm, a path B for heights between 165 cm and 174 cm, and a path C for heights between 155 cm and 164 cm, may be stored in advance in the motion information database 8, as illustrated in FIG. 13. Then, the patient 7 can select any of the paths by using the input IF 6 on the basis of the height of the patient 7.

Advantages of First Embodiment

The arm mechanism 4 and the care belt 3 that includes the hold mechanism 3g formed of the first holder 3a and the second holder 3*b* and the coupler 3*c* are provided. The care belt 3 can be moved downward and slightly forward by a pulling motion of the arm mechanism 4 in accordance with control performed by the controller 12 and thereafter moved downward and slightly backward. When the patient 7 performs a sitting motion in which the patient 7 changes their posture from a standing posture to a sitting posture, it is possible to advise the patient 7 to perform a motion in which the patient 7 bends the knees 7*k*, by using the knee-bending adviser 60. As a result, when the patient 7 assuming a standing posture is to assume a leaning-forward posture, assistance can be provided to decrease the degree by which the patient 7 leans forward so as to make their motion close to the motion of a healthy person. Further, when the patient 7 sits on the seat 5, such as a toilet seat, the first holder 3*a* and the second holder 3*b* support the upper body of the patient 7, and therefore, the patient 7 can stably sit down. The first holder 3*a* and the second holder 3*b* are put on their upper body, and therefore, the patient 7 can easily take off and put on their clothes upon excretion. Further, the patient 7 repeatedly performs motions similar to those performed by a healthy person in daily life unlike a case where assistance is provided to unconditionally lift the patient 7. Accordingly, this can be employed as rehabilitation with which the muscle strength of their lower body can be protected from weakening.

Second Embodiment

Figure 14A:
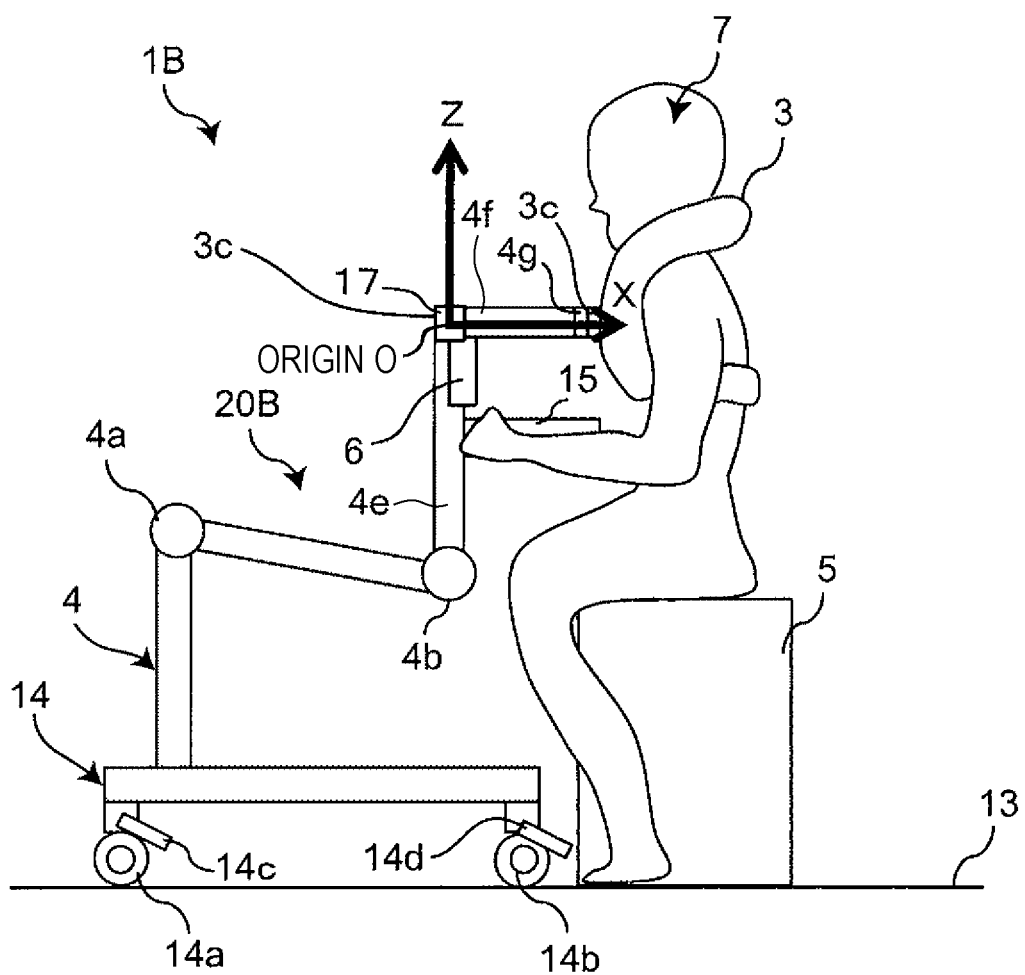
FIG. 14A is a diagram schematically illustrating a configuration of a robot system according to a second embodiment of the present disclosure.
Figure 14B:
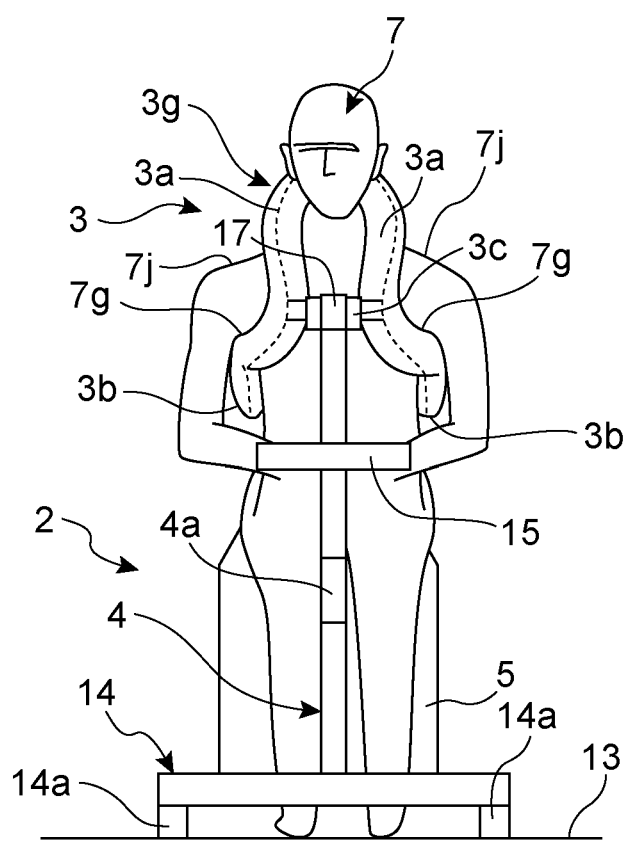
FIG. 14B is a diagram schematically illustrating the configuration of the robot system according to the second embodiment of the present disclosure.
Figure 14C:
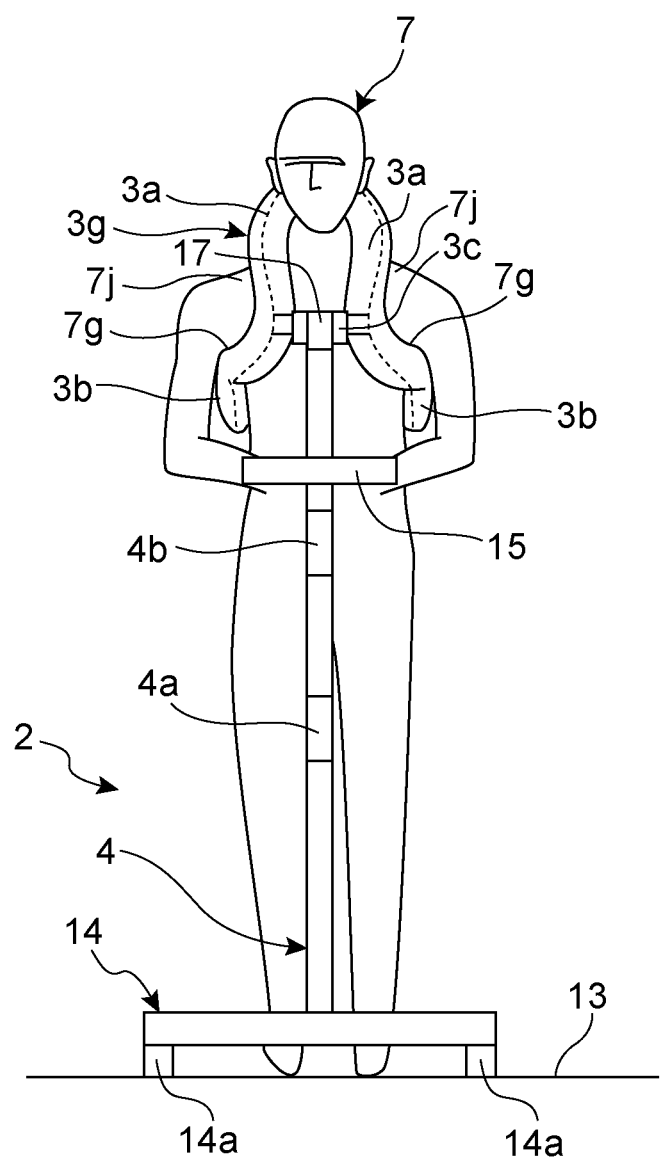
FIG. 14C is a diagram schematically illustrating the configuration of the robot system according to the second embodiment of the present disclosure.
Figure 15:
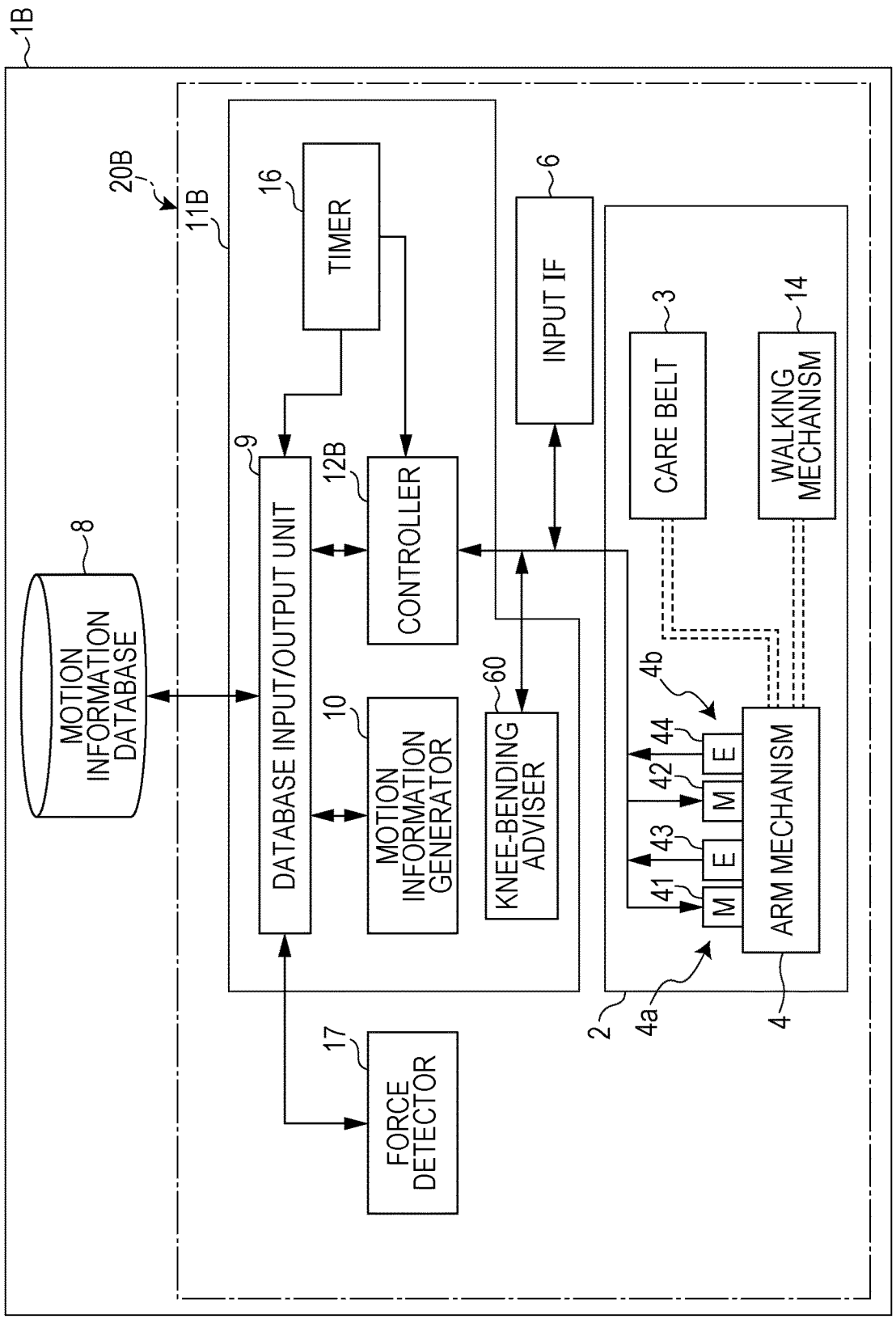
FIG. 15 is a block diagram illustrating a detailed configuration of the robot system according to the second embodiment of the present disclosure.

FIGS. 14A to 14C illustrate a robot 20B that assists a motion of the patient 7 changing their state from a standing-posture state to a sitting-posture state, which is an example operation using a robot system 1B, the robot system 1B being an example of a sitting motion assist system (that is, a sitting motion assist apparatus) according to a second embodiment of the present disclosure. FIGS. 14B and 14C are front views of the robot 20B illustrated in FIG. 14A. FIGS. 14A and 14B illustrate a state where the patient 7 is assuming a sitting posture, and FIG. 14C illustrates a state where the patient 7 is assuming a standing posture. FIG. 15 is a block diagram illustrating a detailed configuration of the robot system 1B according to the second embodiment of the present disclosure.

In the robot system 1B according to the second embodiment, motion information is generated and obtained by a motion information generator 10 on the basis of a force detected by a force detector 17, which is an example of a force obtainer, and position information, instead of obtaining motion information from the database input/output unit 9. The second embodiment is significantly different from the first embodiment in that the force detector 17 and the motion information generator 10 are provided. The force detector 17 obtains information regarding a force externally applied to the arm mechanism 4. The motion information generator 10 generates motion information for the arm mechanism 4 on the basis of the information regarding the force obtained by the force detector 17 and information regarding positions obtained by the first encoder 43 and by the second encoder 44 described below. Therefore, in the second embodiment, a controller 12B described below controls motions of the arm mechanism 4 on the basis of the motion information generated by the motion information generator 10. A detailed description is given below.

As illustrated in FIGS. 14A to 14C and FIG. 15, the robot 20B of the robot system 1B according to the second embodiment is put on the floor 13, and the robot 20B includes the main mechanism 2, a control apparatus 11B, the input IF 6, and the force detector 17.

The main mechanism 2 includes the arm mechanism 4, the care belt 3, and the walking mechanism 14 as in the first embodiment.

The control apparatus 11B includes the database input/output unit 9, the timer 16, the controller 12B, the motion information generator 10, and the knee-bending adviser 60.

The walking mechanism 14, the care belt 3, the timer 16, and the input IF 6 are the same as in the first embodiment, and therefore, descriptions thereof are omitted.

The patient 7 is held by the hold mechanism 3*g* of the care belt 3 as in the first embodiment and initially assumes a standing posture, as illustrated in FIG. 14C. On the side of the arm mechanism 4, the input IF 6, which is an operation panel having buttons, for example, is disposed as in the first embodiment.

Differences from the first embodiment are described in detail below.

Force Detector 17

The arm mechanism 4 includes the force detector 17, and the force detector 17 detects a force applied by the patient 7 to the arm mechanism 4. After the patient 7 has input sitting motion start information to the robot system 1B by using the input IF 6 (pressing a button, for example) to start a control operation performed by the control apparatus 11B of the robot system 1B, the force detector 17 starts detection. The force detector 17 detects a force applied by the patient 7 to the arm mechanism 4. The motion information generator 10 generates motion information on the basis of the force detected by the force detector 17 and the position of the arm mechanism 4. The controller 12B controls motions of the arm mechanism 4.

Specifically, as illustrated in FIG. 14A, the force detector 17 is provided in the vicinity of the coupling portion between the upper end of the third arm 4*e* and the front end of the fourth arm 4*f* of the arm mechanism 4. Information regarding a force externally applied (by the patient 7, for example) to the arm mechanism 4 is detected by the force detector 17. The information detected by the force detector 17 is stored in the motion information database 8 via the database input/output unit 9 together with the time. For example, the force detector 17 is formed of a two-axis force sensor capable of measuring a force in the up-down direction and a force in the front-back direction of the robot system 1B or a three-axis force sensor capable of additionally measuring a frontward rotation.

Arm Mechanism 4

The arm mechanism 4 is provided on the walking mechanism 14 and is a robot arm with two degrees of freedom that includes the first motor 41 and the first encoder 43 in the first joint and the second motor 42 and the second encoder 44 in the second joint, as in the first embodiment. The first motor 41 and the second motor 42 are controlled by the control apparatus 11B on the basis of information from the first encoder 43 and from the second encoder 44, as in the first embodiment, to drive the robot system 1B as illustrated in FIGS. 3A to 3C similarly as in the first embodiment, for example. The first encoder 43 and the second encoder 44 function as a position obtainer that obtains information regarding the position of the arm mechanism 4, for example. Further, the handle 15 is provided as in the first embodiment, and the patient 7 can grip the handle 15 with their hands when sitting or standing.

Knee-Bending Adviser 60

The knee-bending adviser 60 advises the patient 7 of the timing at which the patient 7 is to bend the knees 7k so as to encourage the patient 7 to perform a motion in which the patient 7 bends the knees 7k, as in the first embodiment. Specifically, when the controller 12B makes the arm mechanism 4 perform a pulling motion for pulling downward relative to the patient 7 to encourage the patient 7 to bend the knees 7k, the knee-bending adviser 60 can advise the patient 7 of the knee-bending timing. Alternatively, the knee-bending adviser 60 may advise the patient 7 of the knee-bending timing with flashing light or by lighting a knee-bending timing indication lamp or may advise the patient 7 of the timing at which the patient 7 is to bend the knees 7k with a voice saying "gradually bend your knees", for example, instead of or simultaneously with downward pulling, for example.

Motion Information Database 8

As in the first embodiment, the controller 12B operates in accordance with an instruction from the timer 16, the database input/output unit 9 and the controller 12B operate by using an operation instruction from the timer 16, and position information regarding the arm mechanism 4 (position information obtained by converting rotation angle information from the first encoder 43 and from the second encoder 44 into position information regarding the arm mechanism 4, for example) is generated at certain time intervals (at intervals of 1 msec, for example). The generated position information is output to the motion information database 8 via the database input/output unit 9 together with the time and is stored in the motion information database 8. In the second embodiment, motion information is generated by the motion information generator 10 on the basis of the information regarding the force detected by the force detector 17, the position information, and information regarding the time that are stored in the motion information database 8, and the motion information is stored in the motion information database 8.

Figures 16, 17:
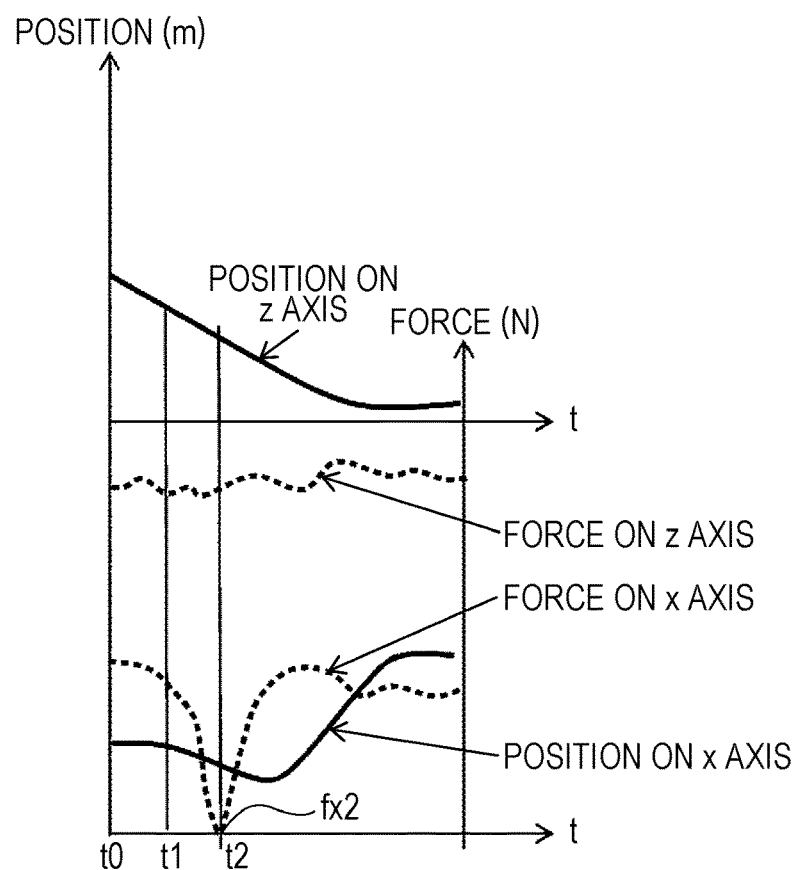
FIG. 16 is a diagram illustrating details of a motion information database according to the second embodiment of the present disclosure.
FIG. 17 is a graph of motion information according to the second embodiment of the present disclosure.

FIG. 16 illustrates example information contained in the motion information database 8.

(1) The field "time" indicates information regarding the time when the arm mechanism 4 operates. In the second embodiment, the time is indicated in units of milliseconds (msec).

(2) The field "position" indicates position information regarding the arm mechanism 4 obtained by converting angle information detected by the first encoder 43 and by the second encoder 44 of the arm mechanism 4, for example. Specifically, as illustrated in FIG. 14A, one end of the arm mechanism 4 is assumed to be the origin O, and coordinates relative to the origin O are assumed to indicate a position based on two axes, that is, an x axis on which the positive side corresponds to the direction opposite to the direction of movement of the robot system 1B and a z axis on which the positive side corresponds to the upward direction. Note that, in the second embodiment, the position is indicated in units of meters (m).

(3) The field "force" indicates a force applied to the arm mechanism 4 and detected by the force detector 17 provided in the arm mechanism 4, and specifically indicates information regarding forces respectively applied to the two axes, namely, the x axis on which the positive side corresponds to the direction opposite to the direction of movement of the robot system 1B and the z axis on which the positive side corresponds to the upward direction. In the second embodiment, the force is indicated in units of newtons (N).

Database Input/Output Unit 9

The database input/output unit 9 inputs/outputs data (that is, information) to/from the motion information database 8, the controller 12B, the force detector 17, and the motion information generator 10.

Motion Information Generator 10

The motion information generator 10 obtains information regarding the time, position, and force stored in the motion information database 8 via the database input/output unit 9, generates motion information for the arm mechanism 4 on the basis of the information regarding the position and force, and stores the motion information in the motion information database 8.

The generation of motion information is described below with reference to FIG. 17. FIG. 17 is a graph of motion information generated by the motion information generator 10. In the graph in FIG. 17, the horizontal axis represents the time, and the vertical axis represents information regarding the position on the x axis, information regarding the position on the z axis, information regarding the force on the x axis, and information regarding the force on the z axis.

First, as illustrated in FIG. 6A, the patient 7 assuming a standing posture starts a sitting motion (see time t0 in FIG. 17, for example, and specifically, see steps S201 to S203 described below that are similar to steps S101 to S103 in the first embodiment). Next, motion information used by the controller 12B to drive and control the first motor 41 and the second motor 42 independently of each other is generated by the motion information generator 10 so as to make the arm mechanism 4 perform a downward movement (see time t1 in FIG. 17, for example, and see step S205 described below) as an advice operation by the knee-bending adviser 60, as indicated by the down arrow in FIG. 6B. This motion in step S205 is indicated by the section from time t0 to time t1 in FIG. 17. At this time, the motion speed (for example, the speed of movement) in the z-axis direction is changed so as to maintain the force at time t0. That is, the controller 12B controls the speed of movement of the arm mechanism 4 so that the patient 7 does not apply to the arm mechanism 4 a force equal to or larger than a force applied by the patient 7 to the arm mechanism 4 when the patient 7 assumes a standing posture to thereby prevent the patient 7 from applying a force more than necessary to the arm mechanism 4. As a result, the patient 7 can assume a sitting posture while using their remaining muscle strength.

Specifically, in a case where the controller 12B determines that the force detected by the force detector 17 becomes smaller than the force at time t0 by a predetermined threshold (for example, 1 [N]) or more (for example, in a case where the downward force in the z-axis direction increases), the controller 12B determines that the patient 7 applies a load to the arm mechanism 4 more than necessary and controls the motion of the arm mechanism 4 so as to increase the speed of movement of the arm mechanism 4 in the section from time t0 to time t1 without changing the path. Specifically, after a pulling motion by the arm mechanism 4 has been started, motion information for increasing the pulling speed at which the arm mechanism 4 pulls the second coupler 3cb downward relative to the patient 7 is generated. As a result, the force on the z axis remains almost constant in a certain range as illustrated on a time-series basis in FIG. 17.

In a case where the controller 12B determines that the force detected by the force detector 17 becomes larger than the force at time t0 by the predetermined threshold or more (for example, in a case where the upward force in the z-axis direction increases), the controller 12B does not change the speed of movement of the arm mechanism 4.

When the controller 12B performs the control described above, assistance more than necessary is not provided to the patient 7. Therefore, a load is applied to the lower body of the patient 7, which can also be used for rehabilitation.

Next, the controller 12B controls a pulling motion of the arm mechanism 4 so as to perform a movement in the forward direction relative to the patient 7, as illustrated in FIG. 6C. In association with the movement of the arm mechanism 4 in the forward direction, the force in the minus direction of the x axis increases as indicated at time t2 in FIG. 17, which indicates that their center of gravity moves in the forward direction. The controller 12B detects a time point at which the force detected by the force detector 17 reaches or exceeds a predetermined threshold (for example, 1 [N]) (for example, the force fx2 at time t2), and performs control so as to make the arm mechanism 4 perform a backward movement at the time point, as illustrated in FIG. 6D. With this motion, although the distance over which a forward pulling motion is performed differs depending on the height of the patient 7, the distance over which a lean-forward motion is performed can be determined by the controller 12B on the basis of the value of the force detected by the force detector 17. Last, the patient 7 is in a sitting state, as illustrated in FIG. 6E, and the sitting motion is completed.

The motion information generator 10 generates the motion information described above and stores the motion information in the motion information database 8 via the database input/output unit 9.

Note that the value detected by the force detector 17 may be displayed on a monitor provided to the arm mechanism 4, for example, so that the degree of the applied force can be checked. In this case, a larger force applied to the arm mechanism 4 indicates that the patient 7 fails to use their body, such as their lower body. Therefore, the patient 7 can check the progress of rehabilitation, for example. Further, the patient 7 can make a comparison with stored past force information to thereby check the effects of rehabilitation produced so far.

Controller 12B

The controller 12B performs control to drive the first motor 41 and the second motor 42 of the arm mechanism 4 so as to follow position information and force information, which constitute motion information input from the database input/output unit 9. In addition, the controller 12B controls brakes applied by the front-wheel brake 14c and by the rear-wheel brake 14d on the basis of instructions input from the input IF 6 for turning on or off the front-wheel brake 14c and the rear-wheel brake 14d.

Now, motions of the robot system 1B controlled by the controller 12B using the motion information generated by the motion information generator 10 are described below.

Figure 18:
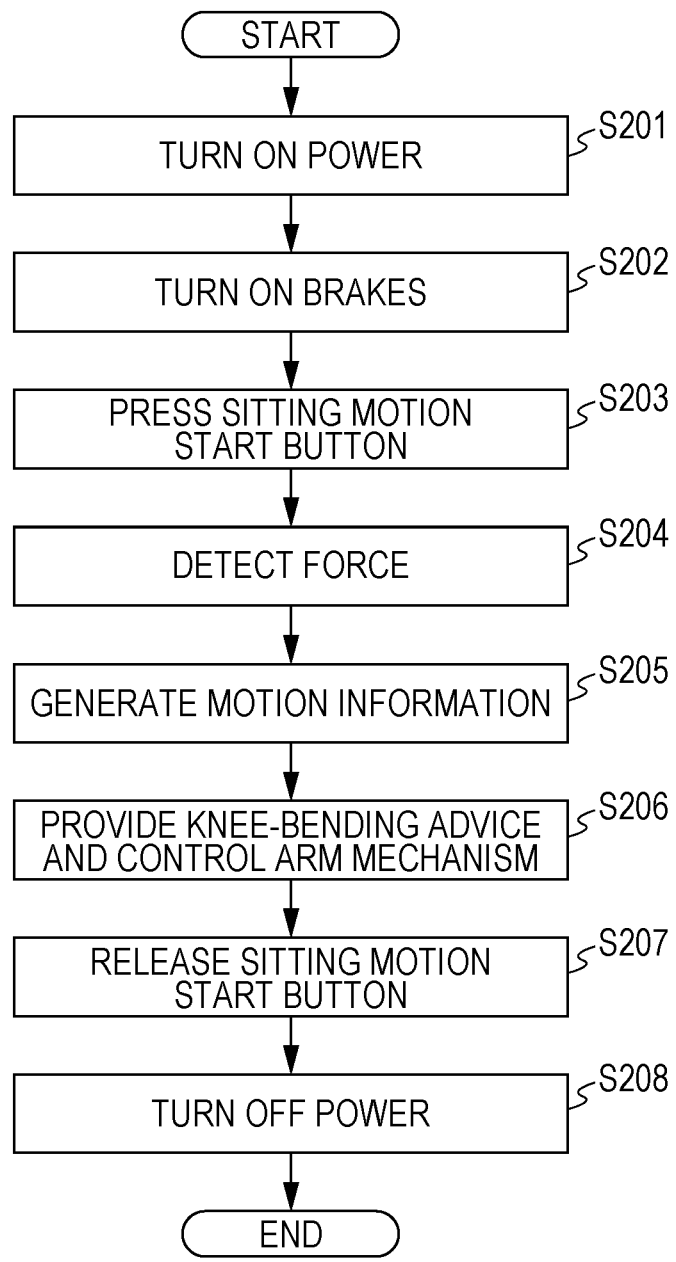
FIG. 18 is a flowchart of a controller according to the second embodiment of the present disclosure.
Figure 19:
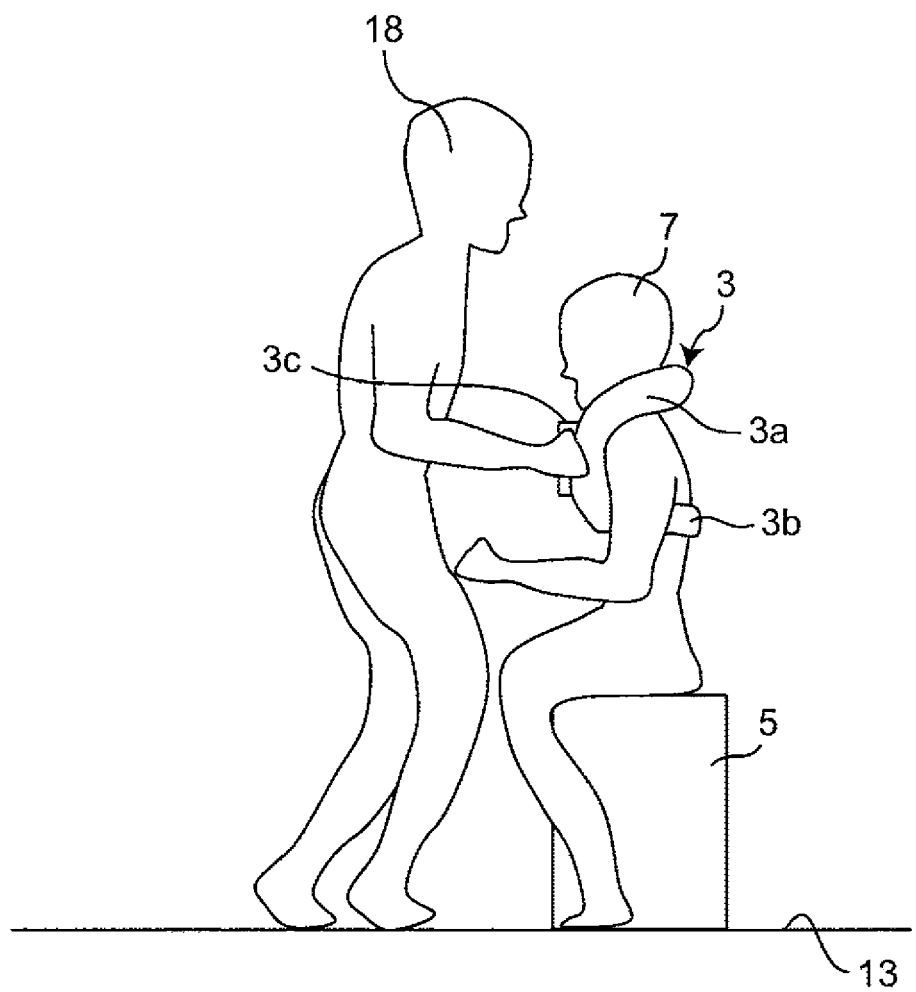
FIG. 19 is a diagram schematically illustrating a configuration of a hold mechanism according to a third embodiment of the present disclosure.

The motions and procedures of the arm mechanism 4 of the robot system 1B and the motions of the patient 7 associated therewith illustrated in FIGS. 6A to 6E are described with reference to the flowchart in FIG. 18.

When the patient 7 assuming a standing posture with the hold mechanism 3g put on their body applies a force to the arm mechanism 4 forward or backward, as illustrated in FIG. 6A, the front wheels 14a and the rear wheels 14b of the walking mechanism 14 rotate as desired, and the walking mechanism 14 works as a walking frame and assists the patient 7 in walking. The patient 7 moves to the seat 5.

Thereafter, in step S201, the patient 7 turns on the power of the robot system 1B by using the input IF 6 of the robot 20B.

Next, in step S202, when the patient 7 turns on the front-wheel brake 14c and the rear-wheel brake 14d by using the input IF 6, brakes can be applied so that the front wheels 14a and the rear wheels 14b of the walking mechanism 14 do not rotate in accordance with control performed by the controller 12B.

Next, in step S203, the patient 7 presses the sitting motion start button of the input IF 6. In this example, the robot system 1B performs a motion in a state where the sitting motion start button is kept pressed, and stops the motion when the sitting motion start button is released. In subsequent steps S204 to S206, the knee-bending adviser 60 performs an advice operation of providing advice on the knee-bending timing, and the control apparatus 11B of the robot system 1B drives and controls the first driver 4a and the second driver 4b of the arm mechanism 4 independently of each other to assist a sitting motion in which the patient 7 assuming a standing posture as illustrated in FIG. 3A performs a motion as illustrated in FIG. 3B and settles the buttocks 7e of the patient 7 on the seat 5 as illustrated in FIG. 3C.

Next, in step S204, the force detector 17 detects a force applied by the patient 7 to the arm mechanism 4.

Next, in step S205, the motion information generator 10 generates motion information on the basis of the force detected by the force detector 17 and position information regarding the arm mechanism 4 and stores the motion information in the motion information database 8 via the database input/output unit 9.

Next, in step S206, the knee-bending adviser 60 performs an advice operation of providing advice on the knee-bending timing, and the controller 12B drives and controls the first motor 41 and the second motor 42 independently of each other in order to drive the arm mechanism 4 so as to follow the motion information obtained from the database input/output unit 9.

For example, the arm mechanism 4 is controlled in accordance with the control performed by the controller 12B so that the arm mechanism 4 performs a downward movement, as illustrated in FIGS. 6A and 6B (this corresponds to an advice operation performed by the knee-bending adviser 60). At this time, the motion information generator 10 generates motion information on the basis of the force detected by the force detector 17 and stores the motion information in the motion information database 8 via the database input/output unit 9. Further, the controller 12B controls the arm mechanism 4 so that the arm mechanism 4 performs a movement in the forward direction, as illustrated in FIG. 6C. At this time, if the controller 12B determines that the force detected by the force detector 17 reaches or exceeds a predetermined threshold, the controller 12B controls the arm mechanism 4 so that the arm mechanism 4 performs a backward movement, as illustrated in FIG. 6D, at the time point at which the force reaches or exceeds the predetermined threshold. As a result, the patient 7 is in a sitting-posture state, as illustrated in FIG. 6E.

Next, in step S207, when the patient 7 restores the input IF 6 (releases the button that the patient 7 keeps pressing, for example), the operation performed by the controller 12B for controlling the sitting motion assistance and driving the arm mechanism 4 stops. Note that, in a step before step S207, the patient 7 can release the button of the input IF 6 that the patient 7 keeps pressing to suspend the operation performed by the controller 12B for controlling the sitting motion and driving the arm mechanism 4.

Next, in step S208, the patient 7 turns off the power by using the input IF 6.

Note that the patient 7 may select and use a piece of motion information from among pieces of motion information stored for the respective height ranges similarly as in the first embodiment.

Advantages of Second Embodiment

Motion information for the arm mechanism 4 is generated by the motion information generator 10 on the basis of position information stored in the motion information database 8 and a force detected by the force detector 17 and stored in the motion information database 8. Therefore, motion information that corresponds to the remaining muscle strength of the lower body of the patient 7, the muscle strength differing depending on the patient, or that corresponds to the height of the patient 7, for example, can be generated by the motion information generator 10 in accordance with the circumstances. When the patient 7 performs a sitting motion in which the patient 7 changes their posture from a standing posture to a sitting posture, it is possible to advise the patient 7 to perform a motion in which the patient 7 bends the knees 7k, by using the knee-bending adviser 60. Therefore, when the patient 7 assumes a leaning-forward posture immediately before sitting down, it is possible to decrease the degree by which the patient 7 leans forward so as to make their motion close to the motion of a healthy person, and to make the sitting motion of the patient 7 be stably performed. As a result, a force to compensate for the shortage is added while allowing the patient 7 to use the remaining muscle strength of their lower body to assist the patient 7 in sitting down in a manner similar to the sitting motion of a healthy person.

Third Embodiment

FIG. 19 and FIGS. 20A to 20D illustrate a case where the arm mechanism 4 and the walking mechanism 14 are not provided and a helper 18 who helps the patient 7 assists a sitting motion in which the patient 7 changes their posture from a standing posture to a sitting posture, by using the care belt 3 according to a third embodiment of the present disclosure. In this case, the helper 18 can grip the coupler 3c that is positioned on the chest 7d of the patient 7 and couples the first holder 3a to the second holder 3b in front of the patient 7.

Figure 20A:
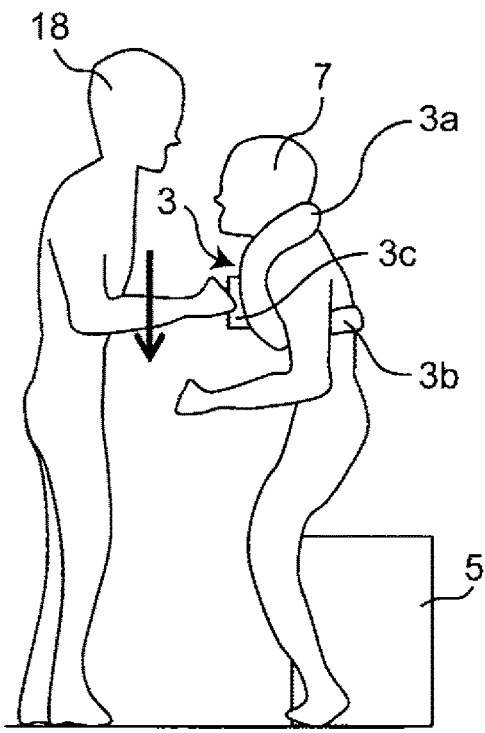
FIG. 20A is a diagram illustrating a motion in which the hold mechanism according to the third embodiment of the present disclosure is used.

The patient 7 puts on the care belt 3 to hold their upper body, as illustrated in FIG. 20A, and the helper 18 grips the coupler 3c of the care belt 3 with their hands and pulls the care belt 3 downward (this corresponds to an advice operation performed by the knee-bending adviser 60), as illustrated in FIG. 20A. When the helper 18 pulls the care belt 3 downward, the force applied by the helper 18 is transmitted to the first holder 3a and to the patient 7 via the contact portion between the first holder 3a and the shoulders 7j of the patient 7, and the upper body of the patient 7 is lowered to encourage the patient 7 to bend the knees 7k. This corresponds to an advice operation of providing advice on the knee-bending timing performed by the knee-bending adviser 60.

Figure 20B:
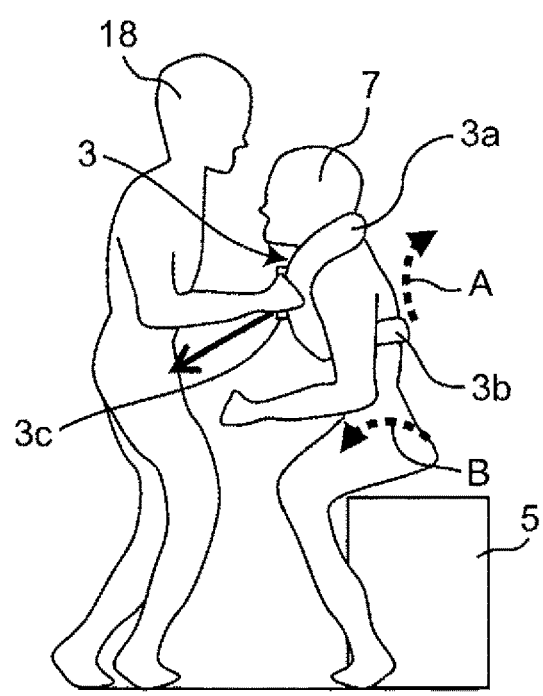
FIG. 20B is a diagram illustrating a motion in which the hold mechanism according to the third embodiment of the present disclosure is used.
Figure 20C:
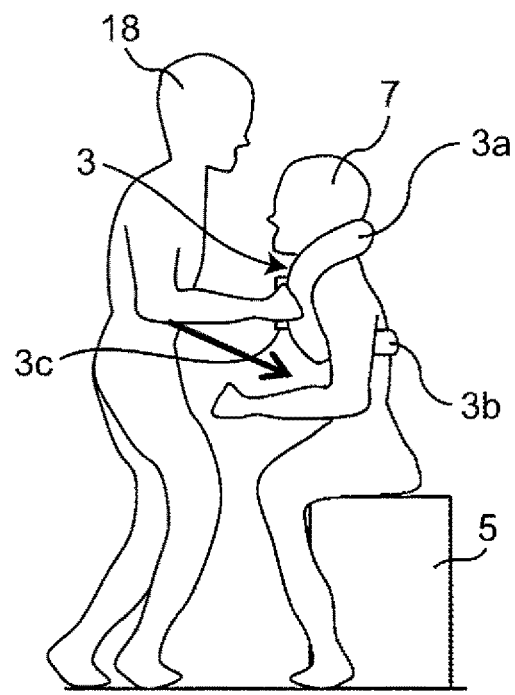
FIG. 20C is a diagram illustrating a motion in which the hold mechanism according to the third embodiment of the present disclosure is used.
Figure 20D:
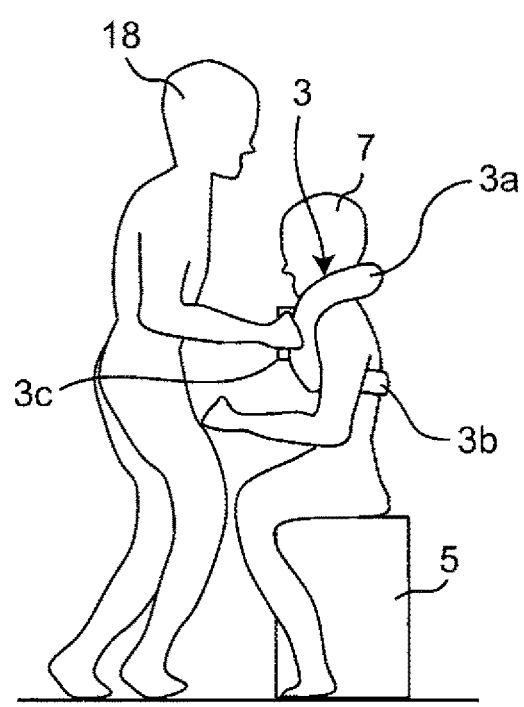
FIG. 20D is a diagram illustrating a motion in which the hold mechanism according to the third embodiment of the present disclosure is used.

Next, the helper 18 pulls the care belt 3 towards the helper 18, as illustrated in FIG. 20B. With this motion, the force is transmitted to the first holder 3a and to the second holder 3b from the helper 18 to make the pelvis of the patient 7 tilt in the forward direction as indicated by the dotted counterclockwise arrow B in FIG. 20B and to make the upper body of the patient 7 bend backward as indicated by the dotted clockwise arrow A in FIG. 20B. As a result, it is possible to encourage the patient 7 to lean forward in a state where the lean-forward angle is small. At the timing when the helper 18 confirms the lean-forward state, the helper 18 pushes the care belt 3 obliquely downward and backward towards the seat 5 so that the patient 7 sits on the seat 5, as illustrated in FIG. 20C. Consequently, the sitting posture of the patient 7 becomes complete, as illustrated in FIG. 20D.

Figure 21A:
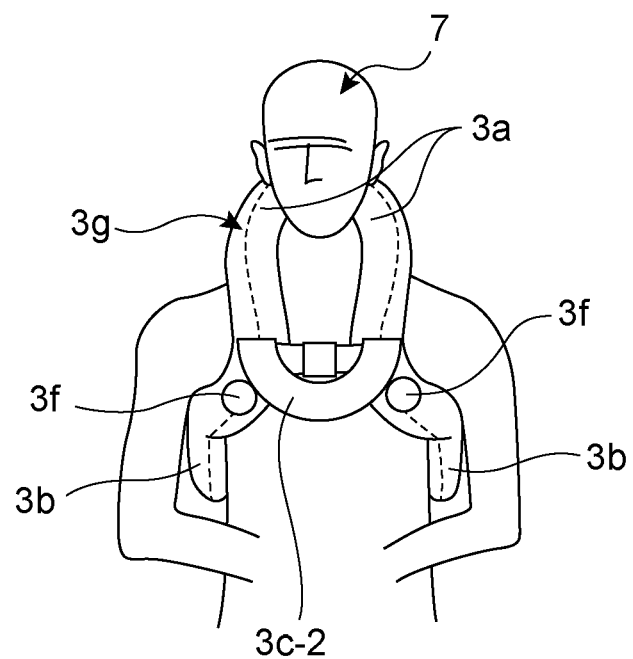
FIG. 21A is a front view illustrating details of a hold mechanism according to a modification of the third embodiment of the present disclosure in a state where the hold mechanism is put on a patient.
Figure 21B:
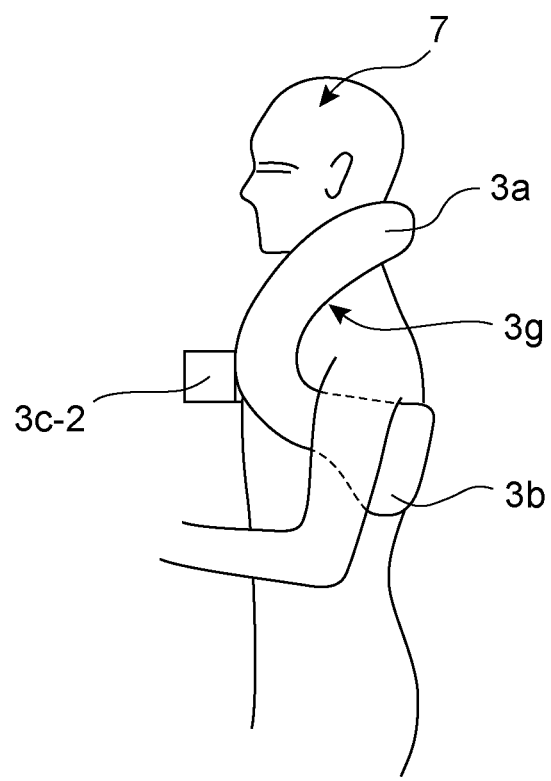
FIG. 21B is a side view illustrating a detailed configuration of the hold mechanism according to the modification illustrated in FIG. 21A in the state where the hold mechanism is put on a patient.

Note that, as the hold mechanism 3g in the third embodiment, the hold mechanism 3g as in the first embodiment may be used. Alternatively, the coupler 3c may be modified to a coupler 3c-2 that is curved in a "U" shape so that the helper 18 can easily grip the coupler 3c-2 with their hand, as illustrated in FIGS. 21A and 21B.

Figure 22A:
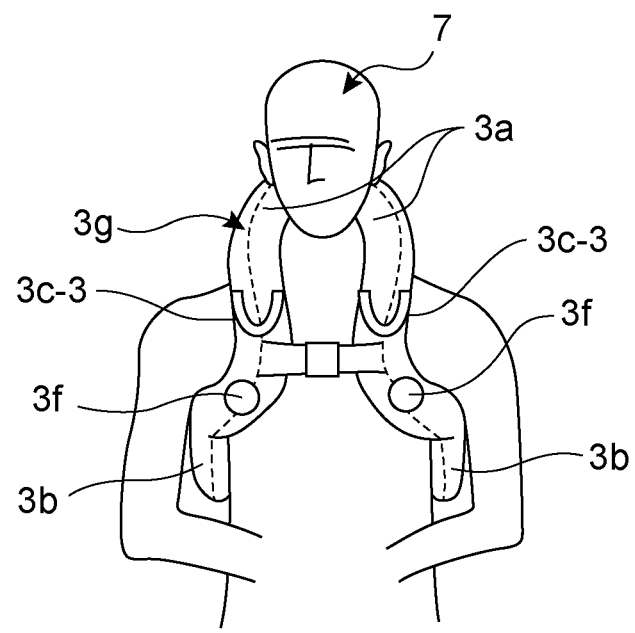
FIG. 22A is a front view illustrating a detailed configuration of a hold mechanism according to another modification of the third embodiment of the present disclosure in a state where the hold mechanism is put on a patient.
Figure 22B:
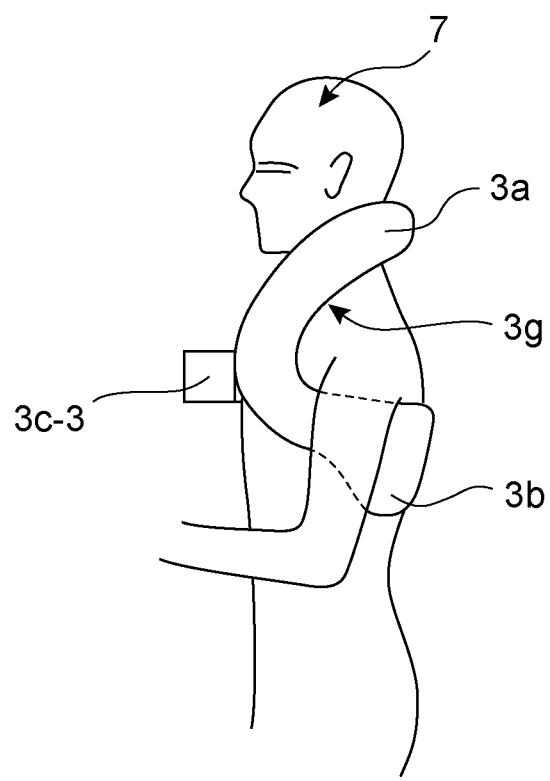
FIG. 22B is a side view illustrating the detailed configuration of the hold mechanism according to the modification illustrated in FIG. 22A in the state where the hold mechanism is put on a patient.

The number of the couplers 3c is not limited to one, and a plurality of the couplers 3c may be provided. For example, couplers 3c-3 each curved in a "U" shape may be respectively provided on the front portions of the sealed tubular member in an upside-down "U" shape of the first holder 3a, as illustrated in FIGS. 22A and 22B.

Advantages of Third Embodiment

When the patient 7 puts on the care belt 3 and the helper 18 grips the coupler 3c and applies a force, it is possible to easily assist a motion in which the posture changes from a standing posture to a sitting posture.

Modifications of First, Second, and Third Embodiments

The first and second embodiments employ a configuration in which the robot system 1 (1B) includes the walking mechanism 14 on which the arm mechanism 4 is provided; however, the arm mechanism 4 may be provided to the seat 5, such as a bedside, a toilet, or a wheelchair.

Figure 26A:
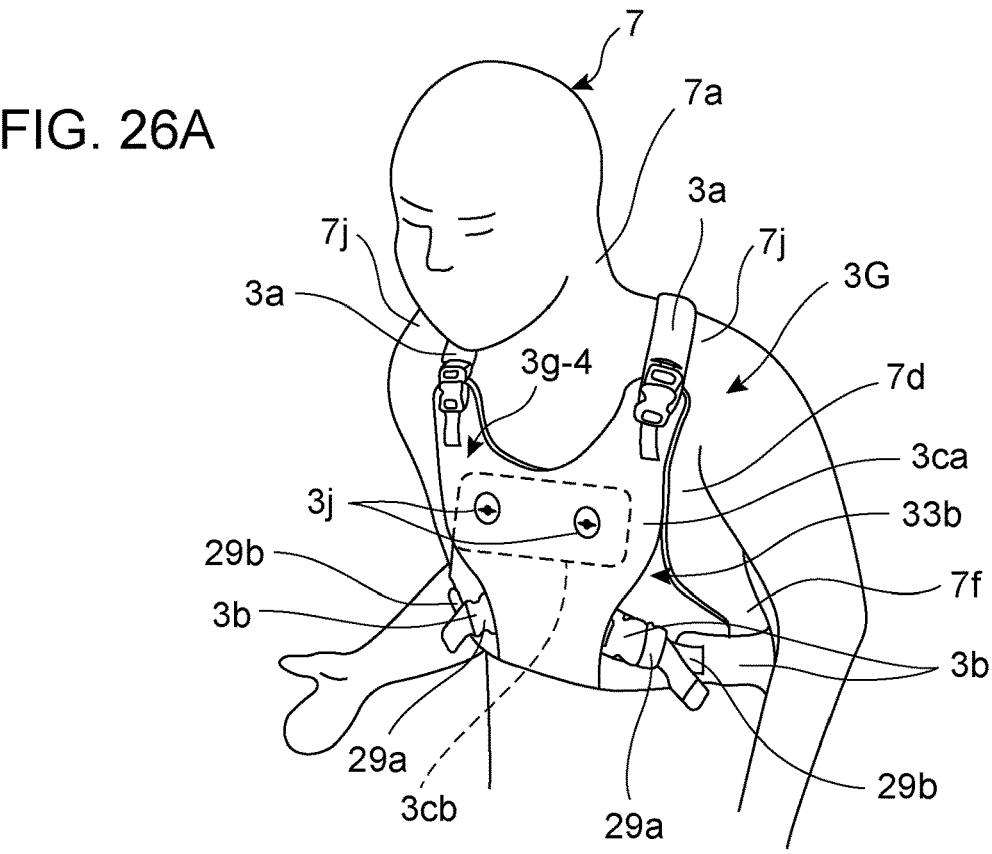
FIG. 26A is a perspective view of a state where a care belt according to a modification of the present disclosure is put on a patient.
Figure 26B:
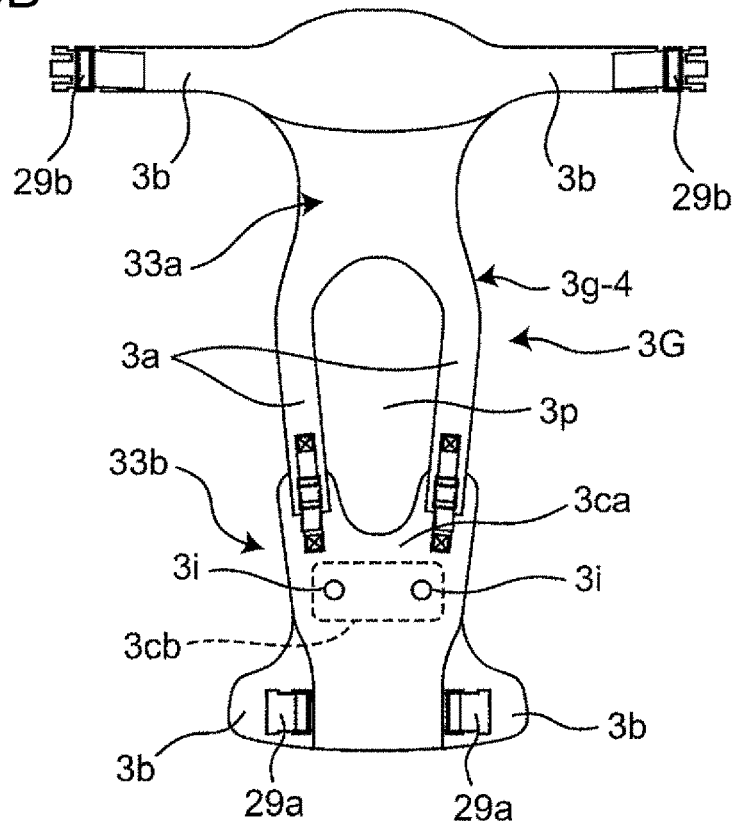
FIG. 26B is an explanatory diagram illustrating the front side (that is, the outer surface) of the care belt according to the modification illustrated in FIG. 26A in a state where the care belt is unfolded.
Figure 26C:
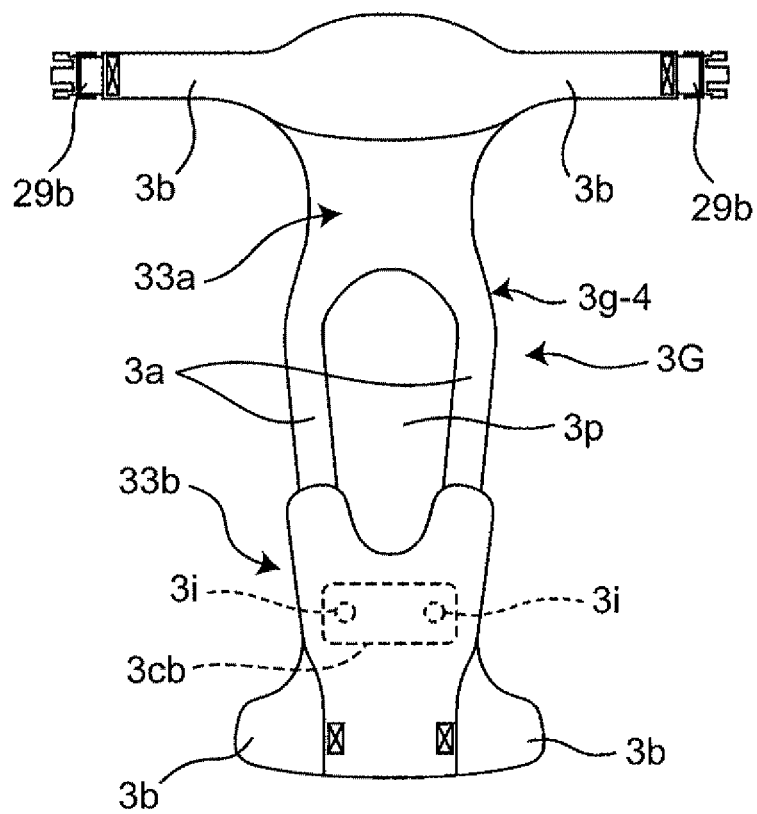
FIG. 26C is an explanatory diagram illustrating the back side (that is, the inner surface) of the care belt according to the modification illustrated in FIG. 26A in the state where the care belt is unfolded.

A care belt 3G according to a modification of the present disclosure is illustrated in FIGS. 26A to 26C. In this modification, the coupler 3c of the care belt 3G is formed of the first coupler 3ca and the second coupler 3cb. The first coupler 3ca is positioned on the chest 7d of the patient 7, is coupled to both or one of the paired portions of the first holder 3a and to both or one of the paired portions of the second holder 3b of a hold mechanism 3g-4, and is formed of a soft material, such as urethane. The second coupler 3cb is provided inside the first coupler 3ca, is formed of a sheet-like hard core, and can be detachably coupled to the coupler 4g of the arm mechanism 4, which is an example of a pulling mechanism. The upper side of FIG. 26B corresponds to a back side 33a, and the lower side thereof corresponds to a chest side 33b.

The care belt 3G thus configured can be put on in such a manner that the patient 7 passes the neck 7a through a hole 3p between the paired portions that constitute the first holder 3a, passes, to the front, buckles 29b for quick fitting provided on the respective sides of the second holder 3b that extends from the back, and detachably engages, in front of their body, the buckles 29b and buckles 29a on the front side. As a result, the first holder 3a can hold the neck 7a and the back 7b of the patient 7, and the second holder 3b can hold the lower back 7c of the patient 7.

Figure 26D:
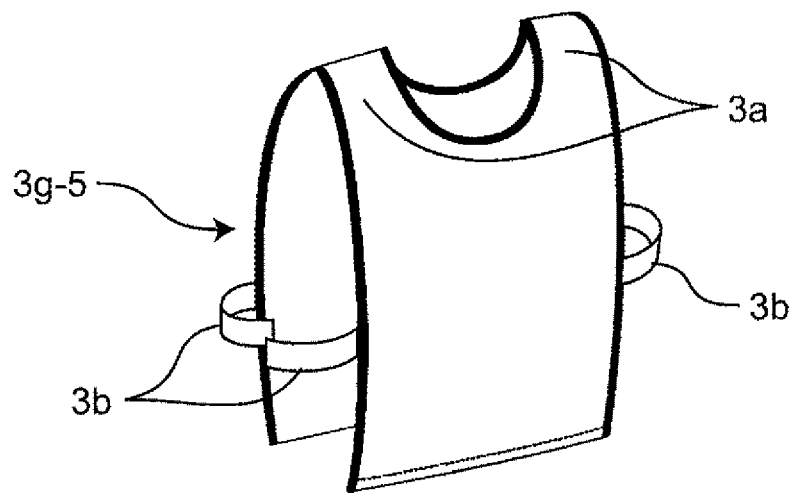
FIG. 26D is a perspective view of a care belt according to another modification of the present disclosure.

Further, a hold mechanism 3g-5 illustrated in FIG. 26D, which is a sleeveless garment like a bib, for example, may be used as a modification of the care belt 3. A garment like this modification is an example of the care belt according to the present disclosure.

FIGS. 27A to 27I illustrate an example of the main mechanism 2. In this example, the handle 15 that is formed of a "U"-shaped flat board and has a certain length so that the patient 7 can put their elbows thereon is provided. The input IF 6 operated by the patient 7 is disposed at the coupling portion between the third arm 4e and the fourth arm 4f. On the front face of the main mechanism 2, an input IF 6G on the helper side that can be operated by a helper and a light-emitting unit 6H are provided, and a round steering-wheel-like handle 15G on the helper side is provided in the vicinity of the input IF 6G and the light-emitting unit 6H. Therefore, even if the patient 7 performs no operations, when a helper operates the input IF 6G on the helper side to start operating the arm mechanism 4 of the main mechanism 2, grips the handle 15G on the helper side, and thereafter moves the walking mechanism 14 forward in the front direction of the patient 7 to perform a pulling motion, the helper can assist a sitting motion in which the patient 7 in a standing-posture state assumes a sitting posture. In the light-emitting unit 6H, a light-emitting diode (LED) or the like can be turned on or be made to flash as appropriate in order to indicate the on/off state of the power, the drive state of the arm mechanism 4, and the timing at which the walking mechanism 14 is to move, for example, in association with the input IF 6G on the helper side or with the input IF 6.

The care belt according to the present disclosure may be used for purposes other than for assisting a patient having muscle weakness. In addition to a patient having muscle weakness, a healthy person carrying a heavy bag, for example, may be a user of the care belt and may put on the care belt as a supporter for assisting a sitting motion.

The robot 20 may be configured and the arm mechanism 4 may be controlled as follows.

The robot 20 is connected to the coupler 3c (the coupler 3c includes the first coupler 3ca and the second coupler 3cb) that is included in a supporter, which is the care belt 3G put on a user, namely, the patient 7, as illustrated in FIG. 1A, FIG. 14A, and FIGS. 26A to 26C, for example, and includes the arm mechanism 4 that moves the coupler 3c in the x-axis direction and/or the z-axis direction. Note that, as illustrated in FIG. 1A, for example, the x axis and the z axis are parallel to a virtual plane on which the arms included in the arm mechanism 4 move, the x axis and the z axis are orthogonal to each other, and the z axis is perpendicular to the plane (for example, the floor 13) on which the robot 20 is put. The direction extending from the plane (for example, the floor 13) on which the robot 20 is put towards the robot 20 is the positive direction of the z axis, and the direction extending from the proximal end (the coupler 4g) of the arm mechanism 4 towards the coupler 3c is the positive direction of the x axis.

The motion information database 8 may hold data as illustrated in FIG. 5B. The data illustrated in FIG. 5B represents the position at which the proximal end of the arm mechanism 4 is to be positioned at time ti, that is, a desired coordinate value pi(Xi, Zi).

The robot 20 includes the control apparatus 11 that controls the arm mechanism 4 on the basis of the data that includes times ("time" in FIG. 5B) held by the motion information database 8 and desired coordinate values ("position" in FIG. 5B) at the respective times.

Figure 5C:
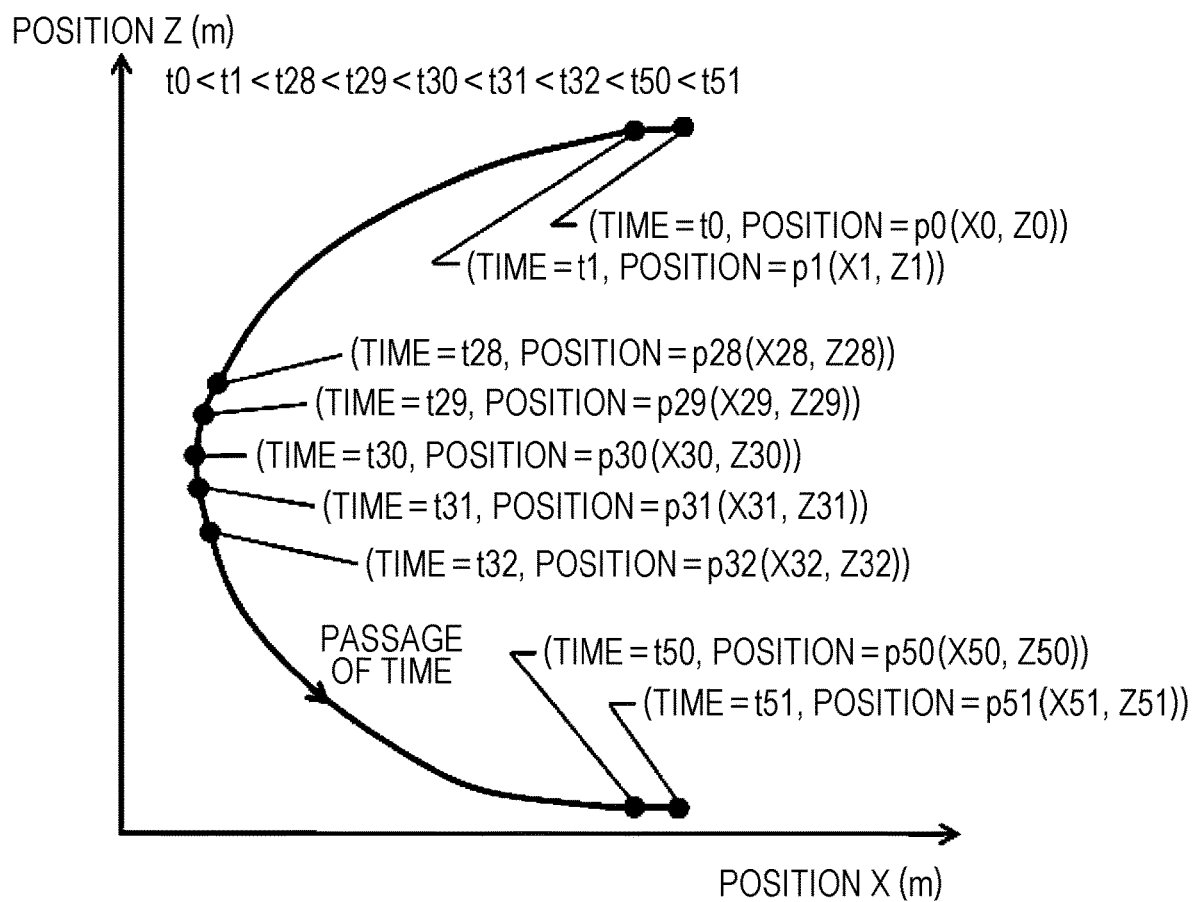
FIG. 5C is a diagram illustrating desired coordinate values in a modification of the present disclosure.

As illustrated in FIGS. 5B and 5C, the z-axis coordinate values of the desired coordinate values are set so as to decrease for the times from time t0 to time t51, and the x-axis coordinate values of the desired coordinate values are set so as to decrease for the times from t0 to t30 and so as to increase for the times from t30 to t51, where t0<t1<t28<t29<t30<t31<t32<t50<t51.

When the control apparatus 11 controls the robot 20 on the basis of the data illustrated in FIG. 5B, the coupler 3c moves forward and downward relative to the user over the time period from t0 to t30 and thereafter moves backward and downward relative to the user over the time period from t30 to t51. That is, the user wearing the supporter that includes the coupler 3c receives, from the robot 20, assistance for a forward and downward movement relative to the user over the time period from t0 to t30, and thereafter receives, from the robot 20, assistance for a backward and downward movement relative to the user over the time period from t30 to t51. Time t0 may be assumed to be the start time of the sitting operation assistance, and time t51 may be assumed to be the end time of the sitting operation assistance.

Figure 5D:
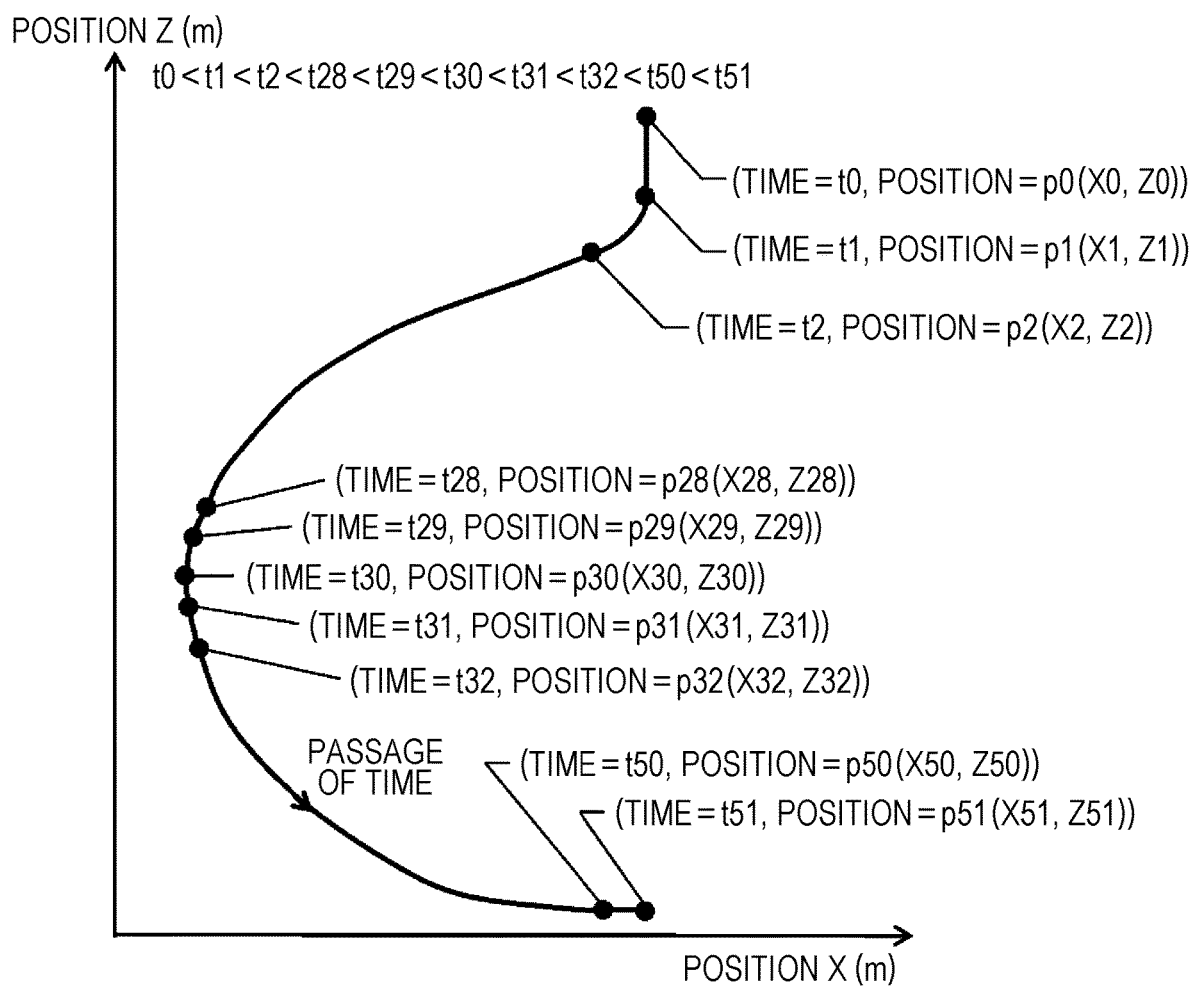
FIG. 5D is a diagram illustrating desired coordinate values in a modification of the present disclosure.

The control apparatus 11 may control the robot 20 on the basis of data illustrated in FIG. 5D. In this case, the coupler 3c does not move in the front-back direction of the user but moves downward relative to the user over the time period from t0 to t1, subsequently moves forward and downward relative to the user over the time period from t1 to t30, and thereafter moves backward and downward relative to the user over the time period from t30 to t51. That is, the user wearing the supporter that includes the coupler 3c does not receive, from the robot 20, assistance for a movement in the front-back direction of the user but receives assistance for a downward movement relative to the user over the time period from t0 to t1, subsequently receives, from the robot 20, assistance for a forward and downward movement relative to the user over the time period from t1 to t30, and thereafter receives, from the robot 20, assistance for a backward and downward movement relative to the user over the time period from t30 to t51. Time t0 may be assumed to be the start time of the sitting operation assistance, and time t51 may be assumed to be the end time of the sitting operation assistance.

The supporter, which is the care belt 3G, may be configured as follows.

Figure 26E:
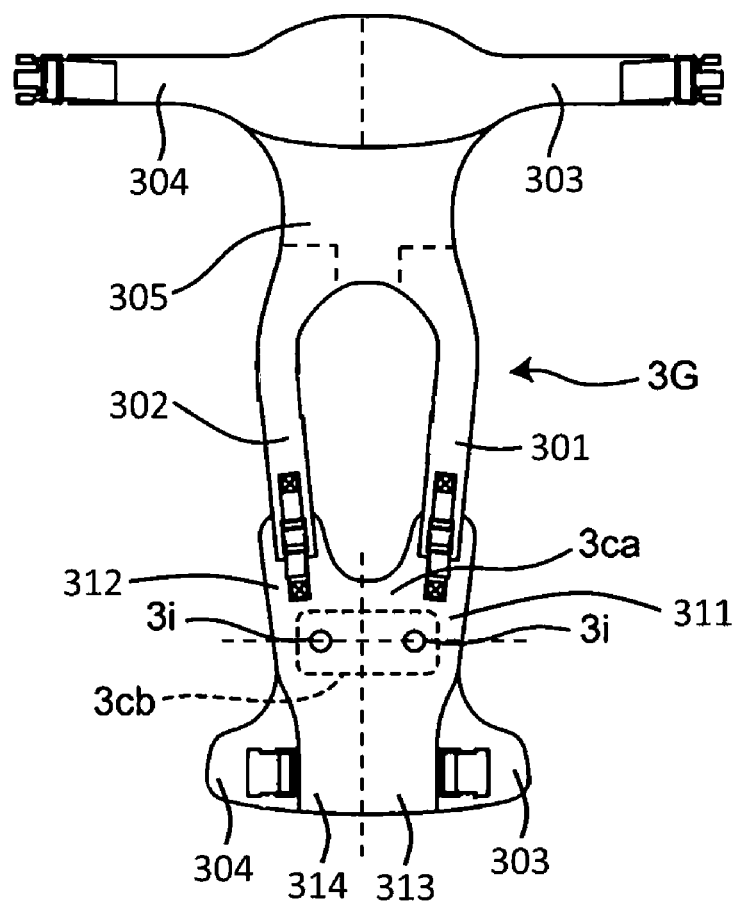
FIG. 26E is an explanatory diagram illustrating the front side (that is, the outer surface) of the care belt according to the modification illustrated in FIG. 26A in the state where the care belt is unfolded.
Figure 27A:
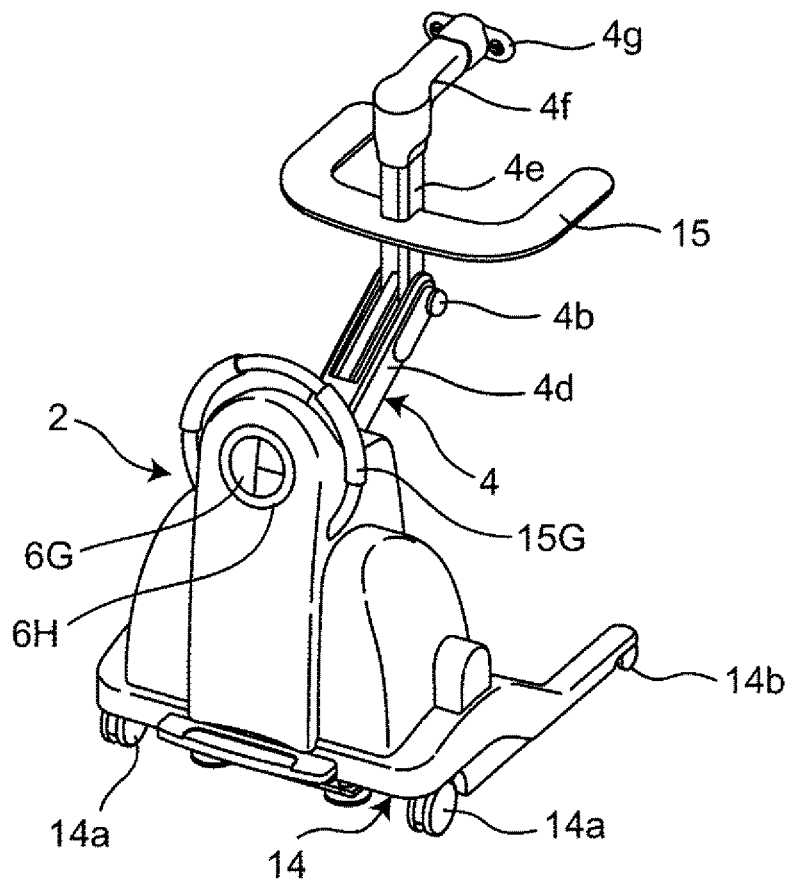
FIG. 27A is a perspective view of a main mechanism according to yet another modification of the present disclosure.
Figure 27B:
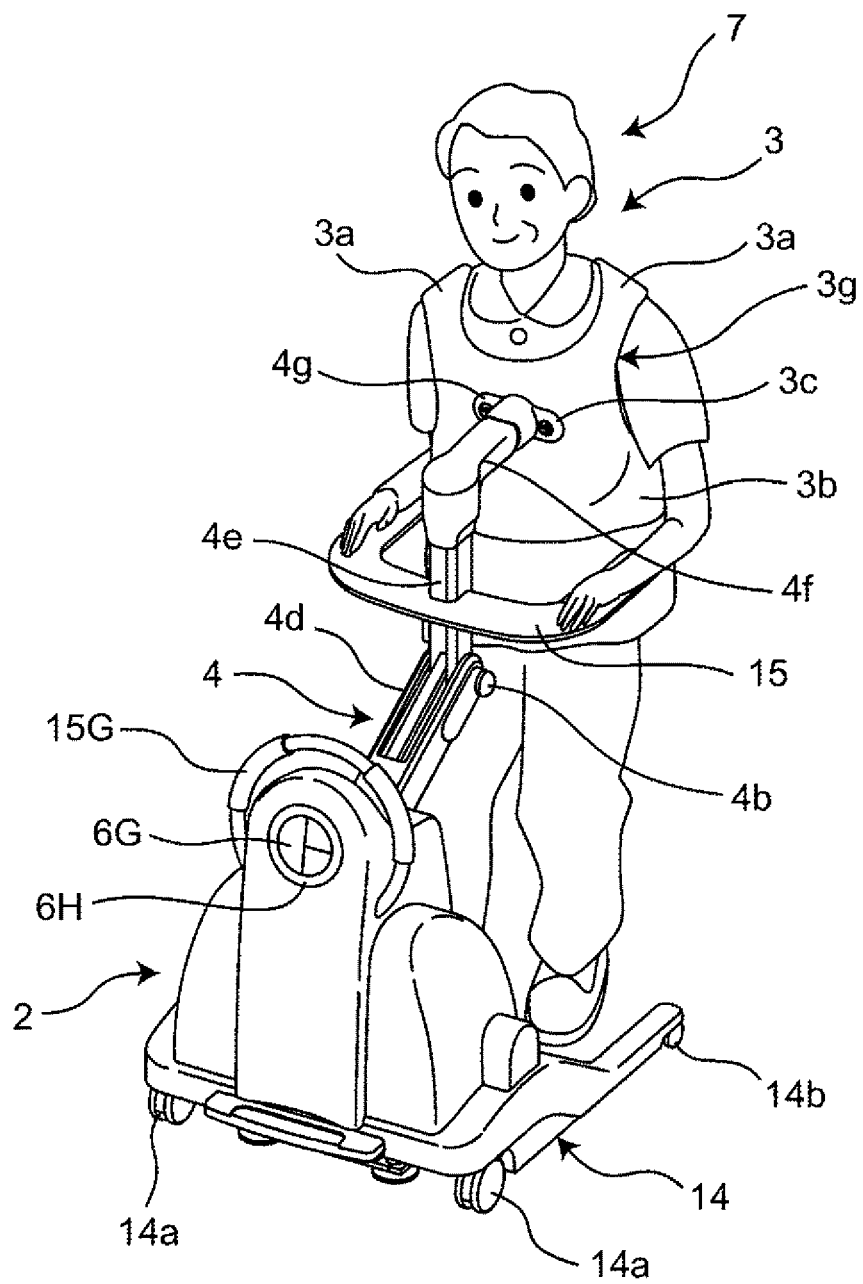
FIG. 27B is a perspective view of the main mechanism according to the modification illustrated in FIG. 27A and a patient.
Figure 27C:
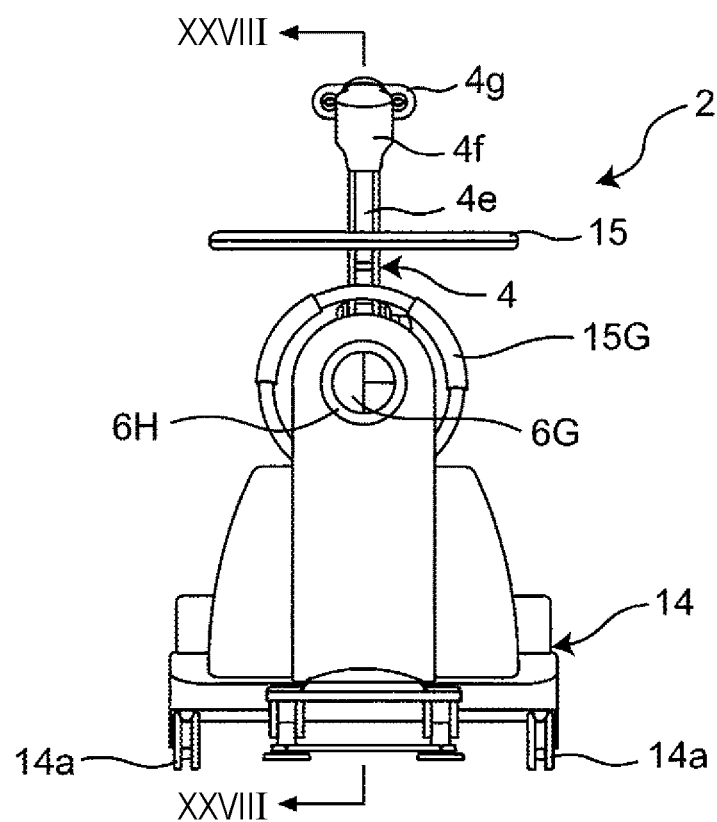
FIG. 27C is a front view of the main mechanism according to the modification illustrated in FIG. 27A.
Figure 27D:
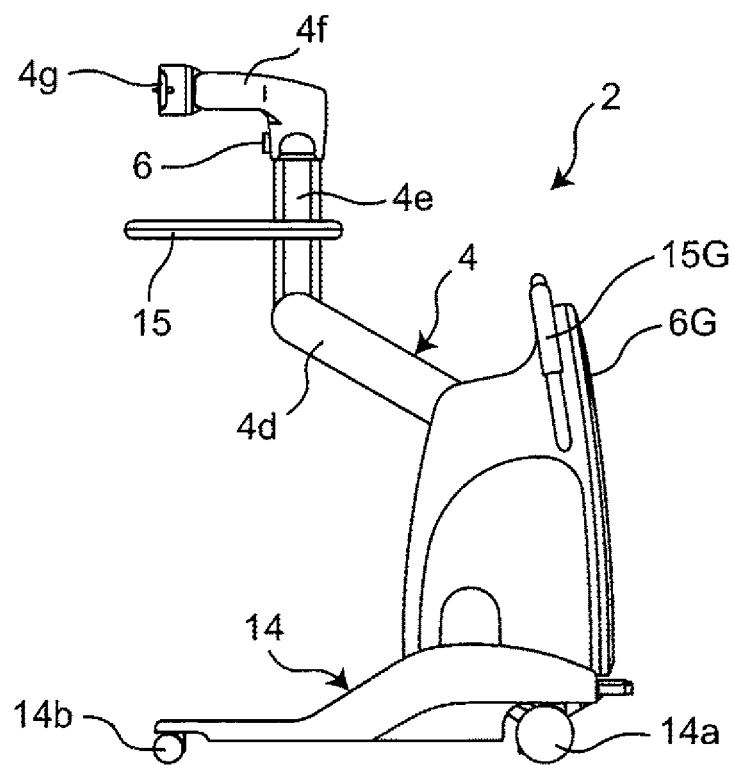
FIG. 27D is a left side view of the main mechanism according to the modification illustrated in FIG. 27A.
Figure 27E:
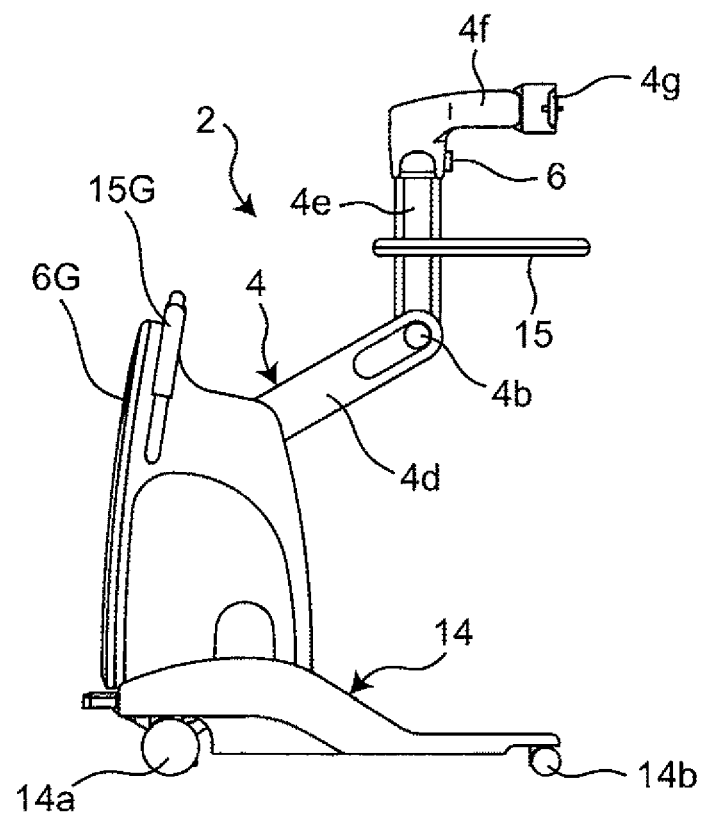
FIG. 27E is a right side view of the main mechanism according to the modification illustrated in FIG. 27A.
Figure 27F:
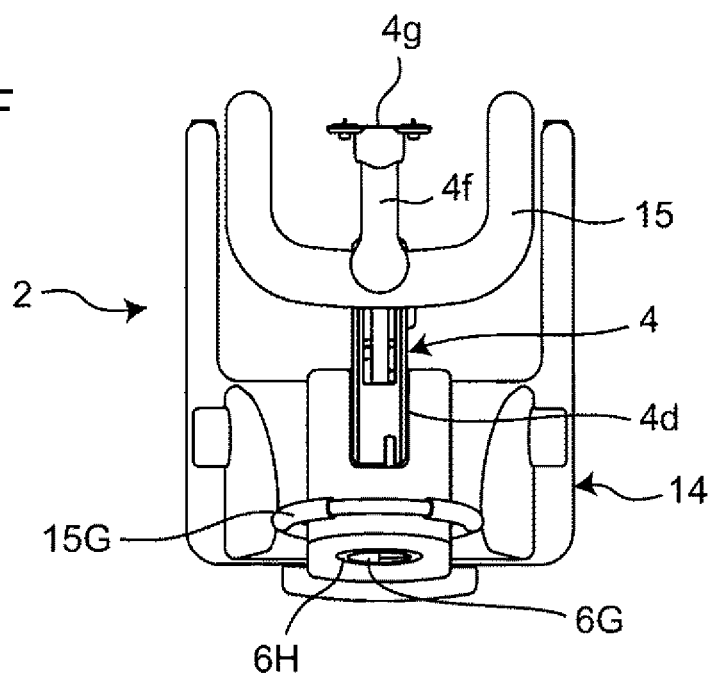
FIG. 27F is a plan view of the main mechanism according to the modification illustrated in FIG. 27A.
Figure 27G:
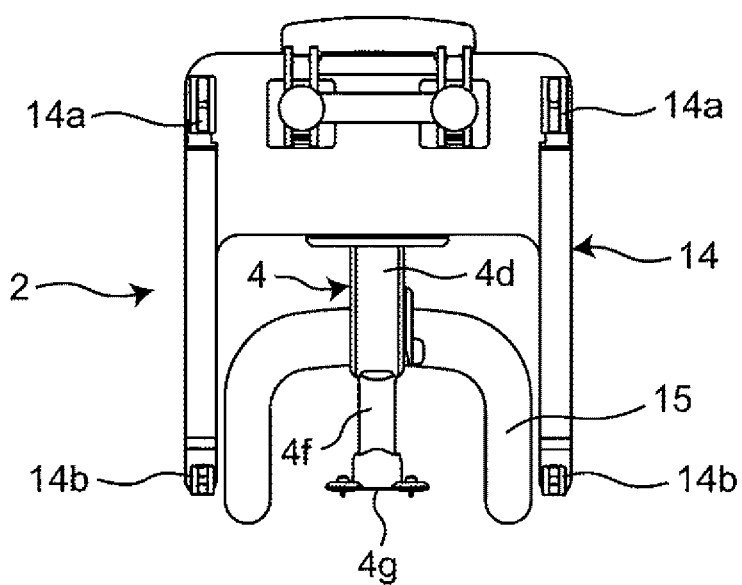
FIG. 27G is a bottom view of the main mechanism according to the modification illustrated in FIG. 27A.
Figure 27H:
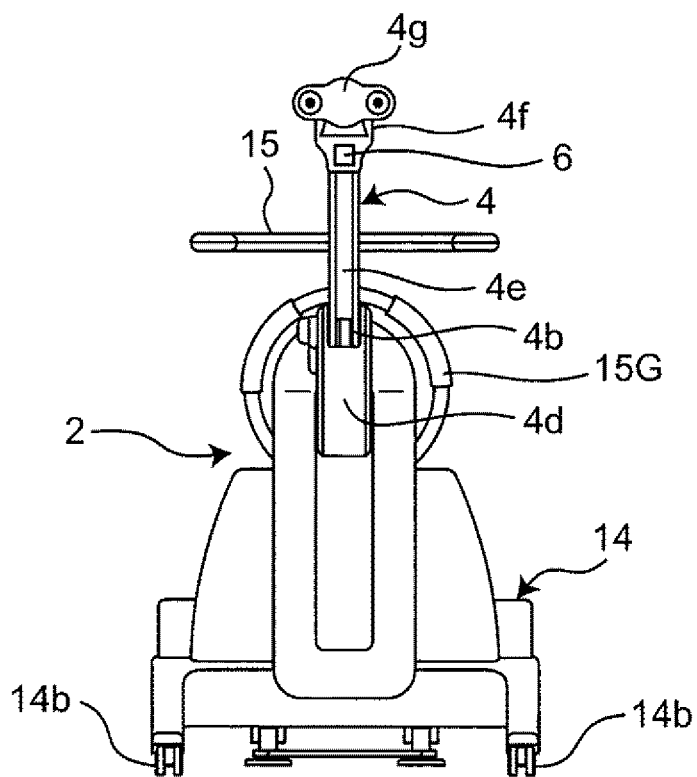
FIG. 27H is a back view of the main mechanism according to the modification illustrated in FIG. 27A.
Figure 27I:
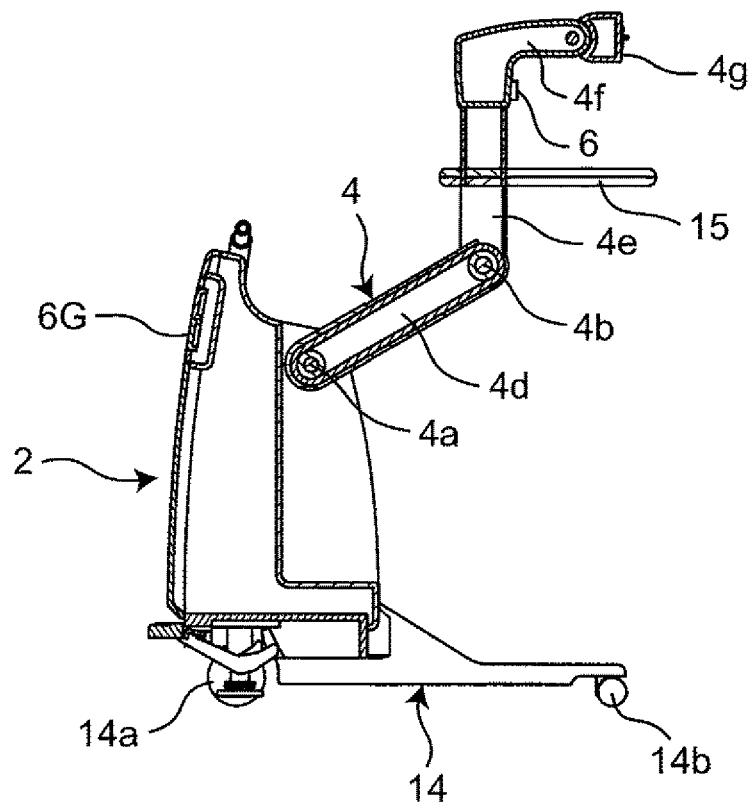
FIG. 27I is a cross-sectional view taken along line XXVII I-XXVII I' of FIG. 27C.

As illustrated in FIG. 26E, the care belt 3G (supporter) includes a left shoulder unit 301 having a portion that extends along the left shoulder of a user wearing the supporter, a right shoulder unit 302 having a portion that extends along the right shoulder of the user wearing the supporter, a left lower-back unit 303 having a portion that extends along the left lower-back of the user wearing the supporter, a right lower-back unit 304 having a portion that extends along the right lower-back of the user wearing the supporter, a connecting area 305 connected to the left shoulder unit 301, the right shoulder unit 302, the left lower-back unit 303, and the right lower-back unit 304 and having a portion that extends along the back of the user wearing the supporter, and the coupler 3c (the coupler 3c is formed of the first coupler 3ca and the second coupler 3cb).

The coupler 3c is coupled to the proximal end of the arm mechanism 4 via, for example, the buckles 3i included in the second coupler 3cb. A line that passes through the centers of the plurality of buckles 3i corresponds to a line (pulling line) on which a pulling force in the x-axis direction is applied by the arm mechanism 4.

The coupler 3c has a left upper portion 311 (the portion above the pulling line and on the right side of the vertical line of symmetry of the coupler 3c in the figure) that is connected to the left shoulder unit 301, has a right upper portion 312 (the portion above the pulling line and on the left side of the vertical line of symmetry of the coupler 3c in the figure) that is connected to the right shoulder unit 302, has a left lower portion 313 (the portion below the pulling line and on the right side of the vertical line of symmetry of the coupler 3c in the figure) that is connected to the left lower-back unit 303, and has a right lower portion 314 (the portion below the pulling line and on the left side of the vertical line of symmetry of the coupler 3c in the figure) that is connected to the right lower-back unit 304.

That is, the left shoulder unit 301, the right shoulder unit 302, the left lower-back unit 303, and the right lower-back unit 304 are connected to the coupler 3c. When the user puts on the supporter, the user is positioned between the coupler 3c and the connecting area 305.

The present disclosure has been described with reference to the first to third embodiments and modifications; however, the present disclosure is not limited to the first to third embodiments and modifications described above as a matter of course. The present disclosure embraces the following configurations.

In the embodiments, any portion of the control apparatuses 11 and 11B may be configured as software. The software can be stored in a recording medium, such as a storage device (a hard disk, for example) as a computer program including steps that constitute control operations in the embodiments of the present disclosure so as to be readable, and the computer program can be loaded to a temporary storage device (a semiconductor memory, for example) of a computer and executed by using a central processing unit (CPU) to thereby perform the steps.

More specifically, part or all of the control apparatuses described above is a computer system constituted by a microprocessor, a read-only memory (ROM), a random access memory (RAM), a hard disk unit, a display unit, a keyboard, a mouse, and so on. The compute program is stored in the RAM or in the hard disk unit. When the microprocessor operates in accordance with the computer program, each unit implements its function. Here, the computer program is constituted by a combination of a plurality of instruction codes that indicate instructions provided to a computer for implementing predetermined functions.

For example, when a program execution unit, such as a CPU, reads and executes a computer program recorded to a recording medium, such as a hard disk or a semiconductor memory, each constituent element can be implemented. Software that implements some or all of the elements that constitute the control apparatuses according to the embodiments or modifications described above is a program as follows. A program according to an aspect is a program for causing a controller of a sitting motion assist system to perform a process. The sitting motion assist system includes a care belt that includes a first holder that holds a neck or a shoulder of a patient, a second holder that holds a lower back of the patient, and a first coupler that includes a second coupler positioned on a chest of the patient and couples the first holder and the second holder in front of the patient; a pulling mechanism that is coupled to the second coupler and pulls or pushes the second coupler; and the controller that controls a pulling motion performed by the pulling mechanism. The controller is caused to perform control in the process including: making, after the pulling motion by the pulling mechanism has been started, the pulling mechanism pull the second coupler downward relative to the patient; subsequently making the pulling mechanism pull the second coupler downward and slightly forward relative to the patient; and thereafter making the pulling mechanism push the second coupler downward and slightly backward relative to the patient.

A program according to another aspect is a program for causing a controller of a sitting motion assist system to perform a process. The sitting motion assist system includes a care belt that includes a first holder that holds a neck or a shoulder of a patient, a second holder that holds a lower back of the patient, and a first coupler that includes a second coupler positioned on a chest of the patient and couples the first holder and the second holder in front of the patient; a pulling mechanism that is coupled to the second coupler and pulls or pushes the second coupler; the controller that controls a pulling motion performed by the pulling mechanism; and a presenter that, after the pulling motion by the pulling mechanism has been started, presents, to the patient, knee-bending advice by using flashing light, lighting, or a sound. The controller is caused to perform control in the process including: making, after the pulling motion has been started, the presenter present the knee-bending advice by using flashing light, lighting, or a sound; subsequently making the pulling mechanism pull the second coupler downward and slightly forward relative to the patient; and thereafter making the pulling mechanism push the second coupler downward and slightly backward relative to the patient.

A program according to yet another aspect is a control program for sitting motion assistance for assisting a sitting motion of a patient, the control program being used in a sitting motion assist system. The sitting motion assist system includes a care belt capable of being put on the patient, a knee-bending adviser, and a pulling mechanism. The care belt includes a hold mechanism and a coupler. The hold mechanism includes a first holder capable of holding a first region that corresponds to a neck or a shoulder of the patient and a second holder capable of holding a second region that corresponds to a lower back of the patient. The coupler is capable of being positioned in the vicinity of a chest of the patient and is coupled to the hold mechanism. The knee-bending adviser provides advice to the patient to perform a motion in which the patient bends knees of the patient. The pulling mechanism is coupled to the hold mechanism via the coupler. After the advice by the knee-bending adviser, the pulling mechanism pulls the care belt downward and slightly forward relative to the patient and thereafter pushes the care belt downward and slightly backward relative to the patient so as to assist a sitting motion of the patient changing a posture thereof from a standing posture to a sitting posture. The control program causing a computer to perform a process including: making the knee-bending adviser advise the patient to perform the motion in which the patient bends the knees; and thereafter controlling a pulling motion for pulling the care belt performed by the pulling mechanism so as to pull the care belt downward relative to the patient, subsequently pull the care belt downward and slightly forward relative to the patient, and thereafter push the care belt downward and slightly backward relative to the patient.

The program may be downloaded from a server, for example, and executed, or may be recorded to a certain recording medium (for example, an optical disc, such as a CD-ROM, a magnetic disk, or a semiconductor memory), read from the recording medium, and executed.

A single computer or a plurality of computers may execute the program. That is, centralized processing may be performed or distributed processing may be performed.

Any embodiments or modifications among the embodiments and modifications described above can be combined as appropriate to attain advantages that the embodiments or modifications have.

A combination of any embodiments, a combination of any modifications, or a combination of any embodiment and any modification can be employed, and a combination of features in different embodiments or in different modifications can be employed.

The sitting motion assist system, the control method for the controller of the sitting motion assist system, the recording medium, the care belt, and the robot according to the present disclosure can be used as a sitting motion assist system, a control method for a controller of a sitting motion assist system, a recording medium, a care belt, and a robot for assisting a sitting motion of a patient changing their posture from a standing posture to a sitting posture.

What is claimed is:

1. A sitting motion assist system for assisting a sitting motion of a patient, the sitting motion assist system comprising:
   a care belt that includes
   a first holder that holds a neck or shoulders of the patient,
   a second holder that holds a lower back of the patient, and
   a first coupler that includes a second coupler positioned on a chest of the patient and couples the first holder and the second holder in front of the patient;
   a pulling mechanism that is coupled to the second coupler and pulls or pushes the second coupler; and
   a controller that controls a pulling motion performed by the pulling mechanism, wherein
   the controller controls the pulling mechanism after the pulling motion has been started so as to make the pulling mechanism pull the second coupler downward relative to the patient, subsequently pull the second coupler downward and slightly forward relative to the patient, and thereafter push the second coupler downward and slightly backward relative to the patient, thereby the sitting motion assist system assisting the sitting motion of the patient.

2. The sitting motion assist system according to claim 1, wherein
   the first holder extends from a back to a front of a body of the patient to hold a portion from the neck, the chest, and to sides of the patient, and
   the second holder holds a portion from the sides to the lower back of the patient.

3. The sitting motion assist system according to claim 1, wherein
   the first holder extends from a back to a front of a body of the patient to hold a portion from the shoulders, the chest, and to sides of the patient, and
   the second holder holds a portion from the sides to the lower back of the patient.

4. The sitting motion assist system according to claim 1, wherein
   the pulling mechanism includes an arm mechanism provided with a plurality of joints, and
   the sitting motion assist system further comprises a walking mechanism that is provided with the arm mechanism and a pair of front wheels and a pair of rear wheels.

5. The sitting motion assist system according to claim 1, wherein
   one of the pulling mechanism and the second coupler includes a buckle and the other includes a buckle receptacle, and
   the buckle and the buckle receptacle are detachably coupled to each other.

6. The sitting motion assist system according to claim 1, wherein
the pulling mechanism includes an arm mechanism provided with a plurality of joints,
the sitting motion assist system further comprises:
   a force obtainer that obtains information regarding a force externally applied to the arm mechanism;
   a position obtainer that obtains information regarding a position of the arm mechanism; and
   a motion information generator that generates motion information for the arm mechanism from the information regarding the force obtained by the force obtainer and the information regarding the position obtained by the position obtainer, and
the controller controls a motion of the arm mechanism on the basis of the motion information generated by the motion information generator.

7. The sitting motion assist system according to claim 6, wherein
the motion information generator generates motion information for increasing a pulling speed at which the arm mechanism pulls the second coupler downward relative to the patient after the pulling motion has been started if the force indicated by the information obtained by the force obtainer is equal to or larger than a predetermined threshold.

8. The sitting motion assist system according to claim 1, wherein the pulling of the second coupler downward exerts a force on a contact portion between the first holder and the neck or the shoulders, thereby a torso of the patient is lowered.

9. A sitting motion assist system for assisting a sitting motion of a patient, the sitting motion assist system comprising:
   a care belt that includes
   a first holder that holds a neck or shoulders of the patient,
   a second holder that holds a lower back of the patient, and
   a first coupler that includes a second coupler positioned on a chest of the patient and couples the first holder and the second holder in front of the patient;
   a pulling mechanism that is coupled to the second coupler and pulls or pushes the second coupler;
   a controller that controls a pulling motion performed by the pulling mechanism; and
   a presenter that, after the pulling motion by the pulling mechanism has been started, presents, to the patient, knee-bending advice by using flashing light, lighting, or a sound, wherein
   the controller performs control after the pulling motion has been started so as to make the presenter present the knee-bending advice by using flashing light, lighting, or a sound, subsequently make the pulling mechanism pull the second coupler downward and slightly forward relative to the patient, and thereafter make the pulling mechanism push the second coupler downward and slightly backward relative to the patient.

10. The sitting motion assist system according to claim 9, wherein the pulling of the second coupler downward exerts a force on a contact portion between the first holder and the neck or the shoulders, thereby a torso of the patient is lowered.

* * * * *